(12) United States Patent
Kanamori et al.

(10) Patent No.: US 8,130,293 B2
(45) Date of Patent: Mar. 6, 2012

(54) IMAGE PROCESSING APPARATUS HAVING PATTERNED POLARIZER, PATTERNED POLARIZER, AND IMAGE PROCESSING METHOD

(75) Inventors: Katsuhiro Kanamori, Nara (JP); Satoshi Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 552 days.

(21) Appl. No.: 12/307,789

(22) PCT Filed: May 14, 2008

(86) PCT No.: PCT/JP2008/001210
§ 371 (c)(1),
(2), (4) Date: Jan. 7, 2009

(87) PCT Pub. No.: WO2008/155873
PCT Pub. Date: Dec. 24, 2008

(65) Prior Publication Data
US 2009/0278954 A1 Nov. 12, 2009

(30) Foreign Application Priority Data

Jun. 15, 2007 (JP) ................................ 2007-158962
Dec. 7, 2007 (JP) ................................ 2007-317097

(51) Int. Cl.
*H04N 9/083* (2006.01)
*H04N 5/228* (2006.01)
(52) U.S. Cl. ...................... 348/280; 348/222.1; 348/273
(58) Field of Classification Search .................. 348/273, 348/280
See application file for complete search history.

(56) References Cited

U.S. PATENT DOCUMENTS

| | | | | |
|---|---|---|---|---|
| 7,149,262 B1 * | 12/2006 | Nayar et al. | ................... | 375/341 |
| 7,193,214 B1 * | 3/2007 | Pittman | ....................... | 250/341.3 |
| 7,265,834 B2 * | 9/2007 | Kawakami et al. | ............ | 356/364 |
| 7,411,677 B2 * | 8/2008 | Kawakami et al. | ............ | 356/365 |
| 7,522,278 B2 * | 4/2009 | Kaminsky | ....................... | 356/364 |
| 2005/0133879 A1 | 6/2005 | Yamaguti et al. | | |
| 2010/0079618 A1 * | 4/2010 | Sato et al. | ................... | 348/229.1 |

(Continued)

FOREIGN PATENT DOCUMENTS

JP 2005-019958 1/2005

(Continued)

OTHER PUBLICATIONS

International Search Report for corresponding Application No. PCT/JP2008/001210 mailed Aug. 26, 2008.

(Continued)

*Primary Examiner* — Ngoc-Yen Vu
(74) *Attorney, Agent, or Firm* — Renner, Otto, Boisselle & Sklar, LLP

(57) ABSTRACT

An image processing apparatus according to the present invention includes: a color and polarization obtaining section 101 including a single-chip color image capture device that has a color mosaic filter 201 and a patterned polarizer 202 in which a number of polarizer units, having polarization transmission planes defining mutually different angles, are provided for multiple pixels of the same color (G) in the color mosaic filter 201; a polarization information processing section 103 for approximating, as a sinusoidal function, a relation between the intensities of light rays that have been transmitted through the polarizer units for the G pixels and the angles of the polarization transmission planes of the polarizer units; and a color mosaic interpolation section 103 for generating a color intensity image by performing color intensity interpolation and getting a color intensity that cannot be obtained at a pixel of interest.

19 Claims, 37 Drawing Sheets

FOREIGN PATENT DOCUMENTS

JP 2006-254331 9/2006
JP 2007-086720 4/2007

OTHER PUBLICATIONS

Lawrence B. Wolff, "Polarization Vision: A New Sensory Approach to Image Understanding", Image and Vision Computing 15 (1997), pp. 81-93, Elsevier Science B. V.

T. Kawashima et al., "Development of Polarization Imaging Device and Applications by Using Patterned Polarizer", Institute of Electronics, Information and Communication Engineers of Japan, National Conference 2006, No. D-11-52, p. 52, Mar. 2006.

Hisao Kikuta et al., "Polarized Image Measuring System", Oplus E, vol. 25, No. 11, pp. 1241-1247, 2003 and a partial translation thereof.

* cited by examiner

FIG. 3
POLARIZER #3
(G3, etc.)
MAIN AXIS ANGLE $\psi=90°$
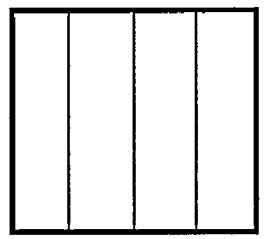
POLARIZER #2
(G2, etc.)
MAIN AXIS ANGLE $\psi=45°$
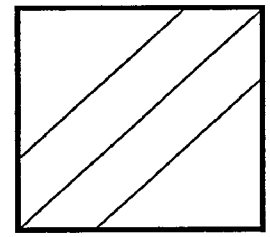
POLARIZER #4
(G4, etc.)
MAIN AXIS ANGLE $\psi=135°$
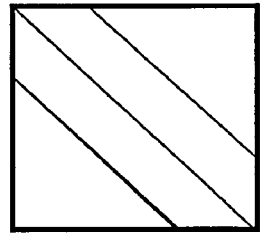
POLARIZER #1
(G1, etc.)
MAIN AXIS ANGLE $\psi=0°$
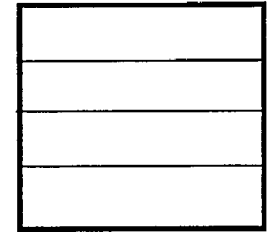

|   | 1 |   | 3 |   | 2 |   | 4 |
|---|---|---|---|---|---|---|---|
| 2 |   | 4 |   | 1 |   | 3 |   |
|   | 3 |   | 2 |   | 4 |   | 1 |
| 4 |   | 1 |   | 3 |   | 2 |   |
|   | 2 |   | 4 |   | 1 |   | 3 |
| 1 |   | 3 |   | 2 |   | 4 |   |
|   | 4 |   | 1 |   | 3 |   | 2 |
| 3 |   | 2 |   | 4 |   | 1 |   |

505, 506, 507, 508

(b)

|   | 1 |   | 2 |   | 3 |   | 4 |
|---|---|---|---|---|---|---|---|
| 2 |   | 3 |   | 4 |   | 1 |   |
|   | 4 |   | 1 |   | 2 |   | 3 |
| 1 |   | 2 |   | 3 |   | 4 |   |
|   | 3 |   | 4 |   | 1 |   | 2 |
| 4 |   | 1 |   | 2 |   | 3 |   |
|   | 2 |   | 3 |   | 4 |   | 1 |
| 3 |   | 4 |   | 1 |   | 2 |   |

514, 515, 516, 517

FIG. 13
(a)
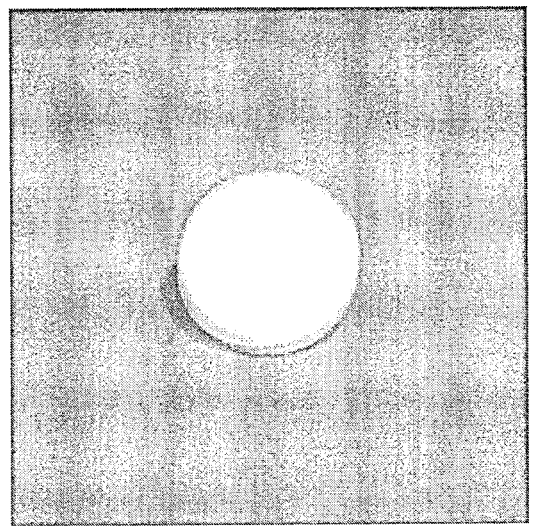
OBJECT (BALL)
(b)
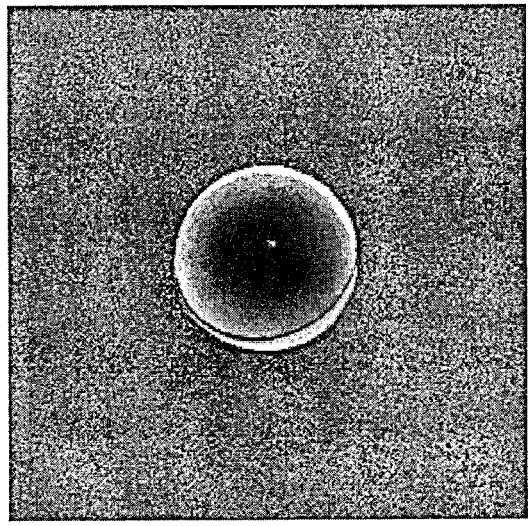
DEGREE-OF-POLARIZATION IMAGE $\rho(x,y)$
(c)
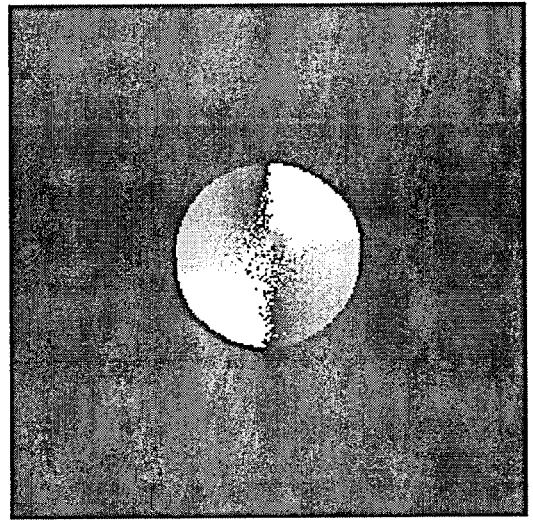
POLARIZATION PHASE IMAGE $\phi(x,y)$

FIG. 15
(a)
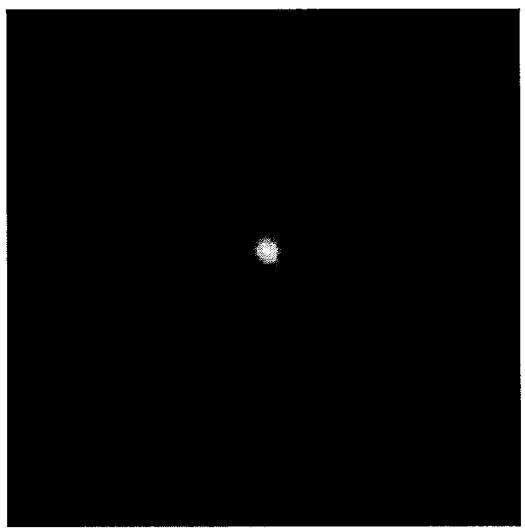
SPECULAR REFLECTION IMAGE
(b)
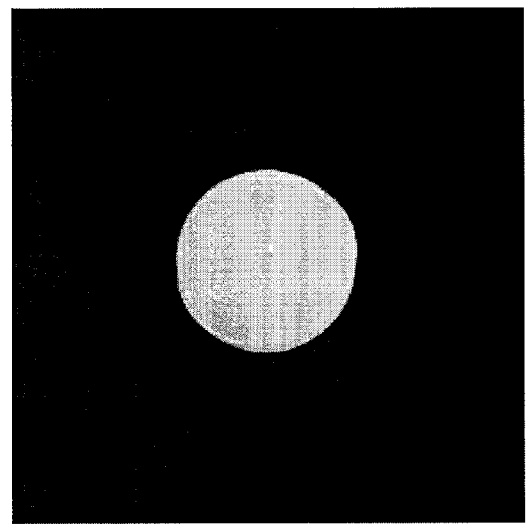
DIFFUSE REFLECTION IMAGE
(c)
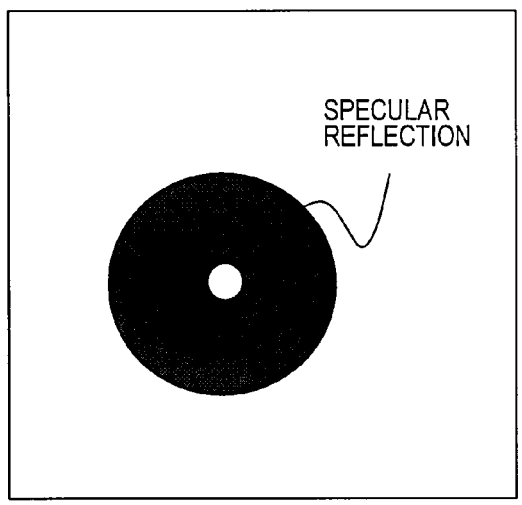
SPECULAR REFLECTION IMAGE
(SCHEMATIC)
(d)
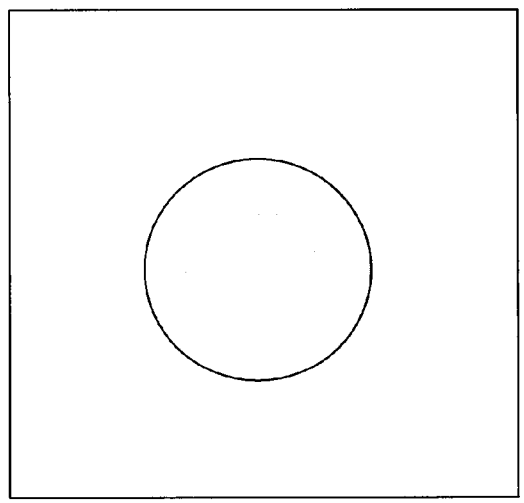
DIFFUSE REFLECTION IMAGE
(SCHEMATIC)

*FIG. 16*

| R1 | G1 | R3 | G3 | R1 | G2 | R3 | G4 |
|----|----|----|----|----|----|----|----|
| G2 | B2 | G4 | B4 | G1 | B2 | G3 | B4 |
| R3 | G3 | R1 | G2 | R3 | G4 | R1 | G1 |
| G4 | B4 | G1 | B2 | G3 | B4 | G2 | B2 |
| R1 | G2 | R3 | G4 | R1 | G1 | R3 | G3 |
| G1 | B2 | G3 | B4 | G2 | B2 | G4 | B4 |
| R3 | G4 | R1 | G1 | R3 | G3 | R1 | G2 |
| G3 | B4 | G2 | B2 | G4 | B4 | G1 | B2 |

(a)

| R1 | G1 | R3 | G3 | R1 | G2 | R3 | G4 |
|----|----|----|----|----|----|----|----|
| G2 | B2 | G4 | B4 | G1 | B2 | G3 | B4 |
| R3 | G3 | R1 | G2 | R3 | G4 | R1 | G1 |
| G4 | B4 | G1 | B2 | G3 | B4 | G2 | B2 |
| R1 | G2 | R3 | G4 | R1 | G1 | R3 | G3 |
| G1 | B2 | G3 | B4 | G2 | B2 | G4 | B4 |
| R3 | G4 | R1 | G1 | R3 | G3 | R1 | G2 |
| G3 | B4 | G2 | B2 | G4 | B4 | G1 | B2 |

| R2 | G1 | R4 | G3 | R2 | G2 | R4 | G4 |
| G2 | B1 | G4 | B3 | G1 | B1 | G3 | B3 |
| R4 | G3 | R2 | G2 | R4 | G4 | R2 | G1 |
| G4 | B3 | G1 | B1 | G3 | B3 | G2 | B1 |
| R2 | G2 | R4 | G4 | R2 | G1 | R4 | G3 |
| G1 | B1 | G3 | B3 | G2 | B1 | G4 | B3 |
| R4 | G4 | R2 | G1 | R4 | G3 | R2 | G2 |
| G3 | B3 | G2 | B1 | G4 | B3 | G1 | B1 |

(a)

| R2 | G1 | R4 | G3 | R2 | G2 | R4 | G4 |
| G2 | B1 | G4 | B3 | G1 | B1 | G3 | B3 |
| R4 | G3 | R2 | G2 | R4 | G4 | R2 | G1 |
| G4 | B3 | G1 | B1 | G3 | B3 | G2 | B1 |
| R2 | G2 | R4 | G4 | R2 | G1 | R4 | G3 |
| G1 | B1 | G3 | B3 | G2 | B1 | G4 | B3 |
| R4 | G4 | R2 | G1 | R4 | G3 | R2 | G2 |
| G3 | B3 | G2 | B1 | G4 | B3 | G1 | B1 |

| R1 | G1 | R3 | G3 | R1 | G2 | R3 | G4 |
|----|----|----|----|----|----|----|----|
| G2 | B  | G4 | B  | G1 | B  | G3 | B  |
| R3 | G3 | R1 | G2 | R3 | G4 | R1 | G1 |
| G4 | B  | G1 | B  | G3 | B  | G2 | B  |
| R1 | G2 | R3 | G4 | R1 | G1 | R3 | G3 |
| G1 | B  | G3 | B  | G2 | B  | G4 | B  |
| R3 | G4 | R1 | G1 | R3 | G3 | R1 | G2 |
| G3 | B  | G2 | B  | G4 | B  | G1 | B  |

*FIG. 26*

| R | G1 | R | G3 | R | G2 | R | G4 |
|---|---|---|---|---|---|---|---|
| G2 | B2 | G4 | B4 | G1 | B2 | G3 | B4 |
| R | G3 | R | G2 | R | G4 | R | G1 |
| G4 | B4 | G1 | B2 | G3 | B4 | G2 | B2 |
| R | G2 | R | G4 | R | G1 | R | G3 |
| G1 | B2 | G3 | B4 | G2 | B2 | G4 | B4 |
| R | G4 | R | G1 | R | G3 | R | G2 |
| G3 | B4 | G2 | B2 | G4 | B4 | G1 | B2 |

FIG. 30
(a)
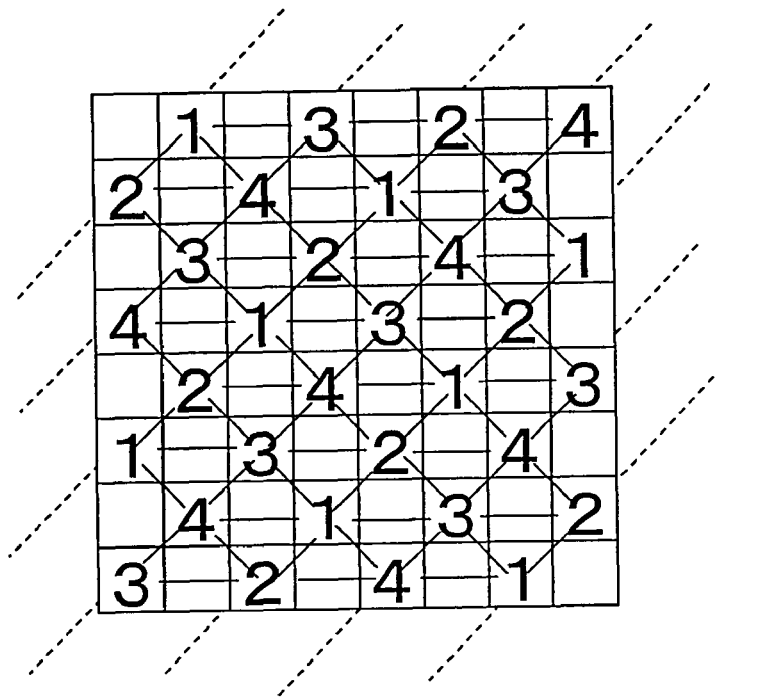
(b)
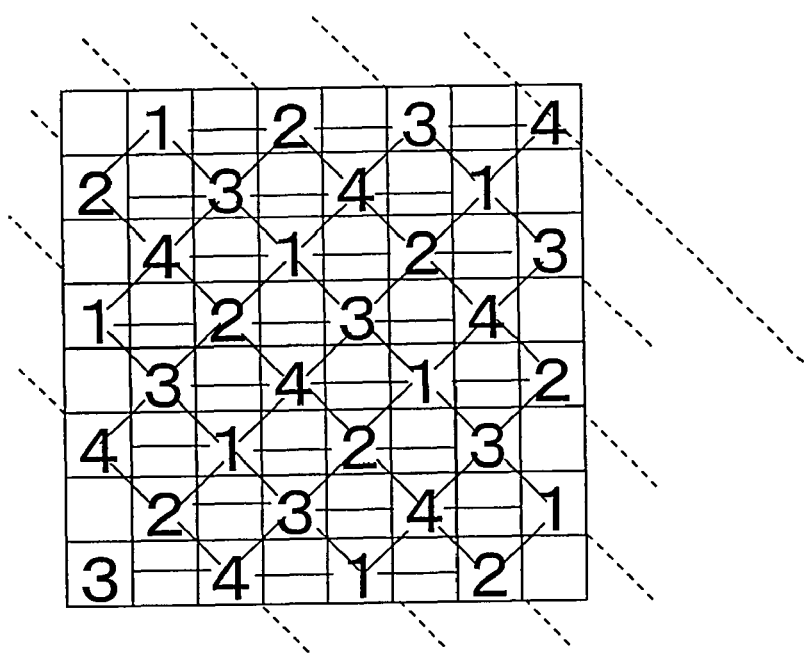

FIG. 31
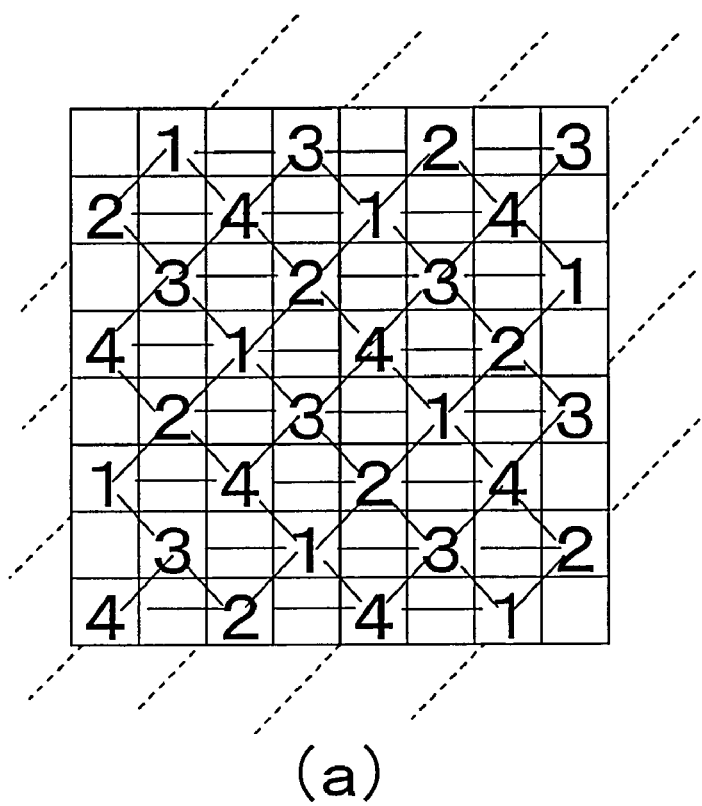
(a)
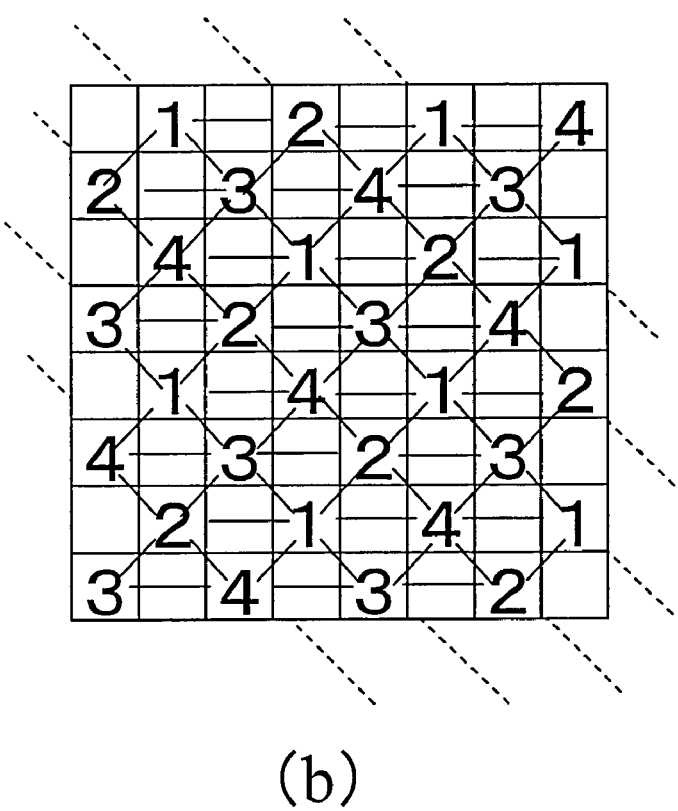
(b)

FIG. 37

| G1 | R1 | G1 | R1 | G1 | R1 | G1 | R1 |
|----|----|----|----|----|----|----|----|
| B1 | G2 | B1 | G2 | B1 | G2 | B1 | G2 |
| G1 | R1 | G1 | R1 | G1 | R1 | G1 | R1 |
| B1 | G2 | B1 | G2 | B1 | G2 | B1 | G2 |
| G1 | R1 | G1 | R1 | G1 | R1 | G1 | R1 |
| B1 | G2 | B1 | G2 | B1 | G2 | B1 | G2 |
| G1 | R1 | G1 | R1 | G1 | R1 | G1 | R1 |
| B1 | G2 | B1 | G2 | B1 | G2 | B1 | G2 |

IMAGE PROCESSING APPARATUS HAVING PATTERNED POLARIZER, PATTERNED POLARIZER, AND IMAGE PROCESSING METHOD

TECHNICAL FIELD

The present invention relates to an image processing apparatus that allows the user to obtain both color information and polarization information alike from the object.

BACKGROUND ART

Recently, digital movie cameras have advanced so dramatically that it is expected that cellphones with a camera would achieve as high definition as an HDTV in the near future. However, if the size of an optical system or an image capture device were reduced significantly, then the basic performance of the imaging device would decline too much to maintain the minimum required level in terms of sensitivity or diffraction limit of lens. For that reason, such a high-resolution trend should hit a plateau sooner or later. Even so, however, the image quality can still be improved by compensating for the lack of image information of the object by computer graphics type processing. Nevertheless, for that purpose, pieces of physical information, including information about the three-dimensional shape of the object and information about the light source to illuminate the object, need to be collected during the image generation process. To obtain information about the shape of the object, an active sensor for projecting either a laser beam or a light beam emitted from an LED onto the object or a rangefinder system such as a differential stereo vision system is needed. However, such a sensor or system is not just bulky but also imposes various restrictions. For example, such a sensor or system allows a distance of at most several meters between the camera and the object. Besides, such a sensor or system cannot be used unless the object is a solid and bright diffusive object. Under such a restriction, the sensor or system cannot be used to shoot an object located at a distance outdoors or take a close up photo of a person with his or her hair and clothes shot as beautifully as possible.

To sense the shape of a completely passive object, polarization may be used according to some conventional technique. This technique takes advantage of the fact that the light reflected (which may be either specular reflected or diffuse reflected) from an object irradiated with non-polarized natural light will have various types of partial polarization due to geometrical factors such the surface direction and the viewpoint. To collect those sorts of information, however, the degrees of partial polarization of the respective pixels of the object should be obtained in the form of polarized images.

Non-Patent Document No. 1 discloses a camera that captures a moving picture while controlling a liquid crystal polarizer that is arranged in front of the lens of the camera. If such a camera is used, a color moving picture and information about the degrees of partial polarization of the object can be obtained in the form of images. However, this camera cannot obtain a single piece of polarization information until several frames are shot with the polarization main axes of the polarizer changed by applying a voltage to the liquid crystal layer. That is why a time lag of several frames is inevitable between the color image and the polarized image. In other words, these two images cannot be obtained at the same time. This technique is equivalent to a technique for rotating a polarizer with some mechanism.

Non-Patent Documents Nos. 2 and 3 disclose that a patterned polarizer with multiple different polarization main axes is spatially arranged in an image capture device in order to obtain light intensity images and images representing the degrees of partial polarization of the object. As the patterned polarizer, either a photonic crystal or a structure birefringence wave plate array may be used. According to these techniques, however, just a monochrome image and a polarized image can be obtained at the same time.

Patent Document No. 1 teaches arranging a polarization filter for some of G (green) pixels in a Bayer color mosaic, thereby giving polarization property to a part of an image capture device and obtaining a color image and polarization information at the same time. According to this technique, an image with reduced specular reflection components is obtained from a color image. However, since a difference between two different polarization pixels is simply calculated, information about the degree of partial polarization of the object cannot be obtained perfectly.

Patent Document No. 1: Japanese Patent Application Laid-Open Publication No. 2006-254331

Non-Patent Document No. 1: Lawrence B. Wolff, "Polarization Vision: A New Sensory Approach to Image Understanding", Image and Vision Computing 15 (1997), pp. 81-93, Elsevier Science B. V.

Non-Patent Document No. 2: Kawashima, Sato, Kawakami, Nagashima, Ota and Aoki, "Development of Polarization Imaging Device and Applications by Using Patterned Polarizer", Institute of Electronics, Information and Communication Engineers of Japan, National Conference 2006, No. D-11-52, p. 52, March 2006

Non-Patent Document No. 3: Kikuta and Iwata, "Polarized Image Measuring System", Oplus E, Vol. 25, No. 11, pp. 1241-1247, 2003

DISCLOSURE OF INVENTION

Problems to be Solved by the Invention

However, according to none of the conventional techniques described above, a color image of the object and a polarized image representing the degree of partial polarization of the object can be obtained at the same time. Thus, it has been impossible to obtain a color moving picture and shape information with no time lag left between them.

In Patent Document No. 1, a color image is controlled with parts of polarization information added to the color image, thereby reducing the specular reflection. According to this technique, pixels are arranged as a Bayer mosaic as shown in FIG. 37, in which G1 and G2 both denote G pixels and in which polarizer units are arranged at the G2 locations but are not arranged at the G1 locations. Meanwhile, R1 and B1 denote R (red) pixels and B (blue) pixels, respectively, and no polarizer units are provided for these pixel locations. That is to say, in this pixel arrangement, only the G2 pixels function as polarization pixels.

In the processing performed by the apparatus of Patent Document No. 1, the difference in light intensity between the G1 and G2 pixel locations is multiplied by a constant and the product is added to non-polarization pixels R1, G1 and B1. In this manner, the color intensity value can be controlled. According to this configuration, although a color image and polarization information can be obtained, polarizer units are arranged at the G2 pixel locations, and therefore, accurate G light intensity cannot be obtained. As a result, the interpolated color image will have some degree of color difference.

On top of that, as just one type of polarization pixels are used, the partial polarization information obtained is so imperfect that it is not clear what degree of partial polarization has been produced in what direction at each pixel location. That is to say, a perfect polarized image cannot be obtained.

In order to overcome the problems described above, the present invention has an object of providing an apparatus and method for image processing that can obtain not only a color image but also a polarized image representing the direction and degree of polarization at the same time.

Another object of the present invention is to provide a patterned polarizer that can be used effectively in such an image processing apparatus and a single-chip image capture device including such a patterned polarizer.

Means for Solving the Problems

An image processing apparatus according to the present invention includes: a color and polarization obtaining section including a single-chip color image capture device that has a color mosaic filter and a patterned polarizer in which a number of polarizer units, having polarization transmission planes defining mutually different angles, are provided for multiple pixels of the same color in the color mosaic filter; a polarization information processing section for approximating, as a sinusoidal function, a relation between the intensities of light rays that have been transmitted through the polarizer units for the multiple pixels of the same color and the angles of the polarization transmission planes of the polarizer units; and a color mosaic interpolation section for generating a color intensity image by performing color intensity interpolation and getting a color intensity that cannot be obtained at a pixel of interest.

In one preferred embodiment, the patterned polarizer has a structure in which four types of polarizer units, having polarization transmission planes defining mutually different angles, are arranged adjacent to each other.

In another preferred embodiment, the color mosaic filter has a structure in which pixels in a single particular color are arranged in a checkerboard pattern, and the polarizer units are provided for those pixels that are arranged in the checkerboard pattern.

In this particular preferred embodiment, the particular color is G (green) among R (red), G (green) and B (blue).

An image processing method according to the present invention includes the steps of: measuring the intensities of respective pixels using a single-chip color image capture device, in which polarizer units, having polarization transmission planes that define mutually different angles, are provided for multiple pixels in a single particular color included in a color pixel arrangement; obtaining polarization information based on the intensities that have been measured in the multiple pixels in the single particular color; and performing a spatial interpolation on a color intensity using the intensities in the single particular color and the two colors other than the single particular color, thereby generating a color intensity image.

Another image processing apparatus according to the present invention includes: a color and polarization obtaining section including a single-chip color image capture device that has a color mosaic filter and a patterned polarizer in which a number of polarizer units, having polarization transmission planes defining mutually different angles, are provided for multiple pixels of different colors in the color mosaic filter; a polarization information processing section for approximating, as a sinusoidal function, a relation between either the intensities of light rays that have been transmitted through the polarizer units for the multiple pixels of the different colors, or corrected intensities thereof, and the angles of the polarization transmission planes of the polarizer units; and a color mosaic interpolation section for generating a color intensity image by performing color intensity interpolation and getting a color intensity that cannot be obtained at a pixel of interest.

In one preferred embodiment, the color mosaic filter has a structure in which pixels in a single particular color are arranged in a checkerboard pattern. Four types of polarizer units, having polarization transmission planes defining mutually different angles, are arranged adjacent to each other for the pixels that are arranged in the checkerboard pattern, while at least two types of polarizer units, having polarization transmission planes defining mutually different angles, are arranged for the pixels in the other colors.

In a specific preferred embodiment, the particular color is G (green) among R (red), G (green) and B (blue).

In one preferred embodiment, the color mosaic interpolation section calculates the average of intensities that have been measured in pixels of the same color, for which $(180/\theta)$ types of polarizer units are provided in the neighborhood of the pixel of interest, thereby canceling the effect of polarization and performing interpolation on the color intensity. The $(180/\theta)$ types of polarizer units have polarization transmission planes that define angles that are different from each other by $\theta$ degrees.

In another preferred embodiment, the color mosaic interpolation section estimates the color intensity based on the intensities that have been measured in pixels of different colors, for which the polarization transmission planes define the same angle, in the neighborhood of the pixel of interest.

In still another preferred embodiment, the polarization wavelength dependences of the polarizer units for use in the pixels of the same color are approximately equal to each other within a wavelength range associated with that color.

Another image processing method according to the present invention includes the steps of: measuring the intensities of respective pixels using a single-chip color image capture device in which polarizer units, having polarization transmission planes defining mutually different angles, are provided for multiple pixels in multiple different colors in a color pixel arrangement; obtaining polarization information based on the intensities that have been measured in the multiple pixels in the same color, for which the polarization transmission planes define mutually different angles; obtaining polarization information by correcting the intensities of the multiple pixels in the multiple different colors, for which the polarization transmission planes define different angles, in the neighborhood of the pixel of interest; and estimating a color intensity that cannot be obtained at the pixel of interest based on the intensities of the pixels of the same color, for which $(180/\theta)$ types of polarizer units, having polarization transmission planes defining angles that are different from each other by $\theta$ degrees, are provided in the neighborhood of the pixel of interest, and based on the intensities of the pixels in the different colors, for which the polarization transmission planes define the same angle, thereby generating a color intensity image.

A patterned polarizer according to the present invention includes a number of polarizer units that are arranged two-dimensionally for pixels of at least one color that are included in a color pixel arrangement. The polarizer units include polarizer units having polarization transmission planes defining mutually different angles.

In one preferred embodiment, the polarizer units are arranged in a checkerboard pattern and no polarizer units are present between adjacent ones of the polarizer units.

In this particular preferred embodiment, the polarizer units have a pattern in which multiple sets are arranged periodically. Each set consists of (180/θ) types of polarizer units, the polarization transmission planes of which define angles that are different from each other by θ degrees.

In another preferred embodiment, the polarizer units include: polarizer units, which are provided for pixels in a particular color that are arranged in a checkerboard pattern; and polarizer units, which are provided for pixels other than the pixels in the particular color that are arranged in the checkerboard pattern.

In still another preferred embodiment, polarizer units that are provided for pixels in a particular color that are arranged in a checkerboard pattern have a pattern in which multiple sets are arranged periodically. Each set consists of (180/θ) types of polarizer units, the polarization transmission planes of which define angles that are different from each other by θ degrees. Polarizer units that are provided for pixels other than the pixels in the particular color have a pattern in which multiple sets are arranged periodically. Each set consists of two types of polarizer units, the polarization transmission planes of which define mutually different angles.

A single-chip color image capture device according to the present invention includes: a patterned polarizer according to any of the preferred embodiments of the present invention described above; and a color mosaic filter, which is arranged such that the respective polarizer units of the patterned polarizer are superposed on its respective pixels.

Still another image processing apparatus according to the present invention includes: a color and polarization obtaining section including a single-chip color image capture device that has a color mosaic filter and a patterned polarizer in which a number of polarizer units, of which the polarization transmission planes define four or more different angles, are provided for multiple pixels of the same color in the color mosaic filter; a polarization information processing section for approximating, as a sinusoidal function, a relation between the intensities of light rays that have been transmitted through the polarizer units for the multiple pixels of the same color and the angles of the polarization transmission planes of the polarizer units; and a color mosaic interpolation section for generating a color intensity image by performing color intensity interpolation using, as a pixel unit, a triangular area comprised of three polarizer units that have polarization transmission planes defining mutually different angles and that are adjacent to each other.

Effects of the Invention

According to the present invention, multiple types of polarizer units are used in combination with a pixel arrangement of a color mosaic filter, and therefore, information about a color intensity and information about polarization can be obtained and processed at the same time.

BRIEF DESCRIPTION OF DRAWINGS

FIG. 3 illustrates the four types of polarization main axes of a polarizer unit.

FIGS. 5(a) and 5(b) illustrate another exemplary combined arrangement for a color filter and patterned polarizer according to the first preferred embodiment.

FIG. 13(a) is an input image representing a plastic ball as a spherical object, and FIGS. 13(b) and 13(c) show an exemplary degree-of-polarization image ρ (x, y) and an exemplary polarization phase image φ (x, y) with respect to the object shown in FIG. 13(a).

FIGS. 15(a) through 15(d) illustrate how an image may be separated into an image composed of specular reflection components and an image composed of diffuse reflection components.

FIGS. 16(a) and 16(b) illustrate an exemplary combined arrangement for a color filter and a patterned polarizer according to a second preferred embodiment of the present invention.

FIGS. 17(a) and 17(b) illustrate another exemplary combined arrangement for a color filter and a patterned polarizer according to the second preferred embodiment.

FIG. 25 illustrates an exemplary combined arrangement for a color filter and a patterned polarizer according to a third preferred embodiment of the present invention.

FIG. 26 illustrates another exemplary combined arrangement for a color filter and a patterned polarizer according to the third preferred embodiment.

FIGS. 30(a) and 30(b) illustrate an exemplary combined arrangement for a color filter and a patterned polarizer and the shape of a unit pixel set according to the fourth preferred embodiment.

FIGS. 31(a) and 31(b) illustrate another exemplary combined arrangement for a color filter and a patterned polarizer and the shape of a unit pixel set according to the fourth preferred embodiment.

FIG. 37 illustrates a prior art.

Figure 1:
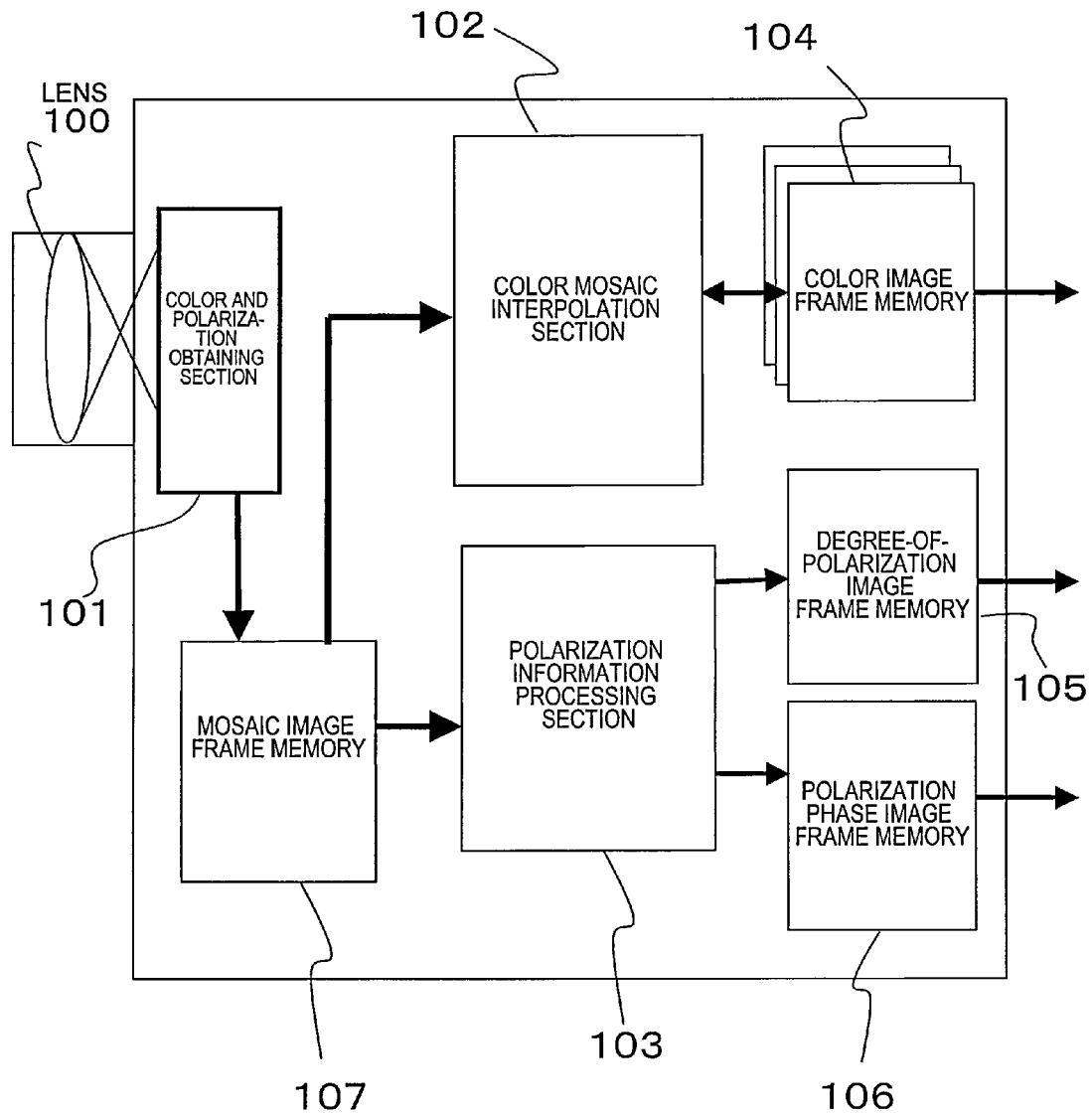
FIG. 1 is a block diagram illustrating a configuration for an image processing apparatus according to the present invention.

DESCRIPTION OF REFERENCE NUMERALS 100 lens
101 color and polarization obtaining section
102 polarization information processing section
103 color mosaic interpolation section
104 color image frame memory
105 degree-of-polarization image frame memory
106 polarization phase image frame memory
107 mosaic image frame memory

BEST MODE FOR CARRYING OUT THE INVENTION

Hereinafter, embodiments of an apparatus and method for image processing according to the present invention will be described with reference to the accompanying drawings. The preferred embodiments of the present invention to be described below generally have the following arrangements:

EMBODIMENT 1: polarizers are provided for only G pixels of a color mosaic;
EMBODIMENT 2: polarizers are provided for all of R, G and B pixels of a color mosaic;
EMBODIMENT 3: polarizers are provided for either only G and R pixels or only G and B pixels of a color mosaic; and
EMBODIMENT 4: four types of polarizers are provided for only G pixels as in EMBODIMENT 1 but polarization information is obtained and color interpolation is done with three types of adjacent polarizers selected.

Embodiment 1

FIG. 1 is a block diagram illustrating a basic configuration that applies to every preferred embodiment of the present invention to be described herein. The apparatus of this preferred embodiment obtains not only color image information from an object in real time but also polarized image information at the same time, and outputs those pieces of information as two different types of polarized images (i.e., a degree-of-polarization image ρ and a polarization phase image φ). Each of the degree-of-polarization image ρ and the polarization phase image φ could be either a still picture or a moving picture.

After having passed through the lens 100 shown in FIG. 1, the incident light enters a color and polarization obtaining section 101. From this incident light, the color and polarization obtaining section 101 can obtain data about a color moving picture and data about a polarization information image at the same time. The data about the color mosaic image is output from the color and polarization obtaining section 101 and stored in a mosaic image frame memory 107.

The mosaic image data is sequentially read out from the mosaic image frame memory 107 and then passed to, and subjected to interpolation processing by, a color mosaic interpolation section 102. The results of the interpolation processing are stored in a color image frame memory 104, in which the three planes of R, G and B are provided for each pixel, and are read when necessary.

Meanwhile, pixel signals are also read sequentially from the mosaic image frame memory 107 and supplied to a polarization information processing section 103. These pixel signals are processed by the polarization information processing section 103 and then stored in a degree-of-polarization image frame memory 105 and a polarization phase image frame memory 106. The degree-of-polarization image frame memory 105 outputs data about the degree-polarization image (ρ) and the polarization phase image frame memory 106 outputs data about the polarization phase image (φ).

Figure 2:
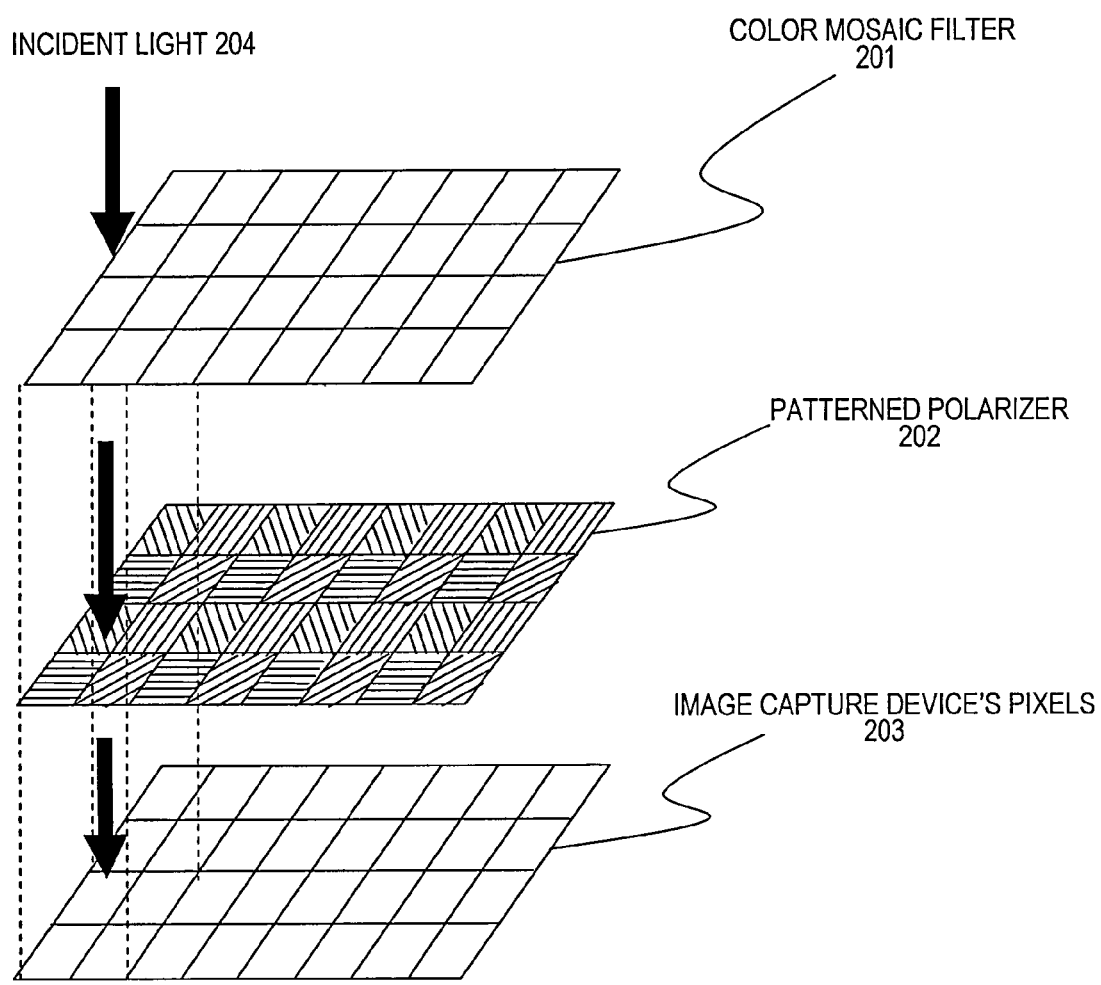
FIG. 2 illustrates an arrangement for the color and polarization obtaining section.

FIG. 2 is a schematic representation illustrating a basic arrangement for the color and polarization obtaining section 101. In the example illustrated in FIG. 2, a color mosaic filter 201 and a patterned polarizer 202 are stacked one upon the other in front of image capture device's pixels 203. However, the color mosaic filter 201 and the patterned polarizer 202 may also be stacked in reverse order. The incident light 204 is transmitted through the color mosaic filter 201 and the patterned polarizer 202 to reach the image capture device and have its intensity monitored by the image capture device's pixels 203 on a pixel-by-pixel basis. Thus, according to this preferred embodiment, color information and polarization information can be obtained at the same time using a single-chip color image capture device. As will be described in detail later, the patterned polarizer 202 consists of a lot of polarizer units including ones (or segments), of which the polarization transmission planes define mutually different angles. Each of those polarizer units typically has a size corresponding to one pixel. However, there is no need to provide the polarizer unit for every pixel of the color mosaic filter 201.

Such a patterned polarizer 202 may be realized by using the photonic crystal disclosed in Non-Patent Document No. 2, for example. When the photonic crystal is used, light, of which the electric field vector oscillating plane is parallel to the groove that has been cut on its surface, becomes a TE wave (transverse electric wave, of which the electric field components are transverse with respect to the incident plane), and light, of which the electric field vector oscillating plane is perpendicular to the groove on its surface, becomes a TM wave (transverse magnetic wave, of which the magnetic field components are transverse with respect to the incident plane). And each polarizer unit exhibits such a polarization property as to transmit the TM wave and reflect (not transmit) the TE wave in each wavelength range.

FIG. 3 shows the meanings of oblique lines that are schematically drawn on each polarizer unit of the patterned polarizer 202. Specifically, the oblique lines drawn within each pixel shown in FIG. 3 indicate the polarization main axis direction of a micro-polarizer (i.e., the polarizer unit) that is arranged over that pixel. As used herein, the "polarization main axis" is an axis that is defined parallel to the polarization plane (i.e., polarization transmission plane) of the light to be transmitted through a polarizer.

Each polarizer unit transmits light, of which the oscillation plane is parallel to the main-axis direction of the polarizer unit, and cuts off light, of which the oscillation plane is perpendicular to the main-axis direction of the unit. In this description, polarization main axes with angles $\psi$=0, 45, 90 and 135 degrees are allocated to the polarizer units with polarizer numbers 1 through 4, respectively. As the polarized light transmittance of each polarizer unit depends on the wavelength of the light to use, the polarizer unit is designed according to the transmission wavelength range of the color mosaic filter. For example, the polarizer unit identified by the reference sign G1 is designed so as to transmit polarized light, of which the main axis direction is "1" (i.e., the angle $\psi$=0 degrees), in the "G" wavelength range.

FIG. 4(a) illustrates the arrangement of 16 pixels, which consists of eight vertical pixels by eight horizontal pixels, in the color and polarization obtaining section 101 of this preferred embodiment. In the example illustrated in FIG. 4(a), four types of polarizer units G1 through G4 are provided for the respective G pixels of a Bayer type color mosaic filter but no polarizer units are arranged for the R and B pixels. In FIG. 4(a), only 8×8=64 are shown. In the actual color and polarization obtaining section 101, however, a huge number of pixel blocks, each having the same arrangement as the block consisting of 64 pixels shown in FIG. 4(a), are arranged periodically within a plane that is parallel to the image capturing plane.

In FIG. 4(b), the R and B pixels are omitted from the block of pixels shown in FIG. 4(a) and numerals indicating the polarizer unit main axis directions of the G pixels are shown instead. That is to say, the numerals "1" through "4" shown in FIG. 4(b) denote pixels for which the polarizer units G1 to G4 are respectively provided. The other blank pixels, to which none of these numerals "1" through "4" are added, are either R pixels or B pixels. Since no polarizer units are provided for those pixels as described above, those pixels may be referred to herein as "non-polarization pixels".

In the arrangement shown in FIG. 4(b), two blocks (A), each consisting of 4×4=16 pixels, and two more blocks (B), each also consisting of 4×4=16 pixels, are combined with each other. This arrangement has the following features.

(1-1) The non-polarization pixel included in the set 401 is surrounded with four different types of polarization pixels, which are identified by the numerals "1" through "4" and are located at its neighboring four-connected positions. As used herein, the "neighboring four-connected positions" refer to four pixels that are arranged in a cross pattern such that one of the four sides of each of those four pixels is adjacent to the center pixel. The same statement applies to any other non-polarization pixel. That is to say, each non-polarization pixel is surrounded with four different types of polarization pixels, which are located at the neighboring four-connected positions. In this manner, since each non-polarization pixel is surrounded with four different types of polarization pixels, the polarization information at the non-polarization pixel's position can be obtained with high accuracy.

(1-2) Each of the sets 402 to 405 of pixels consists of one polarization pixel located at the center and four polarization pixels, which are located at the neighboring eight-connected (oblique) points, i.e., five polarization pixels in total. The numerals given to the five pixels that are included in each of these sets 402 to 405 always include all of "1" through "4". Also, the numeral given to one of the five pixels is the same as the one given to another one of the five. For example, as for the five pixels included in the set 402, the numerals "1", "2", "3", "3" and "4" are given, i.e., the numeral "3" is given to two of the five pixels. In this manner, since every type of patterned polarizer is present at the neighboring eight-connected positions surrounding each polarization pixel, the polarization information at the polarization pixel's position can also be obtained with high accuracy.

(1-3) By arranging multiple blocks of pixels, each consisting of 8×8=64 pixels and having the unit periodic pattern shown in FIG. 4(b), both vertically and horizontally, the entire image capturing plane can be covered with those unit periodic patterns with their continuity maintained in the vicinity of their boundaries.

FIGS. 5(a) and 5(b) show the features of such a pixel arrangement from a different point of view. Specifically, FIG. 5(a) shows the same pixel arrangement as the one shown in FIG. 4. On the other hand, FIG. 5(b) shows another exemplary pixel arrangement with a similar property. In these arrangements, two types of polarization pixels are alternately arranged in different phases on each of multiple diagonal lines that are parallel to each other. For example, on the diagonal lines 505 through 508, 1-2-1-2- . . . , 3-4-3-4- . . . , 2-1-2-1- . . . , and 4-3-4-3- . . . are arranged repeatedly. In the same way, on the diagonal lines 514 through 517, two types of pixels are alternately arranged with the phases changed such as 1-3-1-3- . . . , 2-4-2-4- . . . , 3-1-3-1- . . . , and 4-2-4-2- . . . .

Figure 4:
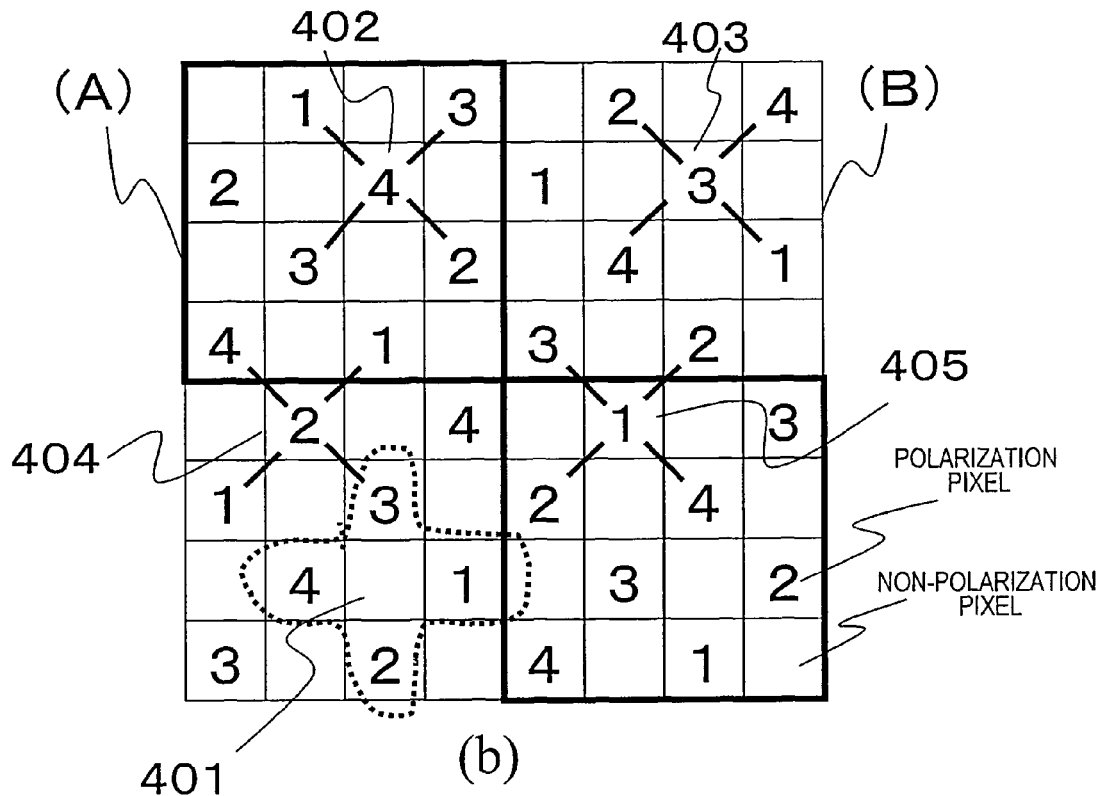
FIGS. 4(a) and 4(b) illustrate an exemplary combined arrangement for a color filter and patterned polarizer according to a first preferred embodiment of the present invention.

FIGS. 6(a) and 6(b) show pixel arrangements that are similar to the one shown in FIG. 4. The arrangement shown in FIGS. 6(a) and 6(b), however, has less than four types of polarization pixels at the neighboring eight-connected positions surrounding each polarization pixel, and therefore, cannot be adopted in this first preferred embodiment. That is to say, as for the features (1-1) to (1-3) described above, the arrangements shown in FIGS. 6(a) and 6(b) do have the features (1-1) and (1-3) but do not have the feature (1-2). For example, there are no polarization pixels identified by the numerals "1" and "4" at the neighboring eight-connected positions surrounding the polarization pixel 620 shown in FIG. 6(a), and there are no polarization pixels identified by the numerals "1" and "2" at the neighboring eight-connected positions surrounding the polarization pixel 630 shown in FIG. 6(b). On the diagonal lines 601 through 604, 1-2-1-2- . . . , 3-4-3-4- . . . , 2-1-2-1- . . . , and 3-4-3-4- . . . are arranged repeatedly. That is to say, there is no phase change between the two 3-4-6-4 lines. Likewise, as for the arrangement shown in FIG. 6(b), there is no phase change between the two 1-3-1-3 lines, either, on the diagonal lines 610 and 612.

Figure 7:
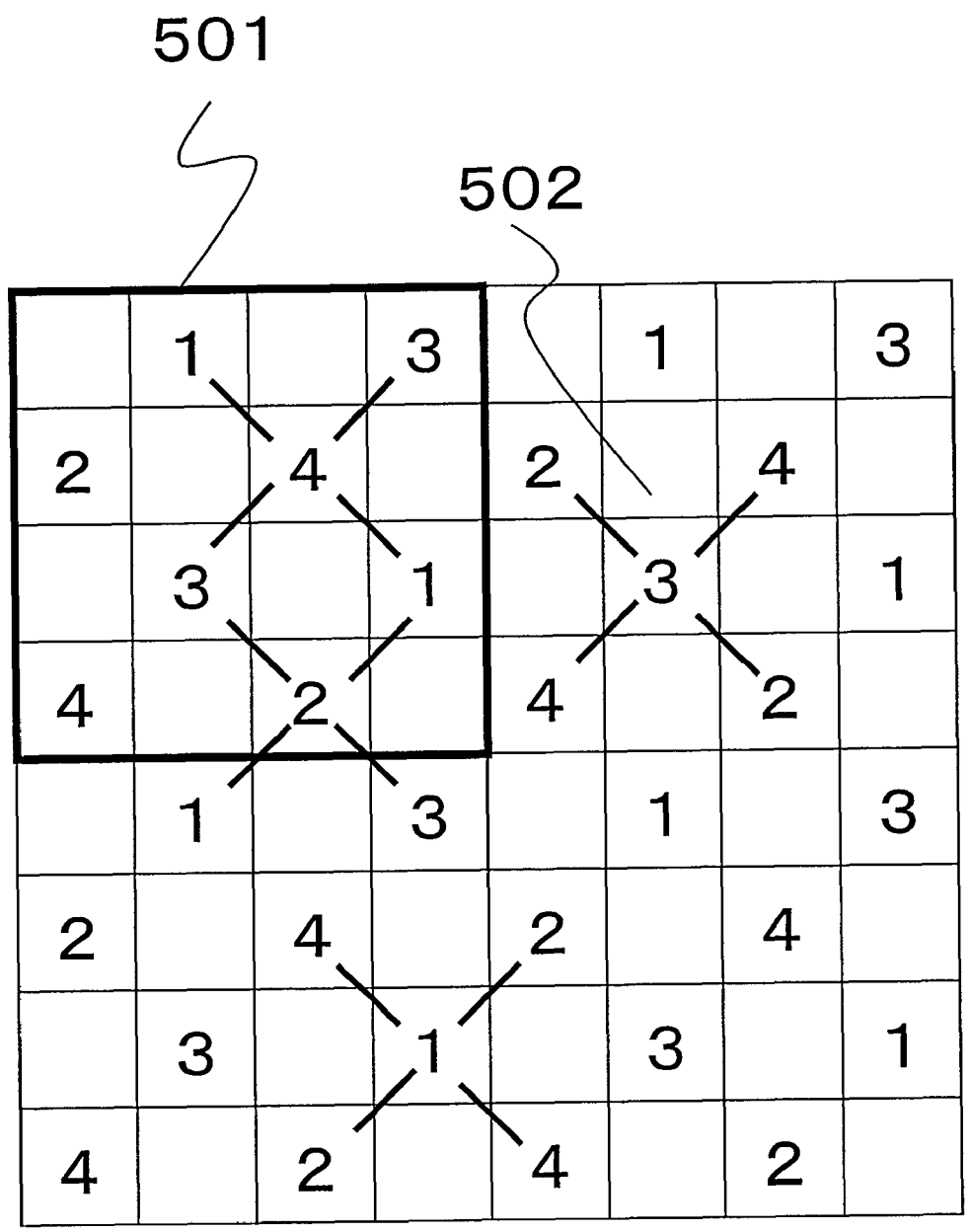
FIG. 7 illustrates another combined arrangement for a color filter and patterned polarizer that also has a problem.

FIG. 7 shows another pixel arrangement, which is also similar to the one shown in FIG. 4 but cannot be adopted to carry out the present invention. This is because there are an insufficient number of types of polarization pixels at the neighboring eight-connected positions surrounding each polarization pixel. In this arrangement, multiple block of pixels, each consisting of 4×4=16 pixels, are also arranged with no space left between them. This arrangement does have the features (1-1) and (1-3) but does not have the feature (1-2), either. For example, as for the set 502 shown in FIG. 7, there are only two types of polarization pixels identified by the numerals "2" and "4" at the neighboring eight-connected positions surrounding the polarization pixel identified by the numeral "3". With such an arrangement, polarization information about a non-polarization pixel (represented by a blank square) can be obtained appropriately from polarization pixels surrounding that non-polarization pixel. Polarization information about a polarization pixel, however, cannot be obtained appropriately from the polarization pixels surrounding that polarization pixel.

As can be seen from the foregoing description, according to this preferred embodiment, the example shown in FIG. 4 or 5 can be used effectively as a pixel arrangement that has all of the three features described above. In the following description, the pixel arrangement shown in FIG. 4 is supposed to be adopted.

Hereinafter, the principle and specific processing of obtaining polarization information and color information using the patterned polarizer of this preferred embodiment will be described with reference to FIGS. 8 and 10, each of which shows a single block consisting of 4×4=16 pixels that has been extracted from the pixel arrangement shown in FIG. 4 with subscripts (x, y) that are used to identify the pixel locations in the block. In this case, the subscripts x and y are integers of 1 through 4 that are used to indicate the column and row numbers in the matrix.

Polarization Information at R Pixel Location

Figure 8:
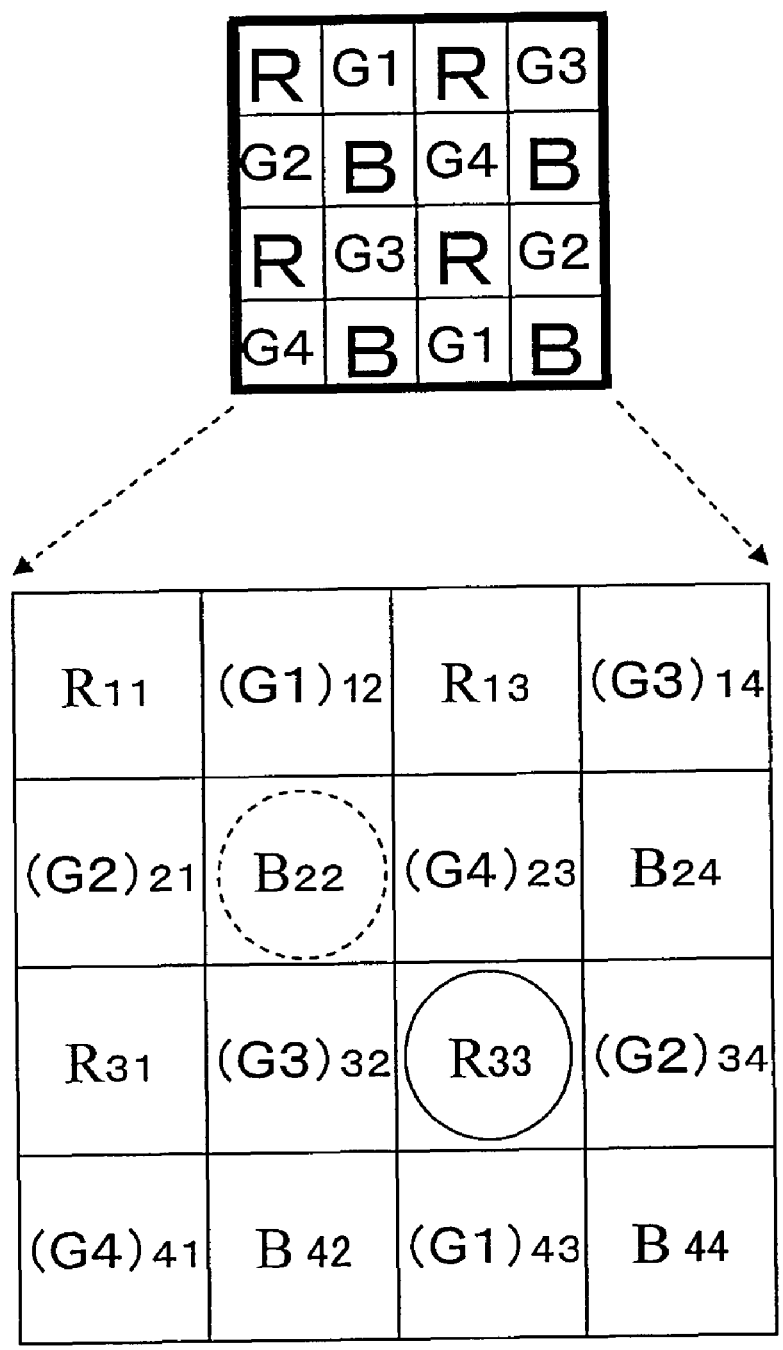
FIG. 8 illustrates an R pixel and its surrounding pixels and a B pixel and its surrounding pixels in the first preferred embodiment.

Take $R_{33}$ shown in FIG. 8 as an example. In FIG. 8, $R_{11}$, $R_{13}$, $R_{31}$ and $R_{33}$ indicate R pixels with pixel coordinates (x (horizontal location), y (vertical location))=(1, 1), (1, 3), (3, 1) and (3, 3), respectively. On the other hand, $B_{22}$, $B_{24}$, $B_{42}$ and $B_{44}$ indicate B pixels with pixel coordinates (2, 2), (2, 4), (4, 2) and (4, 4), respectively. All of these R and B pixels are non-polarization pixels.

Furthermore, $(G1)_{12}$, $(G3)_{14}$, $(G2)_{21}$, $(G4)_{23}$, $(G3)_{32}$, $(G2)_{34}$, $(G4)_{41}$, and $(G1)_{43}$ indicate a G1 pixel with pixel coordinates (1, 2), a G3 pixel with pixel coordinates (1, 4), a G2 pixel with pixel coordinates (2, 1), a G4 pixel with pixel coordinates (2, 3), a G3 pixel with pixel coordinates (3, 2), a G2 pixel with pixel coordinates (3, 4), a G4 pixel with pixel coordinates (4, 1), and a G1 pixel with pixel coordinates (4, 3), respectively. The G1 through G4 pixels are four types of polarization pixels, of which the polarization main axes have mutually different directions.

$R_{11}$ and the other signs shown in FIG. 8 are used to indicate the pixel locations and show the intensities measured at those pixel locations.

As shown in FIG. 8, at the neighboring four-connected positions surrounding the non-polarization pixel R33 encircled, four types of polarization pixels with mutually different polarization main axis directions, namely, $(G1)_{43}$, $(G2)_{34}$, $(G3)_{32}$ and $(G4)_{23}$, are arranged. All of these four polarization pixels G are located spatially so close to the non-polarization pixel R33 that polarization information about the non-polarization pixel R33 can be obtained based on the polarization information collected from these four polarization pixels G.

Figure 9:
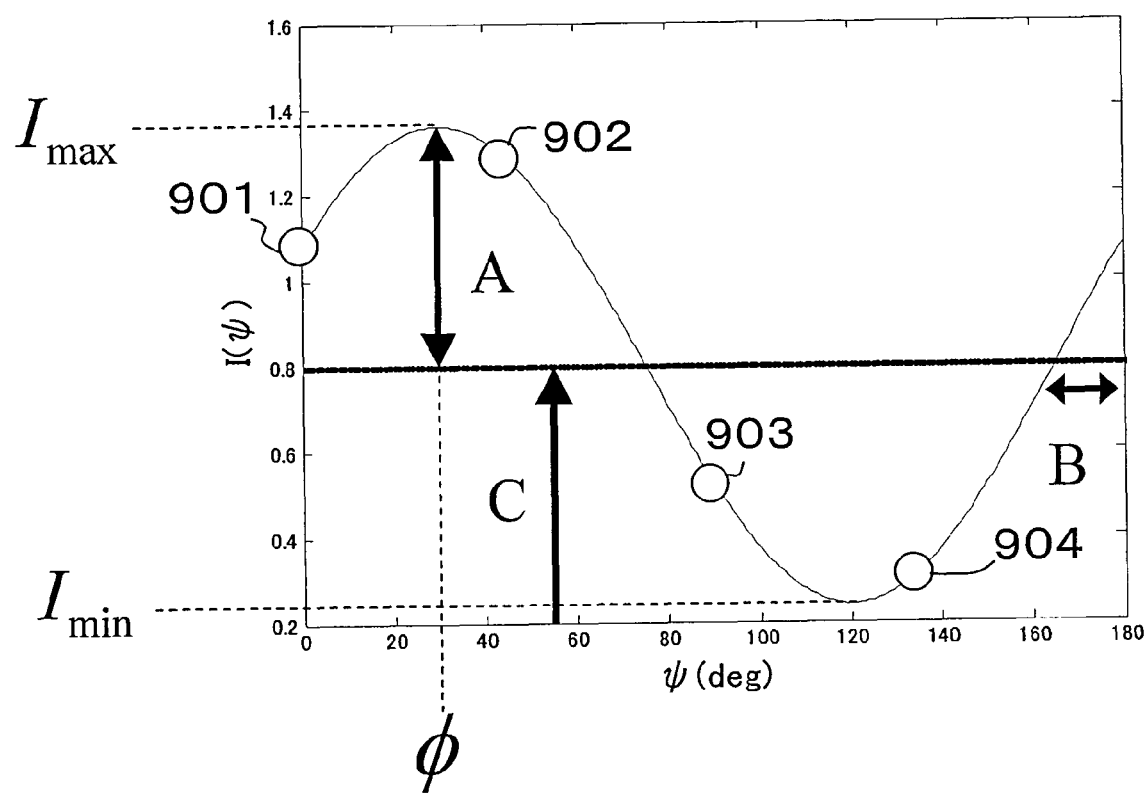
FIG. 9 shows an intensity variation that looks like a sinusoidal function and measuring intensity points in the first preferred embodiment.

FIG. 9 shows the intensities 901 through 904 of G light rays that have been transmitted through four types of polarizers, of which the polarization main axes (with Ψi=0, 45, 90 and 135 degrees, respectively) are defined in four different directions. In this example, if the angle of rotation ϕ of the polarization main axis is $\phi_i$, then the intensity measured will be identified by $I_i$, where i is an integer that falls within the range of 1 to N and N is the number of samples. In the example shown in FIG. 7, N=4, and therefore, i=1, 2, 3 or 4. In FIG. 9, the intensities 901 through 904 associated with the four G pixel samples ($\phi_i$, $I_i$) are shown.

The relation between the angle Ψi of the polarization main axis and the intensities 901 through 904 is represented by a sinusoidal function. In FIG. 9, all of the four points representing the intensities 901 through 904 are illustrated as being located right on a single sinusoidal curve. However, the sinusoidal function is determined as the optimum values by a minimum square method with respect to the four points representing the intensities that were actually measured.

As used herein, the "polarization information" means information about the degree of modulation of the amplitude ρ of such a sinusoidal curve, representing the degree of dependence of the intensity on the angle of the polarization main axis, and the phase information ϕ thereof.

The intensity measured on a polarizer unit with respect to the polarization main axis angle ψ (see FIG. 3) is represented by the following Equation (1):

$$I(\psi) = A \cdot \sin 2(\psi - B) + C \quad \text{Equation (1)}$$

In this case, A, B and C are constants as shown in FIG. 9 and respectively represent the amplitude, phase and average of the curve showing a variation in polarized light intensity. Equation (1) can be expanded as in the following Equation (2):

$$I(\psi) = a \cdot \sin 2\psi + b \cdot \cos 2\psi + C \quad \text{Equation (2)}$$

In this case, A and B are given by the following Equations (3) and (4), respectively:

$$A = \sqrt{a^2 + b^2}, \quad \sin(-2B) = \frac{b}{\sqrt{a^2 + b^2}}, \quad \text{Equations (3)}$$
$$\cos(-2B) = \frac{a}{\sqrt{a^2 + b^2}}$$

$$B = -\frac{1}{2}\tan^{-1}\left(\frac{b}{a}\right) \quad \text{Equation (4)}$$

The sinusoidal function represented by Equation (1) can be determined if A, B and C that will minimize the following Equation (5) can be obtained with respect to the four pixel samples ($\phi_i$, $I_i$), where $I_i$ represents the intensity measured when the polarizer has an angle of rotation $\psi_i$ and N represents the number of samples (i.e., four in this example):

$$f(a, b, C) = \sum_{i=1}^{N}(I_i - a \cdot \sin 2\psi_i - b \cdot \cos 2\psi_i - C)^2 \quad \text{Equation (5)}$$

In this case, only when the polarization main axes of the polarizer units identified by the numerals "1" through "4" have angles ϕi=0, 45, 90 and 135 degrees, the result of Equation (5) can be obtained directly based on the measured intensity without using the minimum square method as represented by the following Equations (6) to (8):

$$A = \frac{1}{2}\sqrt{(I_1 - I_3)^2 + (I_2 - I_4)^2} \quad \text{Equation (6)}$$

$$B = \frac{1}{2}\tan^{-1}\left(\frac{I_1 - I_3}{I_2 - I_4}\right) \quad \text{Equation (7)}$$

$$C = \frac{1}{4}(I_1 + I_2 + I_3 + I_4) \quad \text{Equation (8)}$$

By performing these processing steps, the three parameters A, B and C can be approximated by the sinusoidal function. In this manner, a degree-of-polarization image representing the degree of polarization ρ and a polarization phase image representing the polarization phase φ can be obtained for each pixel. Specifically, the degree of polarization ρ represents how much the light in a pixel of interest has been polarized, while the polarization phase φ represents an angular position at which the approximated sinusoidal function shown in FIG. 9 has the maximum value. This angle represents the angle of a plane, including a surface normal to the object, within an image plane in a situation where the light reflected from the object has produced internal diffuse reflection. It should be noted that the polarization main axis angles of 0 and 180 degrees (π) are the same as each other.

The values ρ and φ (where $0 \leq \phi \leq \pi$) are calculated by the following Equations (9) and (10), respectively:

$$\rho = \frac{I_{max} - I_{min}}{I_{max} + I_{min}} = \frac{A}{C} \quad \text{Equation (9)}$$

$$\phi = \frac{\pi}{4} + B \quad \text{Equation (10)}$$

Color Intensity Interpolation at R Pixel Location

For an R pixel, the color intensities to be obtained by interpolation are the intensities of B and G. As to the B intensity, the average of the intensities of the B pixels that are located at the four neighboring eight-connected positions surrounding $R_{33}$ shown in FIG. 8 is regarded as an interpolated B intensity.

$$\hat{B}_{33} = (B_{22} + B_{24} + B_{42} + B_{44})/4 \quad \text{Equation (11)}$$

As to the G intensity, on the other hand, the average of the intensities of the four G pixels (polarization pixels) that are located at the neighboring four-connected positions surrounding $R_{33}$ is calculated. If the intensities of all (180/θ) types of (i.e., 180 degrees divided by the gap angle θ) polarization pixels are all added up and then the average thereof is calculated, then the intensities at two sample points with two opposite phases on the sinusoidal function (such as the intensities at the sample points 901 and 903 or at the sample points 902 and 904 in FIG. 9) are added together and averaged. That is why the average becomes equal to the average C of the sinusoidal function. That is to say, as the average intensity is calculated with the influence of the variation in intensity due to polarization canceled, this average intensity may be regarded as the interpolated G intensity. Nevertheless, as the intensity of light that has been transmitted through a polarizer decreases to a half compared to the light that has not been transmitted through the polarizer, the intensity should be doubled to say the least.

In the foregoing description, the maximum transmittance T of a polarizer unit is supposed to be one (i.e., 100%) for the sake of simplicity. That is why the G intensity value of the light that has not been transmitted through a polarizer is supposed to be equal to the average intensity, from which the influence of polarization is canceled after the light has been transmitted through the polarizer. In an actual polarizer unit that cannot realize a transmittance of 100%, however, the interpolated G intensity value needs to be corrected with the maximum transmittance T of the polarizer unit as represented by the following Equation (12):

$$\hat{G}_{33} = [((G1)_{43} + (G2)_{34} + (G3)_{32} + (G4)_{23})/4T] \times 2 \quad \text{Equation (12)}$$

It should be noted that these interpolation equations are based on linear interpolation. The Bayer type mosaic filter may also be interpolated by a conventional method using an intensity gradient, for example. That is why the interpolation can be done with even higher precision by appropriately adopting any of those alternative methods.

Polarization Information at B Pixel Location

Take $B_{22}$ shown in FIG. 8 as an example. The B pixel $B_{22}$ is surrounded with four polarization pixels $(G1)_{12}$, $(G2)_{21}$, $(G3)_{32}$ and $(G4)_{23}$, which have mutually different polarization main axis directions. That is why the polarization information can be obtained by the same method as the one already described for an R pixel.

Color Intensity Interpolation at B Pixel Location

For a B pixel, the color intensities to be obtained by interpolation are the intensities of R and G. As to the R intensity, the average of the intensities of the R pixels that are located at the four neighboring eight-connected positions surrounding $B_{22}$ shown in FIG. 8 is regarded as an interpolated R intensity as represented by the following Equation (13):

$$\hat{R}_{22} = (R_{11} + R_{13} + R_{31} + R_{33})/4 \quad \text{Equation (13)}$$

As for the G intensity, an interpolated G intensity may be obtained by calculating the average of the respective intensities of the four types of polarization pixels and canceling the polarization effect as represented by the following Equation (14):

$$\hat{G}_{22} = [((G1)_{12} + (G2)_{21} + (G3)_{32} + (G4)_{23})/4T] \times 2 \quad \text{Equation (14)}$$

It should be noted that these interpolation equations are based on linear interpolation. However, the interpolation can be done with even higher precision by appropriately adopting any of the alternative conventional methods as described above.

Polarization Information at G Pixel Location

Figure 10:
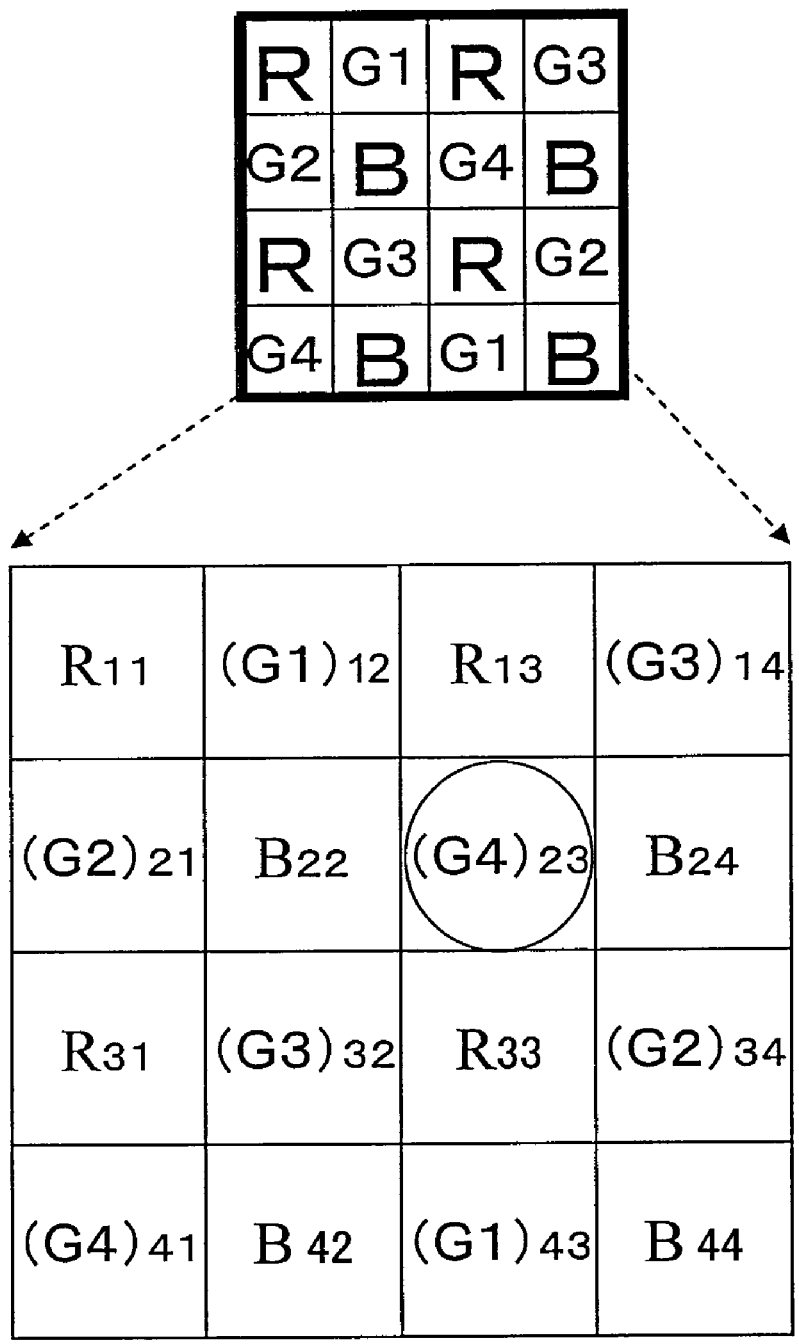
FIG. 10 illustrates a G pixel and its surrounding pixels in the first preferred embodiment.

Take $(G4)_{23}$ shown in FIG. 10 as an example. The subscripts shown in FIG. 10 have the same meaning as the ones shown in FIG. 8.

$(G4)_{23}$ is surrounded with four polarization pixels $(G1)_{12}$, $(G3)_{14}$, $(G3)_{32}$ and $(G2)_{34}$, which have mutually different polarization main axis directions, at the neighboring eight-connected positions. That is why the polarization information can be obtained by plotting the intensity curve shown in FIG. 9 based on the intensities measured on these polarization pixels. However, unlike the R and B pixels, two polarization pixels G3 of the same type are included, and therefore, two pieces of the same polarization information are contained. For that reason, one of the following two methods may be adopted.

One way is to discard one of the two pieces of information about $(G3)_{14}$ and $(G3)_{32}$ and use only information about the remaining four different units of the patterned polarizer. In that case, just like the pixels in the other colors, the intensity curve is determined by Equations (6) to (8). This method is advantageous in that the calculations can be simplified.

The other method is to determine the intensity curve by the minimum square method of Equation (5) based on the intensities measured at the five points including the two redundant ones.

Color Intensity at G Pixel Location

A G pixel is a pixel with a polarizer unit. That is why at that pixel location, not just R and B intensities but also its own G intensity should be calculated as well.

First, it will be described how to obtain the R and B intensities by interpolation. As can be seen from FIG. 4, each G pixel is always surrounded with R and B pixels, which are respectively located over, under, on the right and on the left of that G pixel. Take $(G4)_{23}$ shown in FIG. 10 as an example again. There are two R pixels over and under the $(G4)_{23}$ pixel and two B pixels on the right and left of the $(G4)_{23}$ pixel, respectively. That is why by averaging the intensities of the two R pixels and those of the two B pixels, the average R intensity and the average B intensity at the $(G4)_{23}$ pixel location can be obtained. That is to say, as for R and B intensities at a G pixel location, linear interpolations can be made as represented by the following Equation (15):

$$\hat{R}_{23}=(R_{13}+R_{33})/2 \quad \hat{B}_{23}=(B_{22}+B_{24})/2 \qquad \text{Equations (15)}$$

Next, it will be described how about the G intensity.

There are no G pixels that should be available for interpolation either at the neighboring four-connected positions or the neighboring eight-connected positions surrounding the given G pixel. That is why using interpolated G values at the R and B pixel locations on which interpolation has already been done, the interpolation may be made as represented by the following Equation (16):

$$\hat{G}_{23}=(\hat{G}_{13}+\hat{G}_{22}+\hat{G}_{33}+\hat{G}_{24})/4 \qquad \text{Equation (16)}$$

Hereinafter, it will be described with reference to FIG. 11 how the color mosaic interpolation section 102 shown in FIG. 1 operates.

First of all, the color mosaic image data that has been obtained by the color and polarization obtaining section 101 is supposed to be stored in the mosaic image frame memory 107. In Step S1101, not only the next pixel of interest in the mosaic image but also the intensities of the pixels located at the neighboring four-connected positions thereof are read.

Next, in Step S1102, it is determined whether or not the pixel of interest is an R pixel. If the answer is YES, the process advances to Step S1103, in which the B and G intensities are obtained by interpolation using Equations (11) and (12) and then the interpolated intensities are stored on the B and G planes at the location of the pixel of interest in the color image frame memory 104. At the same time, the R intensity of the pixel of interest is stored as it is on the R plane. As a result, the full color intensities of (RGB) are all stored in the color image frame memory 104.

Next, in Step S1104, it is determined whether or not the pixel of interest is a B pixel. If the answer is YES, the process advances to Step S1105, in which the R and G intensities are obtained by interpolation using Equations (13) and (14) and then the interpolated intensities are stored on the R and G planes at the location of the pixel of interest in the color image frame memory 104. At the same time, the B intensity of the pixel of interest is stored as it is on the B plane. As a result, the full color intensities of (RGB) are all stored in the color image frame memory 104.

Subsequently, if the pixel of interest is a G pixel, the process advances to Step S1106, in which the R and G intensities are obtained by interpolation using Equation (15) and then the interpolated R and G intensities are stored. In this processing step, as the intensities of the surrounding G pixels have not been interpolated, the interpolation cannot be made on G. This series of processing steps is repeatedly performed until it is determined in Step S1107 that every pixel has been processed.

Thereafter, in Step S1108, a pixel, of which the G intensity is yet to be determined, and the fixed intensities of its surrounding G pixels are obtained from the color image frame memory 104 after the interpolation has been done. Then in Step S1109, the G pixel intensity is interpolated by Equation (16) and the interpolated G pixel intensity is stored in the color image frame memory 104 again. These two processing steps are repeatedly performed until it is determined in Step S1110 that the G intensity of every G pixel included in the image has been fixed.

As a result of these processing steps, data about a color intensity image I (x, y), including the (RGB) intensity values of the respective pixels, is generated in the color image frame memory 104. The size of this image I (x, y) becomes equal to that of the color mosaic image as can be seen from its generation process. As a result, a full-color image that realizes color reproducibility, comparable to that of an interpolated image using a normal single-chip color mosaic, in spite of the presence of polarizer units and yet does not result in decreased resolution can be generated by interpolation.

Hereinafter, it will be described with reference to FIG. 12 how the polarization information processing section 103 shown in FIG. 1 operates.

First of all, the color mosaic image data that has been obtained by the color and polarization obtaining section 101 is supposed to be stored in the mosaic image frame memory 107. In Step S1201, not only the next pixel of interest in the mosaic image but also the pixel intensities at the neighboring four-connected positions are read at the same time. Next, in Step S1202, it is determined whether or not the pixel of interest is an R pixel. If the answer is YES, the process advances to Step S1203, in which using the G1 through G4 pixels located at the neighboring four-connected positions surrounding that R pixel, sinusoidal function parameters are calculated by Equations (6) to (8).

Thereafter, in Step S1204, it is determined whether or not the pixel of interest is a B pixel. If the answer is YES, the process advances to Step S1205, in which using the G1 through G4 pixels located at the neighboring four-connected positions surrounding that B pixel, sinusoidal function parameters are also calculated by Equations (6) to (8).

And if the pixel of interest is a G pixel, sinusoidal function parameters may also be determined at the G pixel location by Equations (6) to (8) using the neighboring G1 through G4 pixels in Step S1206. Alternatively, as two pieces of information about G3 are contained, an intensity variation curve may also be calculated by the minimum square method of Equation (5) based on information about the five points, including the two redundant points.

Next, in Step S1207, the degree of polarization ρ and the polarization phase φ are obtained by Equations (9) and (10) using the sinusoidal function parameters A, B and C that have been determined for each pixel, and then stored in the degree-of-polarization image frame memory 105 and the polarization phase image frame memory 106, respectively, in association with that pixel. This series of processing steps is repeatedly performed until it is determined in Step S1208 that every pixel of the mosaic image frame memory has been processed.

In this manner, data about a degree-of-polarization image ρ (x, y) is generated in the degree-of-polarization image frame memory 105 and data about a polarization phase image φ (x, y) is generated in the polarization phase image frame memory 106. As can be seen from their generation process, the size of these images becomes equal to that of the color mosaic image. As a result, even though the patterned polarizer is provided for only G pixels, polarization information can still be obtained with the same resolution as the full-color image I (x, y).

Figure 11:
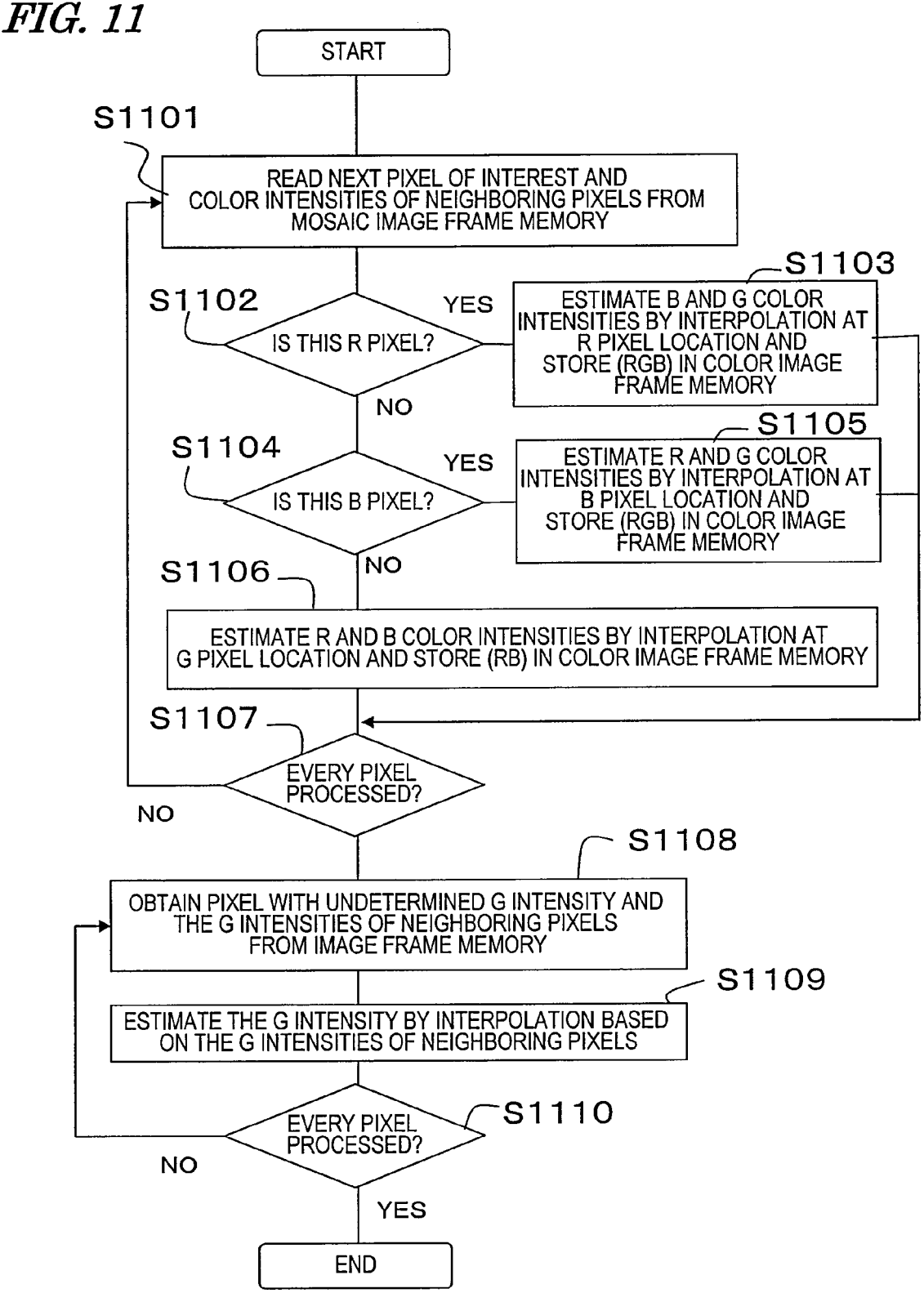
FIG. 11 is a flowchart showing how the color mosaic interpolation section of the first preferred embodiment operates.
Figure 12:
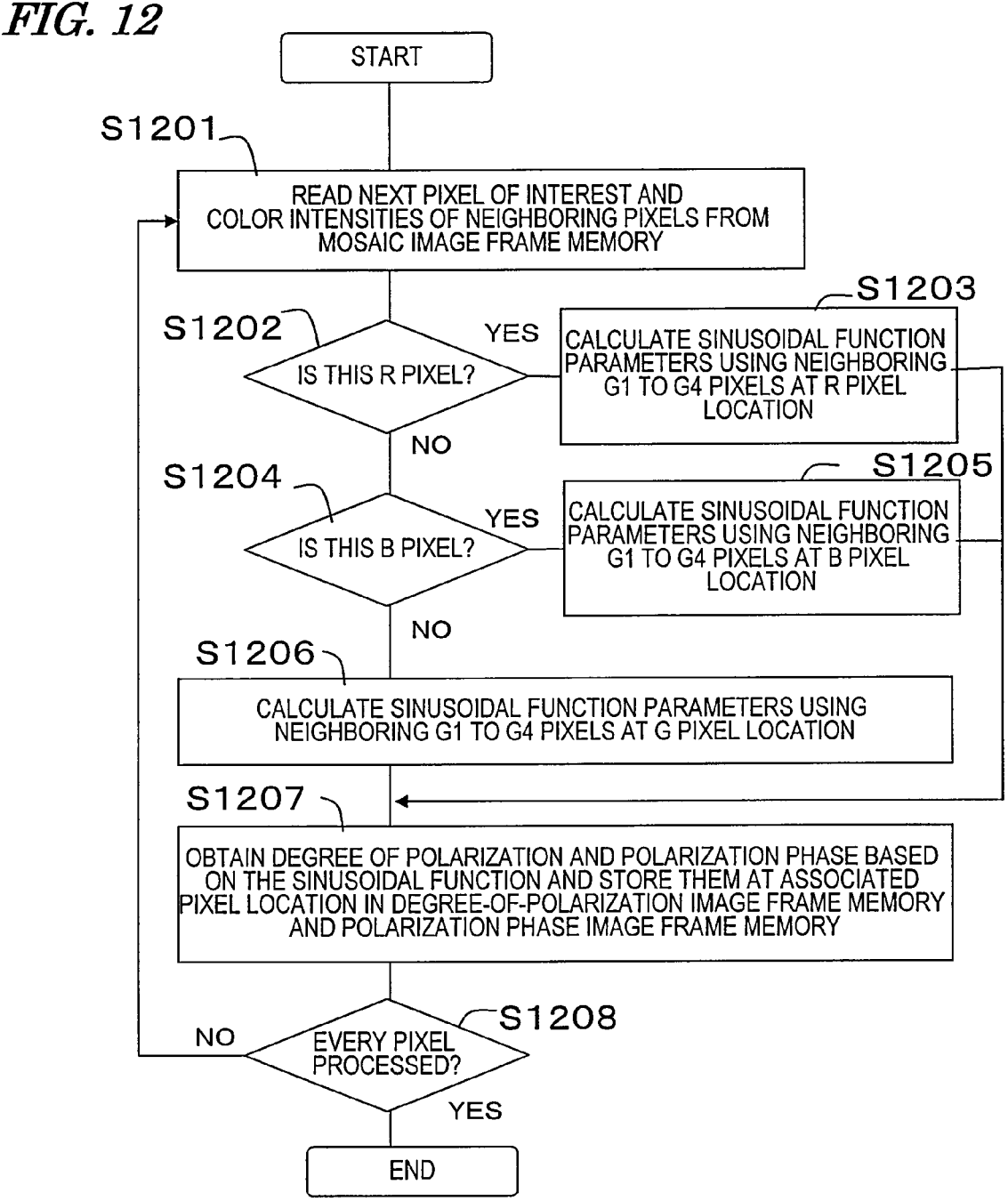
FIG. 12 is a flowchart showing how the polarization information processing section 102 of the first preferred embodiment operates.

The processing procedures shown in FIGS. 11 and 12 are independent of each other, and therefore, may be performed in parallel with each other. Also, these processing procedures may be carried out either by executing a software program or using hardware components.

Furthermore, in the preferred embodiment described above, a patterned polarizer made of photonic crystals is supposed to be used. Alternatively, a film type polarizer, a wire grid type polarizer, or a polarizer operating on any other principle may also be used.

FIG. 13(a) is an input image representing a plastic ball as a spherical object. Meanwhile, FIGS. 13(b) and 13(c) show an exemplary degree-of-polarization image ρ (x, y) and an exemplary polarization phase image φ (x, y) with respect to the object shown in FIG. 13(a). The images shown in FIGS. 13(a) and 13(b) are illustrated so as to increase its lightness as their degree of polarization ρ or polarization phase φ rises.

Figure 14:
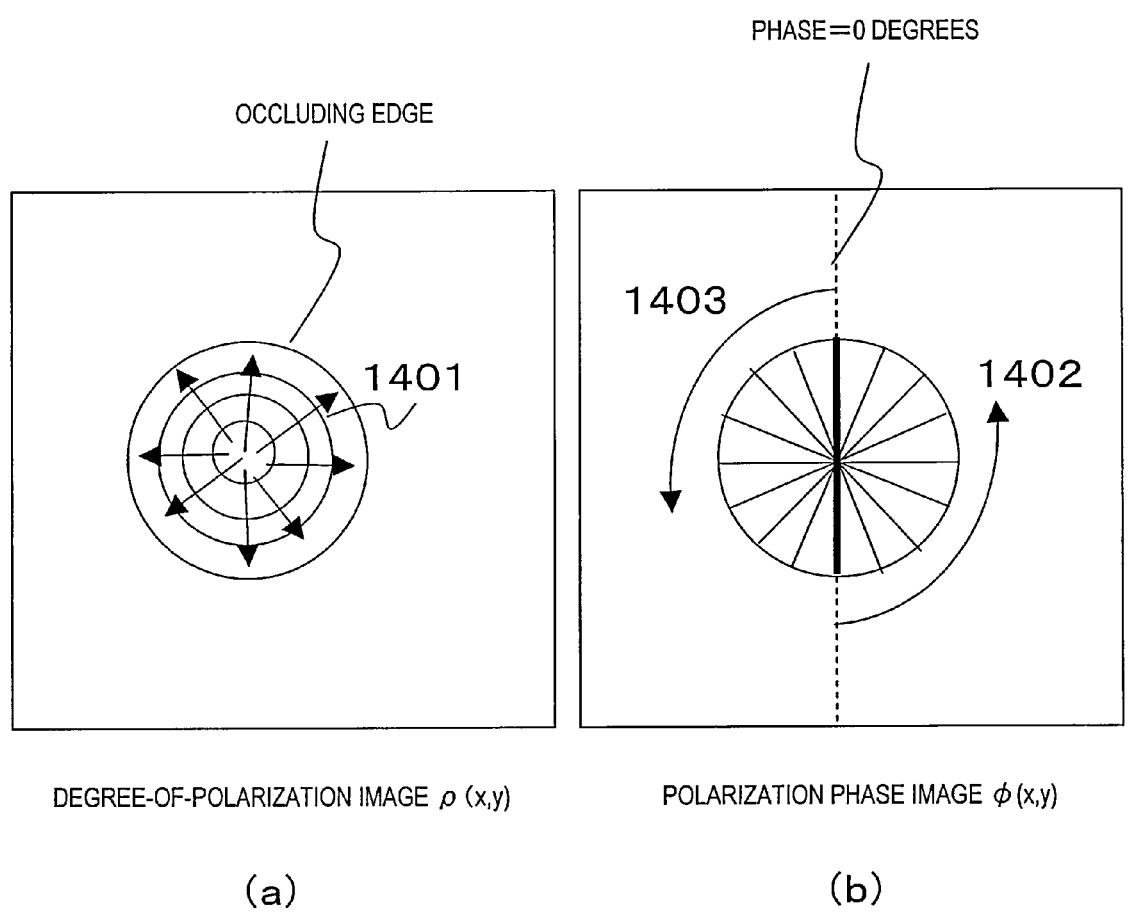
FIGS. 14(a) and 14(b) are schematic representations showing how the numerical values of the object change on the degree-of-polarization image ρ (x, y) and the polarization phase image φ (x, y).

FIGS. 14(a) and 14(b) are schematic representations illustrating the meanings of the images shown in FIGS. 13(b) and 13(c). In the degree-of-polarization image ρ (x, y), the more distant from the approximate center, where the camera's viewing direction agrees with the surface normal defined with respect to the ball, a pixel location becomes in the orientations 1401, the higher the degree of polarization ρ of that pixel. On the other hand, in the vicinity of the occluding edge of the ball (i.e., the boundary between the ball and the background) where the surface normal to the ball forms an angle of almost 90 degrees with respect to the camera's viewing direction, the degree of polarization ρ becomes maximum. In FIG. 14(a), these degrees of polarization ρ are schematically represented by contours.

Meanwhile, it can be seen that in the polarization phase image φ (x, y) shown in FIG. 14(b), the polarization phase increases monotonically counterclockwise in the directions indicated by the arrows 1402 and 1403 around the sphere in regular periods of 180 degrees with respect to the perpendicular line representing the vertical direction of the image that indicates that the phase is zero degrees. According to these polarization information images, it can be seen well that the degree of polarization ρ and the polarization phase φ correspond to the directions of the two degrees of freedom of the surface normal to the object. That is to say, the object's shape can be estimated based on the polarization information.

In this preferred embodiment, a degree-of-polarization image and a polarization phase image are supposed to be output based on the diffuse reflection components of the light reflected from the object. However, these images may also be output based on the specular reflection components thereof. In that case, the polarization phases φ are different by 90 degrees from the ones described above.

Also, the polarization information does not have to be the combination (ρ, φ) described above but may also be any other combination of pieces of information as long as those pieces of information are obtained based on the sinusoidal function shown in FIG. 5 or may even be images generated based on those pieces of information. For example, it is important to separate diffuse and specular reflection components of the object from the polarization information when applying this technique. To carry out this in the present invention, as for the polarized light in the specular reflection area, ρ (x, y) should be multiplied by a constant factor and then the product should be subtracted from the original image. Examples of such images generated in this manner are shown in FIGS. 15(a) through 15(d).

Embodiment 2

Hereinafter, a second preferred embodiment of an image processing apparatus according to the present invention will be described.

The basic configuration of this preferred embodiment is also as shown in the block diagram of FIG. 1. That is why this preferred embodiment will also be described with reference to FIG. 1 when necessary. The image processing apparatus of this preferred embodiment is characterized in that polarizer units that form the patterned polarizer are provided for all of R, G and B pixels.

FIG. 16(a) illustrates a pixel arrangement for the color and polarization obtaining section 101 of this preferred embodiment. Unlike the pixel arrangement of the first preferred embodiment described above, polarizer units are provided for not only G pixels but also R and B pixels as well. In FIG. 16(b), among the R and B pixels that are adjacent to the G pixels, a group of line segments, each connecting a G pixel to another pixel with a polarization main axis that is parallel to that of the G pixel, are added to the arrangement shown in FIG. 16(a).

This arrangement is based on a Bayer type color mosaic filter. At G pixel locations, arranged are four types of polarization pixels G1 through G4, of which the polarization main axis directions are identified by the numerals "1" through "4", respectively. The arrangement of those G1 through G4 pixels is the same as the one shown in FIG. 4. The pixel arrangement of this preferred embodiment is different from the one shown in FIG. 4 in that in addition to providing polarizer units for those G pixels, R1 and R3 with polarization main axis directions of 0 degrees and 90 degrees, respectively, are arranged at the R pixel locations and B2 and B4 with polarization main axis directions of 45 degrees and 135 degrees, respectively, are arranged at the B pixel locations.

This pixel arrangement has the following features.

(2-1) As two types of polarizer units, of which the polarization main axis angles are different from each other by 90 degrees, are provided for R pixels and for B pixels, polarization pixels, of which the polarization phases are also different from each other by 90 degrees, are arranged selectively.

(2-2) At the neighboring four-connected positions surrounding each of the G pixels G1 through G4, there is either a B pixel or an R pixel, of which the polarization main axis has the same angle as that of that G pixel. For example, at the neighboring four-connected positions surrounding G2, there is R2. That is to say, each of the group of line segments shown in FIG. 16(b) shows which two pixels are connected together to form such a pair.

(2-3) At the neighboring four-connected positions of every G pixel G1, G2, G3 or G4, there are four polarization pixels, of which the polarization main axes are identified by the numerals "1", "2", "3" and "4", respectively. In the arrangement shown in FIG. 16, each set of five pixels, including a pixel of interest, is encircled with a dotted line. At the center of such a set of five pixels encircled with a dotted line, there is a G pixel. And at the neighboring four-connected positions surrounding that G pixel, there are R and B polarization pixels. For example, four polarization pixels R1, B2, R3 and B4 are arranged at the neighboring four-connected positions surrounding the G4 pixel, and have polarization main axis angles of 0, 45, 90 and 135 degrees, respectively.

The effect to be achieved by the feature (2-1) is that a normal color intensity can be obtained because if the intensities measured on two polarization pixels, of which the polarization phases are different from each other by 90 degrees, are added together and averaged, the polarization effect is canceled.

The effect to be achieved by the feature (2-2) is that the interpolation represented by Equations (20), (23), (24) and so on can be carried out as will be described later. That is to say, this is an important feature when the polarization information needs to be integrated based on another color intensity value that has already been interpolated at the same pixel location in a situation where there is no surrounding pixel in the same color.

The effect to be achieved by the feature (2-3) is important particularly when the polarization information needs to be figured out with G pixels.

FIGS. 17(a) and 17(b) illustrate another exemplary arrangement having such features. The signs, numerals and groups of line segments shown in FIGS. 17(a) and 17(b) are just as already described with reference to FIGS. 16(a) and 16(b).

In an actual apparatus, a huge number of units, each consisting of 8×8 pixels, are arranged repeatedly both vertically and horizontally.

FIGS. 18(a) through 18(c) are graphs schematically showing the wavelength characteristics of the B, G, R polarization pixels, respectively. In these graphs, the ordinate represents the intensity of the transmitted light and the abscissa represents the wavelength. Each of these B, G and R polarization pixels has such a polarization property that transmits a TM wave in the B, G or R wavelength range and reflects (i.e., not transmits) a TE wave in that wavelength range. The TM wave is a wave in which magnetic field components are transverse to the incident plane, while the TE wave is a wave in which electric field components are transverse to the incident plane.

In FIG. 18(a), shown are the polarization properties 1802 and 1803 of the B polarization pixel and the transmission property 1801 of a B color filter. The polarization properties 1802 and 1803 represent the transmittances of the TM and TE waves, respectively.

In FIG. 18(b), shown are the polarization properties 1805 and 1806 of the G polarization pixel and the transmission property 1804 of a G color filter. The polarization properties 1805 and 1806 represent the transmittances of the TM and TE waves, respectively.

In FIG. 18(c), shown are the polarization properties 1808 and 1809 of the R polarization pixel and the transmission property 1807 of an R color filter. The polarization properties 1808 and 1809 represent the transmittances of the TM and TE waves, respectively.

The properties shown in FIGS. 18(a) through 18(c) are realized by using the photonic crystal disclosed in Non-Patent Document No. 2, for example. When the photonic crystal is used, light, of which the electric field vector oscillating plane is parallel to the groove that has been cut on its surface, becomes a TE wave, and light, of which the electric field vector oscillating plane is perpendicular to the groove on its surface, becomes a TM wave.

What counts in this preferred embodiment is to use a patterned polarizer that exhibits polarization separation ability in each of the B, G and R transmission wavelength ranges as shown in FIGS. 18(a) through 18(c).

In this description, the property of a polarization pixel will be represented by a combination (such as "R1" or "G1") of one of the four numerals "1", "2", "3" and "4" representing the polarization main axis direction of the polarization pixel and one of the three color codes "R", "G" and "B" representing the color of that polarization pixel. For example, the polarization pixels R1 and G1 have the same numeral, and therefore, their polarization main axis directions agree with each other. However, since their RGB codes are different from each other, these are polarization pixels, of which the wavelength ranges of the light to be transmitted are different from each other. In this preferred embodiment, the arrangement of such polarization pixels is realized by the combination of the color filter 201 and the patterned polarizer 202 shown in FIG. 2.

By arranging polarizer units having such properties with their polarization main axis angles adjusted, complex mosaic arrangements about colors and polarization such as the ones shown in FIGS. 16 and 17 are realized. Such wavelength properties are naturally important for the first preferred embodiment described above but are even more important for the second preferred embodiment in which polarizer units are provided for all of R, G and B color pixels.

Figure 21:
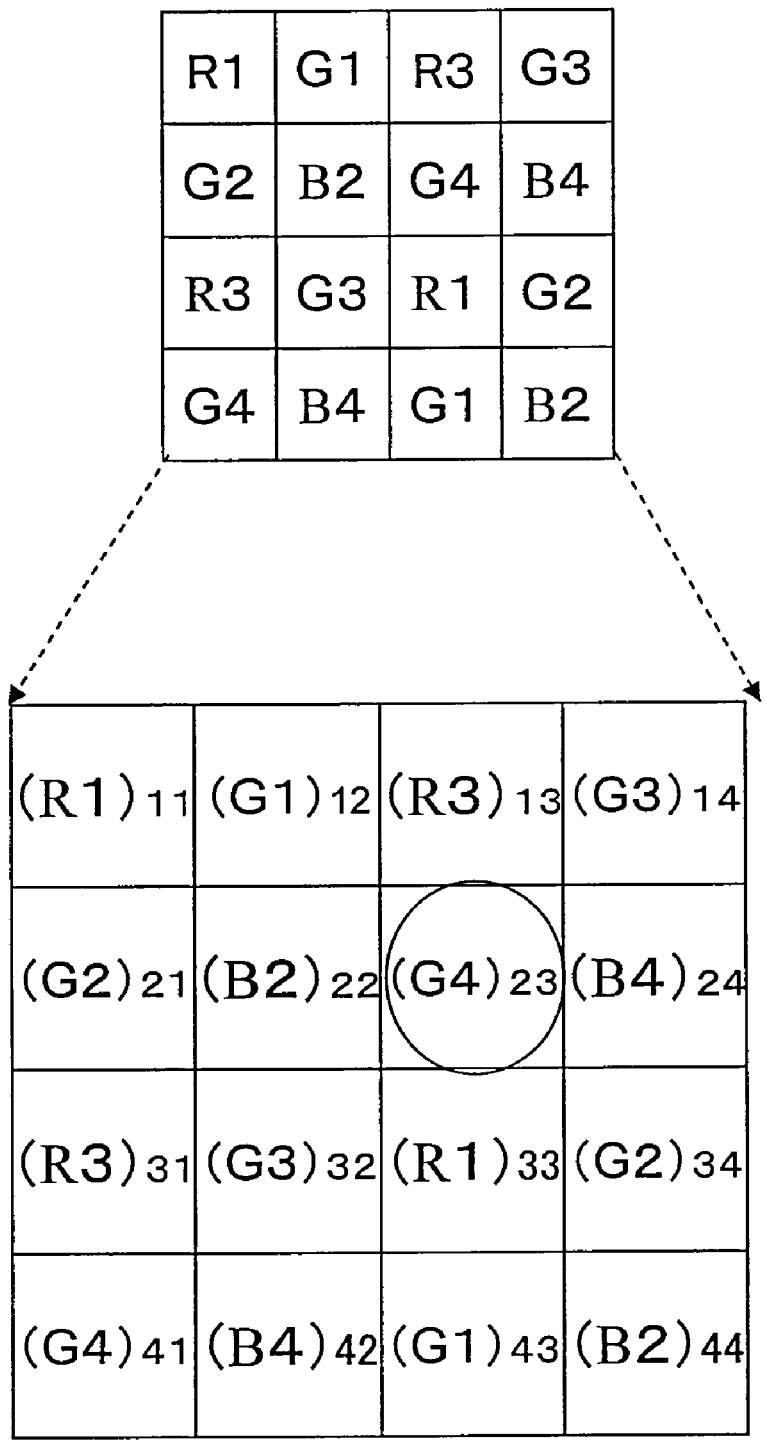
FIG. 21 illustrates a G pixel and its surrounding pixels in the second preferred embodiment.

Hereinafter, the principle and specific processing of obtaining polarization information and color information will be described on the supposition that the patterned polarizer has the arrangement shown in FIGS. 19 and 21. Each of FIGS. 19 and 21 shows a block consisting of 4×4=16 pixels, which is extracted from the upper left corner of the arrangement shown in FIG. 16 and to which subscripts (x, y) representing the two-dimensional pixel locations are added.

Polarization Information at R Pixel Location

Figure 19:
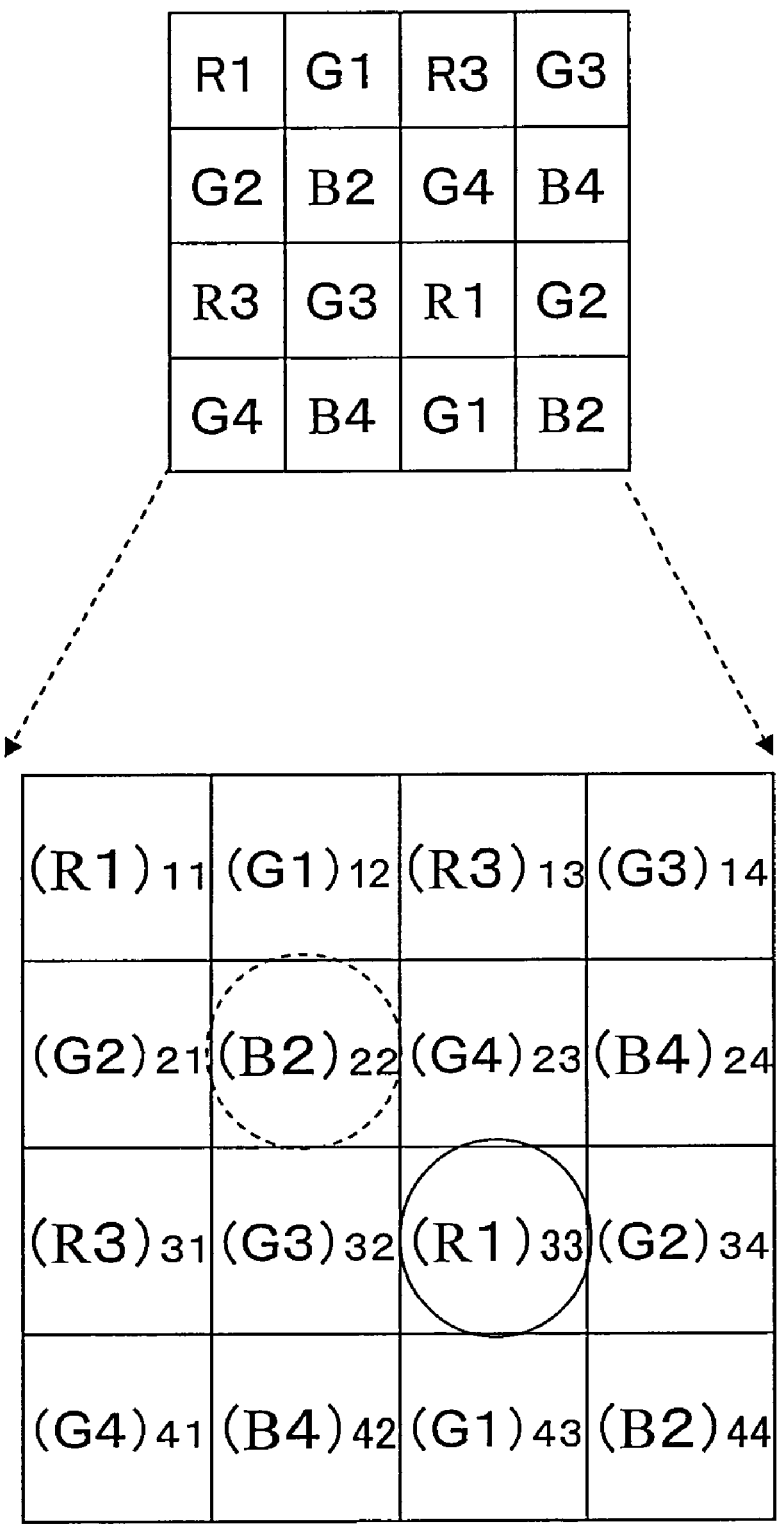
FIG. 19 illustrates an R pixel and its surrounding pixels and a B pixel and its surrounding pixels in the second preferred embodiment.

Take $(R1)_{33}$ shown in FIG. 19 as an example.

In FIG. 19, $(R1)_{11}$, $(R3)_{13}$, $(B2)_{22}$ and so on represent a polarization pixel R1 with vertical and horizontal coordinates (x, y)=(1, 1), a polarization pixel R3 with coordinates (1, 3), a polarization pixel B2 with coordinates (2, 2), etc. These signs are supposed to represent not only pixels as described above but also the magnitudes of intensities measured at those pixels in mathematical equations.

At the neighboring four-connected positions surrounding $(R1)_{33}$, arranged are four types of polarization pixels $(G1)_{43}$, $(G2)_{34}$, $(G3)_{32}$ and $(G4)_{23}$ having the same color but mutually different polarization main axis angles. As in the method that has already been described for the first preferred embodiment, polarization information at $(R1)_{33}$ can be obtained based on the intensities measured at those polarization pixels. This statement applies not only to the R pixel at the location identified by $(R1)_{33}$ but also to every R pixel at the location identified by R1 or R3.

Intensity at R Pixel Location

In this preferred embodiment, each R pixel is provided with a polarizer unit. That is why at each R pixel, all color intensities, i.e., not just G and B intensities but also R intensity as well, need to be estimated.

The G intensity can be obtained using the four pixels G1 to G4 that surrounds the R pixel. The intensity measured at each of these four pixels G1 to G4 is the intensity of a G ray that has been transmitted through a polarizer unit. However, as the polarization main axis angles of these four pixels G1 through G4 are different from each other by 45 degrees, the polarization effect is canceled and the average intensity of the G ray can be obtained by performing the operation of averaging the intensities measured at those pixels.

In the foregoing description, the maximum transmittance T of a polarizer unit is supposed to be one (i.e., 100%) for the sake of simplicity. That is why the G intensity value of the light that has not been transmitted through a polarizer is supposed to be equal to the average intensity, from which the effect of polarization is canceled after the light has been transmitted through the polarizer. In an actual polarizer unit that cannot realize a transmittance of 100%, however, the interpolated G intensity value needs to be corrected with the maximum transmittance T of the polarizer unit. And the interpolated G intensity value at the pixel location $(R1)_{33}$ is calculated by the following Equation (17):

$$\hat{G}_{33}=[((G1)_{43}+(G2)_{34}+(G3)_{32}+(G4)_{23})/4T]\times 2 \qquad \text{Equation (17)}$$

In the same way, the B intensity can also be obtained with the polarization effect canceled by the averaging operation because there are B2 and B4 pixels, of which the phases are different from each other by 90 degrees, at the neighboring eight-connected pixels surrounding the R pixel. In this case, using the maximum transmittance T of B ray for a polarizer unit, the interpolated B intensity value at the pixel location $(R1)_{33}$ is represented by the following Equation (18):

$$\hat{B}_{33}=[((B2)_{22}+(B2)_{44}+(B4)_{24}+(B4)_{42})/4T]\times 2 \qquad \text{Equation (18)}$$

In this example, the maximum transmittance T of the polarizer unit is designed to be the same for R, G and B. However, this is not an essential requirement for the present invention.

Next, it will be described how to interpolate the R intensity. The R pixel is surrounded with no R polarization pixels available for interpolation. For that reason, in this preferred embodiment, the polarization information distributed in colors is integrated. Hereinafter, it will be described how to get that integration done.

Figure 20:
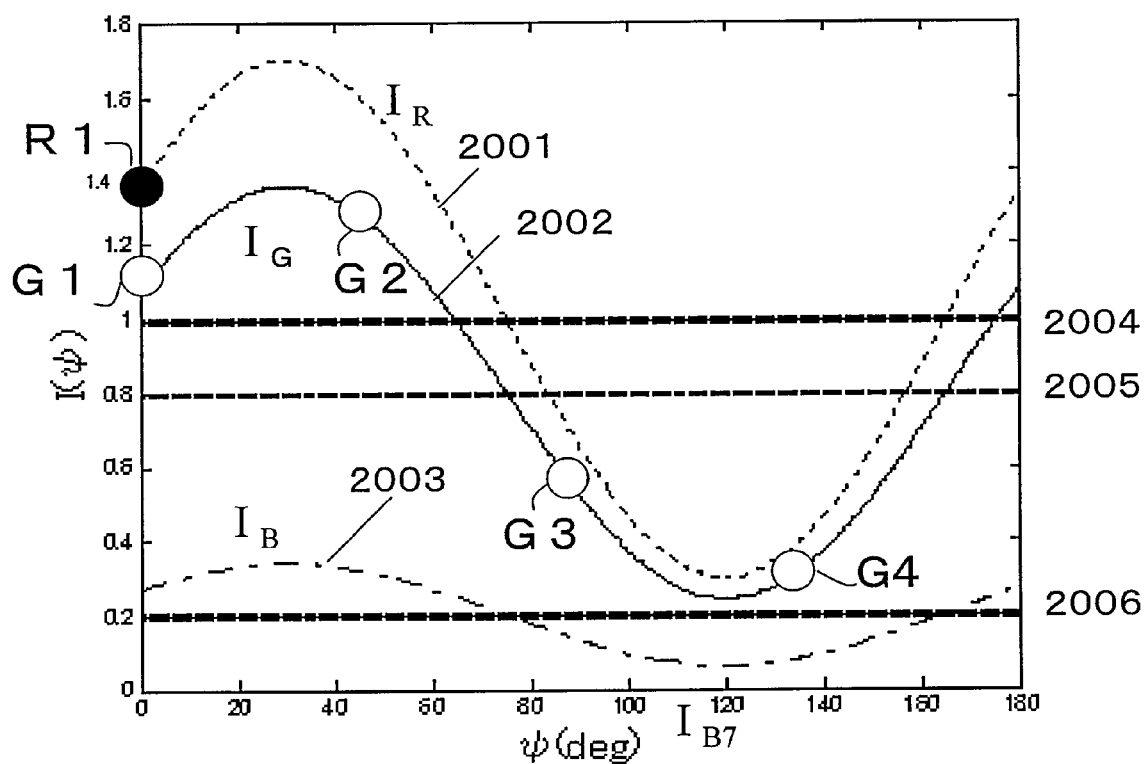
FIG. 20 illustrates how to estimate color intensities based on polarization information in the second preferred embodiment.

The curves 2001, 2002 and 2003 shown in FIG. 20 represent R, G and B intensity variations, respectively. In this graph, the ordinate represents the intensity I and the abscissa represents the polarization main axis angle ψ. In FIG. 20, the solid circle R1 indicates the value of the intensity measured at $(R1)_{33}$ shown in FIG. 19 and the open circles G1, G2, G3 and G4 indicate the values of intensities measured at the four G pixels surrounding the $(R1)_{33}$ pixel. In this case, the maximum transmittance of the polarizer unit is supposed to be 100%. The lines 2004, 2005 and 2006 represent average R, G and B intensities (i.e., the average intensities to be measured in a situation where no polarizers are provided).

There are various types of objects in nature. However, supposing the object is a non-metallic dielectric, the property of reflected light, produced by irradiating the object with illumination, is described by Fresnel reflection formula. That is why no matter whether the type of reflection is specular reflection or diffuse reflection, the property of the polarized light does not vary significantly between the R, G and B wavelength ranges. That is to say, all of the sinusoidal functions representing the R, G and B intensity variations have a period of 180 degrees and vary in the same phase. That is why using Equation (9) defining the degree of polarization ρ, $I_R$ (ψ), $I_G$ (ψ) and $I_B$ (ψ) representing the R, G and B intensity variations are given by the following Equations (19):

$$I_R(\psi)\bar{I}_R+A_R\sin(2\psi-2B)=\bar{I}_R[1+\rho\sin(2\psi-2B)]$$

$$I_G(\psi)\bar{I}_G+A_G\sin(2\psi-2B)=\bar{I}_G[1+\rho\sin(2\psi-2B)]$$

$$I_B(\psi)\bar{I}_B+A_B\sin(2\psi-2B)=\bar{I}_B[1+\rho\sin(2\psi-2B)] \qquad \text{Equations (19)}$$

The refractive index η and the angles of incidence and emittance of light are substantially constant between R, G and B, and therefore, the degree of polarization ρ is also constant between R, G and B. That is why the variable parts of the three sinusoidal functions in Equations (19) are common between R, G and B.

As a result, the intensity ratio of the three polarized light intensity curves 2001, 2002 and 2003 shown in FIG. 20 becomes equal to the ratio of the average intensities 2004, 2005 and 2006. That is to say, the intensity ratio of R1 to G1 is equal to the intensity ratio of R to G.

By taking advantage of this property, the average R intensity (i.e., ideal intensity in a situation where there is no patterned polarizer) can be estimated by multiplying the interpolated G intensity value already obtained (i.e., the value given by Equation (17)) by the ratio of the intensity value of the R1 pixel to that of the G1 pixel, which is adjacent to the R1 pixel. The effect of the maximum transmittance T is already included in the interpolated G intensity value. Therefore, the R intensity at the $(R1)_{33}$ pixel location is represented by the following Equation (20):

$$\hat{R}_{33}=\frac{(R1)_{33}}{(G1)_{43}}\times\hat{G}_{33} \qquad \text{Equation (20)}$$

The case of the R1 pixel has been described as an example. The same method is applicable to R3 pixel, too. That is to say, the intensities of surrounding G and B pixels, of which the polarization main axis angles are different from that of the R3 pixel by 90 degrees, may be obtained by spatial interpolation and the R intensity may be obtained as the ratio of the intensity of the R3 pixel to that of the G3 pixel.

Polarization Information at B Pixel Location

Take $(B2)_{22}$ shown in FIG. 19 as an example. As its polarization information can also be obtained based on the intensities measured at the surrounding G1 through G4 pixels as in an R pixel, the description thereof will be omitted herein.

Color Intensities at B Pixel Location

Take $(B2)_{22}$ shown in FIG. 19 as an example. In this case, the intensities of all three colors of R, G and B need to be obtained.

First of all, as the $(B2)_{22}$ pixel is surrounded with R1 and R3 pixels, of which the polarization main axis angles are different from that of the $(B2)_{22}$ pixel by 90 degrees, the R intensity at $(B2)_{22}$ can be obtained with the polarization effect canceled by averaging the intensities measured at the R1 and R3 pixels as represented by the following Equation (21):

$$\hat{R}_{22}=[((R1)_{11}+(R1)_{33}+(R3)_{13}+(R3)_{31})/4T]\times 2 \qquad \text{Equation (21)}$$

Likewise, the G intensity can be obtained with the polarization effect canceled by averaging the intensities measured at the four surrounding pixels G1 through G4 as represented by the following Equation (22):

$$\hat{G}_{22}=[((G1)_{12}+(G2)_{21}+(G3)_{32}+(G4)_{23})/4T]\times 2 \qquad \text{Equation (22)}$$

It should be noted that the $(B2)_{22}$ pixel is surrounded with no B pixels that can be used to obtain the B intensity by spatial mosaic interpolation. According to the following Equation (23), however, the average B intensity (i.e., ideal intensity in a situation where there is no patterned polarizer) can be determined by the intensity value of B2 based on the relation between the intensity value of G2 and the interpolated G intensity value already obtained:

$$\hat{B}_{22}=\frac{(B2)_{22}}{(G2)_{21}}\times\hat{G}_{22} \qquad \text{Equation (23)}$$

The case of the B2 pixel has been described as an example. The same method is applicable to B4 pixel, too. That is to say, the intensities of surrounding G and R pixels, each of which is a pair of pixels with polarization main axis angles that are different from that of the B4 pixel by 45 and 90 degrees, respectively, may be obtained by spatial interpolation and the B intensity may be obtained as the ratio of the intensity of the B4 pixel to that of the G4 pixel.

Polarization Information at G Pixel Location

Take $(G4)_{23}$ shown in FIG. 21 as an example. There are R1, R3, B2 and B4 pixels at the neighboring four-connected positions surrounding this $(G4)_{23}$ pixel. However, each of the R and B rays has only two polarization main axis angles. Nevertheless, to determine the sinusoidal function parameters A, B and C, intensities need to be measured at three or more different polarization main axis angles. That is why if intensities can be measured only at two polarization main axis angles for the same color, the sinusoidal function parameters cannot be determined. To overcome this problem, Equation (19) is used.

Figure 22:
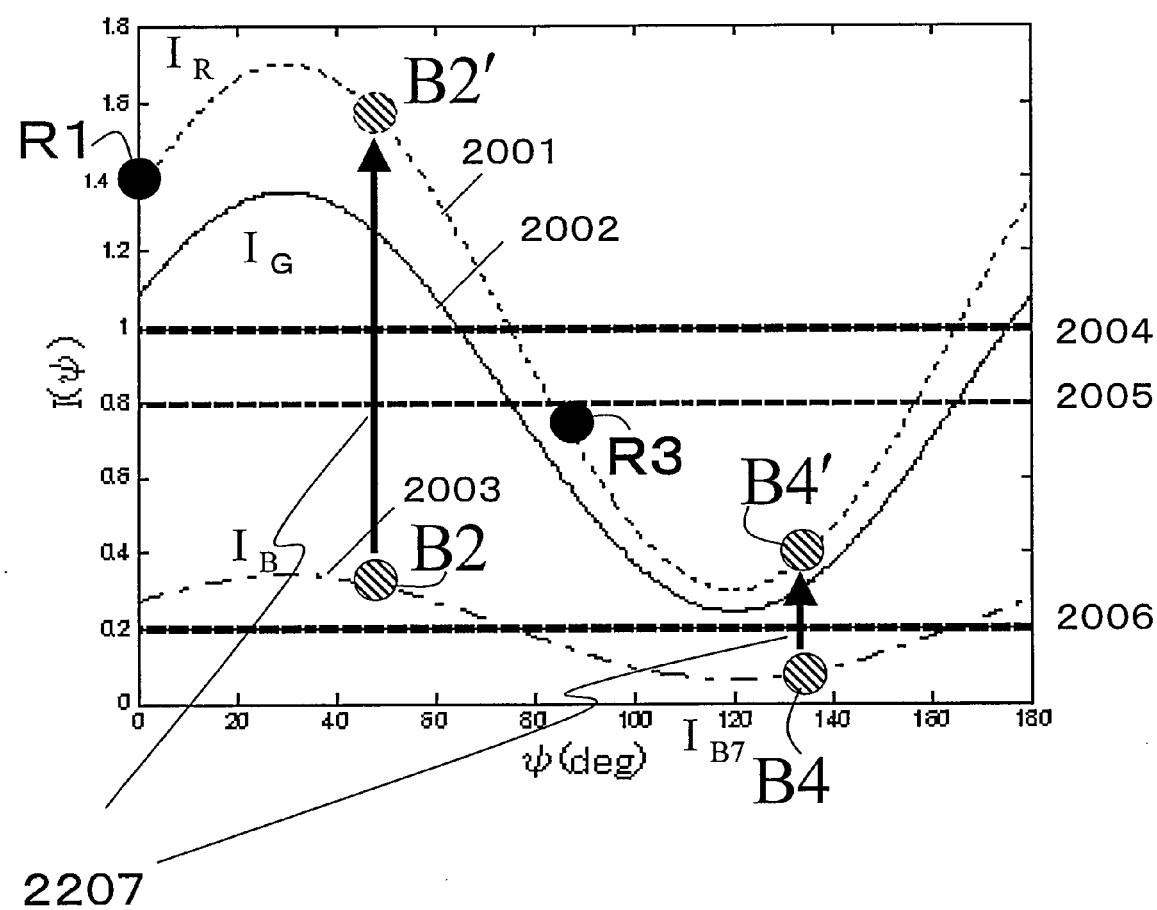
FIG. 22 illustrates how to integrate together pieces of polarization information distributed in respective colors in the second preferred embodiment.

FIG. 22 shows the intensities measured at four polarization pixels that are located at the neighboring four-connected positions surrounding the $(G4)_{23}$ pixel with theoretic sinusoidal function curves. The two solid circles indicate the intensities of R1 and R3 pixels and the two shadowed circles indicate the intensities of $(B2)_{22}$ and $(B4)_{24}$ pixels. As represented by the following Equations (24), the intensities are corrected by multiplying the measured intensities of $(B2)_{22}$ and $(B4)_{24}$ pixels by a coefficient K:

$$(B2')_{22} = K \times (B2)_{22}$$
$$(B4')_{24} = K \times (B4)_{24}$$
$$K = \frac{\hat{R}}{\hat{B}} = \frac{(R1)_{33} + (R3)_{13}}{(B2)_{22} + (B4)_{24}}$$

Equations (24)

As a result of this correction, the four points R1, R3, B2' and B4' can be put on the R curve as indicated by the arrows 2207 shown in FIG. 22. As a sinusoidal curve can be plotted using these four points, polarization information can be obtained based on this sinusoidal curve.

The case of the G4 pixel has been described as an example. However, quite the same statement applies to the other G1 to G3 pixels as well.

Intensity at G Pixel Location

Taking the $(G4)_{23}$ pixel shown in FIG. 21 as an example, the color intensities of R, G and B are estimated by interpolation in the following manner.

First of all, as the $(G4)_{23}$ pixel is vertically sandwiched between R1 and R3 pixels, of which the polarization main axis angles are different from that of the pixel by 90 degrees, the R intensity at $(G4)_{23}$ can be obtained with the polarization effect canceled by averaging the intensities measured at these pixel locations:

$$\hat{R}_{23} = [((R1)_{33} + (R3)_{13})/2T] \times 2$$ Equation (25)

where T is the maximum transmittance of the polarizer units.

Likewise, the B intensity at the $(G4)_{23}$ pixel can be obtained as an interpolated value with the polarization effect canceled by averaging the intensities measured at the B2 and B4 polarization pixels, which are adjacent to the $(G4)_{23}$ pixel on right and left-hand sides:

$$\hat{B}_{23} = [((B2)_{22} + (B4)_{24})/2T] \times 2$$ Equation (26)

Next, it will be described how about the intensity of the G pixel. Since this is a G4 pixel, its intensity can be estimated, based on the intensity of its adjacent B4 pixel and the estimated B intensity, by the following Equation (27):

$$\hat{G}_{23} = \frac{(G4)_{23}}{(B4)_{24}} \times \hat{B}_{23}$$ Equation (27)

The case of the G4 pixel has been described as an example. However, basically the same method is applicable to the other G1 to G3 pixels, too. That is to say, if R and B pixel intensities are obtained by spatial interpolation and if the interpolated R or B intensity is multiplied by a predetermined ratio, then the G pixel intensity can be obtained by interpolation. That ratio is the ratio of the intensity of the G1 pixel to that of the R1 pixel as for the G1 pixel, the ratio of the intensity of the G2 pixel to that of the B2 pixel as for the G2 pixel, and the ratio of the intensity of the G3 pixel to that of the R3 pixel as for the G3 pixel.

Hereinafter, it will be described with reference to FIG. 23 how the color mosaic interpolation section 103 of this preferred embodiment operates.

First of all, the color mosaic image data that has been obtained by the color and polarization obtaining section 101 is supposed to be stored in the mosaic image frame memory 107.

In Step S2301, not only the first pixel of interest but also the intensities of the pixels located at the neighboring four-connected positions thereof are read at the same time from the mosaic image frame memory 107. Next, in Step S2302, it is determined whether or not the pixel of interest is an R pixel. If the answer is YES, the process advances to Step S2303, in which the G and B intensities are obtained by interpolation using Equations (17) and (18). Next, in Step S2304, using the G intensity just obtained by interpolated, the R intensity is obtained by interpolation using Equation (20).

Next, in Step S2305, it is determined whether or not the pixel of interest is a B pixel. If the answer is YES, the process advances to Step S2306, in which the R and G intensities are obtained by interpolation using Equations (21) and (22). Next, in Step S2307, using the G intensity just obtained by interpolation, the B intensity is obtained by interpolation using Equation (23).

If it is determined that the pixel of interest is a G pixel, then the process advances to Step S2308, in which the R and B intensities are obtained by interpolation using Equations (25) and (26). Next, in Step S2309, using the B or R intensity just obtained by interpolation, the G intensity is obtained by interpolation using Equation (27), for example. Then, in Step S2310, the interpolated intensity values of those R, G and B pixels are stored in the color image frame memory 104.

This series of processing steps is repeatedly performed until it is determined in Step S2311 that every pixel of the mosaic image frame memory 107 has been processed.

Hereinafter, it will be described with reference to FIG. 24 how the polarization information processing section 103 of this preferred embodiment operates. First of all, the color mosaic image data that has been obtained by the color and polarization obtaining section 101 is supposed to be stored in the mosaic image frame memory 107.

In Step S2401, not only the next pixel of interest in the mosaic image but also the pixel intensities at the neighboring four-connected positions are read at the same time. Next, in Step S2402, it is determined whether or not the pixel of interest is an R pixel. If the answer is YES, the process advances to Step S2403, in which based on the intensities of the G1 through G4 pixels located at the neighboring four-connected positions surrounding that R pixel location, sinusoidal function parameters are calculated by Equations (6) to (8).

Thereafter, in Step S2404, it is determined whether or not the pixel of interest is a B pixel. If the answer is YES, the process advances to Step S2405, in which based on the intensities of the G1 through G4 pixels located at the neighboring four-connected positions surrounding that B pixel, sinusoidal function parameters are also calculated by Equations (6) to (8). And if the pixel of interest is a G pixel, the sinusoidal function parameters of Equations (6) to (8) may also be determined at the G pixel location by Equation (24) using the intensities of the R1 and R3 pixels located at the neighboring four-connected positions and the interpolated intensities of B2' and B4' pixels, i.e., the intensities of four samples in total.

Next, in Step S2407, the degree of polarization ρ and the polarization phase φ are obtained by Equations (9) and (10) using the sinusoidal function parameters that have been determined for each pixel, and then stored in the degree-of-polarization image frame memory 105 and the polarization phase image frame memory 106, respectively, in association with that pixel.

This series of processing steps is repeatedly performed until it is determined in Step S2408 that every pixel of the mosaic image frame memory has been processed.

In this manner, data about a degree-of-polarization image ρ (x, y) is generated in the degree-of-polarization image frame memory 105 and data about a polarization phase image φ (x, y) is generated in the polarization phase image frame memory 106. As can be seen from their generation process, the size of these images becomes equal to that of the color mosaic image. As a result, polarization information can be obtained with the same resolution as the full-color image I (x, y).

Figure 23:
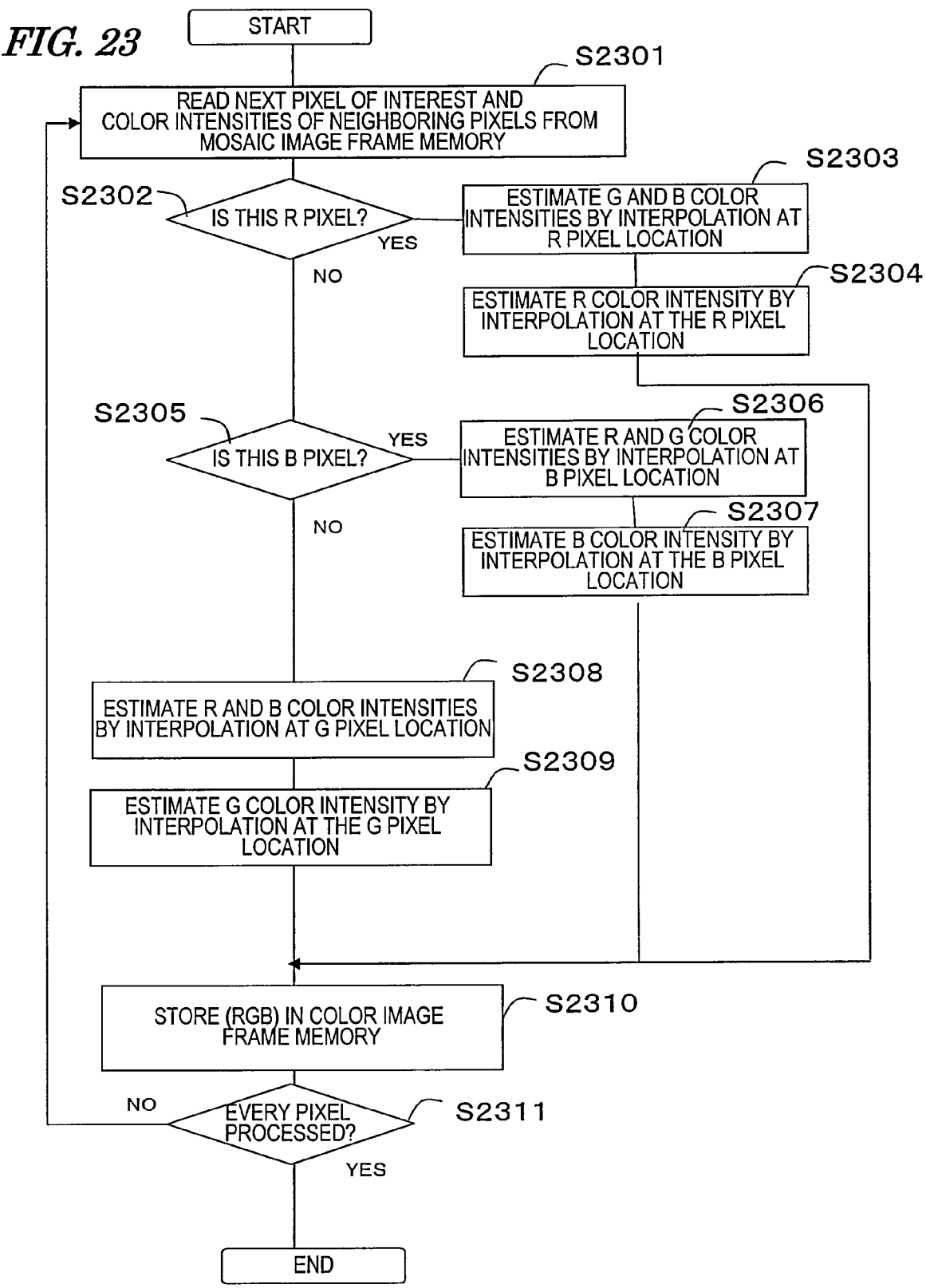
FIG. 23 is a flowchart showing how the color mosaic interpolation section of the second preferred embodiment operates.
Figure 24:
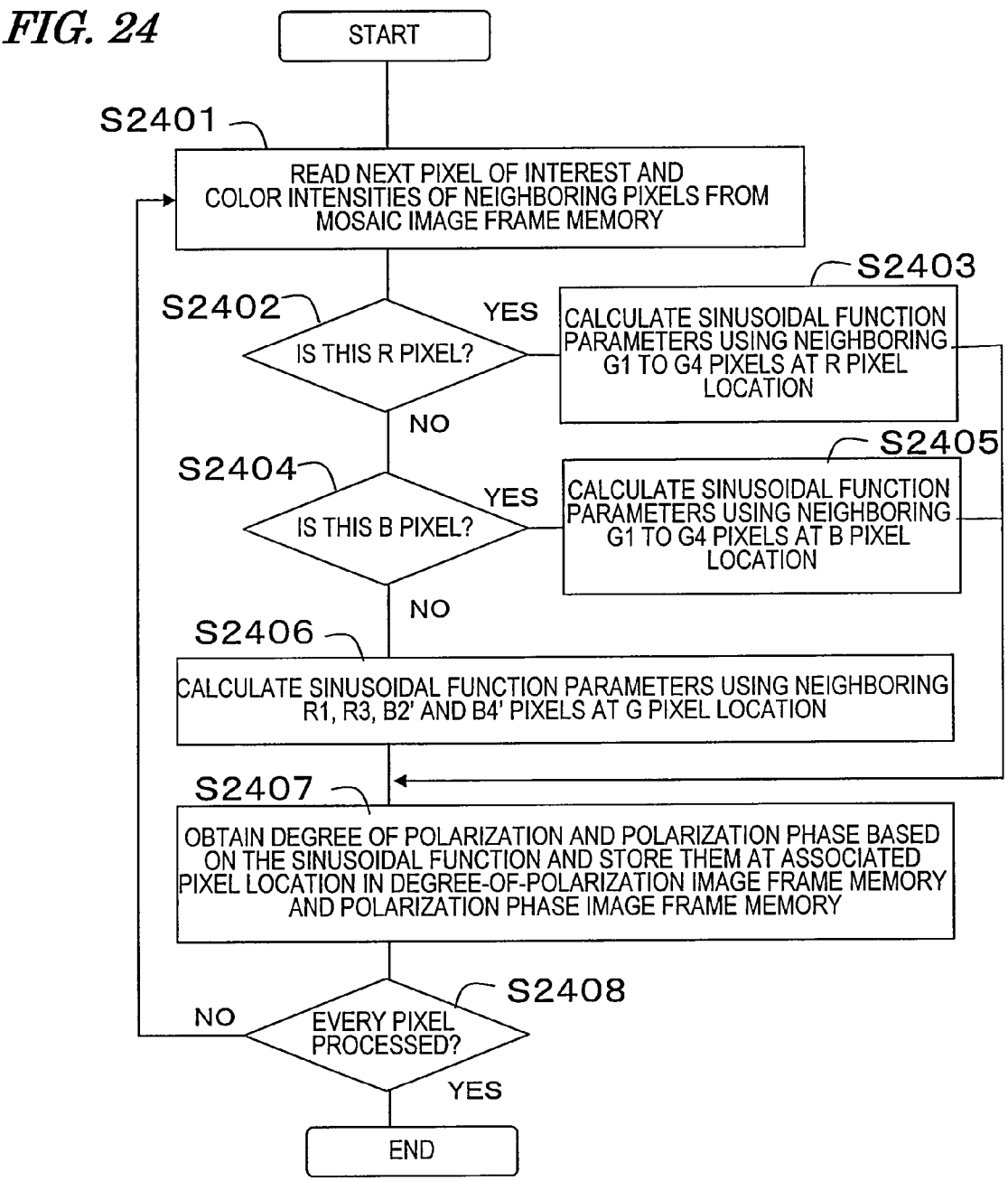
FIG. 24 is a flowchart showing how the polarization information processing section of the second preferred embodiment operates.

The processing procedures shown in FIGS. 23 and 24 are independent of each other, and therefore, may be performed by executing two different software programs in parallel with each other. Alternatively, these processing procedures may also be carried out by using hardware components.

Furthermore, in the preferred embodiment described above, a patterned polarizer made of photonic crystals is supposed to be used. Alternatively, a film type polarizer, a wire grid type polarizer, or a polarizer operating on any other principle may also be used.

Embodiment 3

Hereinafter, a third preferred embodiment of an image processing apparatus according to the present invention will be described.

The basic configuration of this preferred embodiment is also as shown in the block diagram of FIG. 1. That is why this preferred embodiment will also be described with reference to FIG. 1 when necessary. The image processing apparatus of this preferred embodiment is characterized in that polarizer units that form the patterned polarizer are provided for either only G and R pixels or only G and B pixels.

FIG. 25 illustrates a pixel arrangement for the color and polarization obtaining section 101 of this preferred embodiment. This arrangement is based on a Bayer type color mosaic filter. At G pixel locations, arranged are four types of polarization pixels G1 through G4, of which the polarization main axis directions are identified by the numerals "1" through "4", respectively. The arrangement of those G1 through G4 pixels is the same as the one shown in FIG. 4. The pixel arrangement of this preferred embodiment is different from the one shown in FIG. 4 in that in addition to providing polarizer units for those G pixels, R1 and R3 with polarization main axis directions of 0 degrees and 90 degrees, respectively, are arranged at the R pixel locations. The arrangement of this preferred embodiment is also different from that of the second preferred embodiment described above in that no polarizer units are arranged at any B pixel locations.

This pixel arrangement has the following features:
(3-1) Only two types of polarizer units, of which the polarization main axis phases are different from each other by 90 degrees, are provided for R pixels; and
(3-2) At the neighboring two-connected positions surrounding each of the G pixels G1 through G4, there are always two different types of R pixels.

The effect to be achieved by these features (3-1) and (3-2) is that a normal color intensity can be obtained by adding together and averaging the intensities of the two polarization pixels because the polarization effect is canceled in that case.

Optionally, polarizer units may also be provided for B pixels, not just the G pixels. Also, polarizer units identified by the numerals "2" and "4" may be used as the ones with polarization main axis angles that are different from each other by 90 degrees. FIG. 26 illustrates an exemplary arrangement in such a situation.

In the following description, a situation where the arrangement shown in FIG. 25 is adopted will be described as an example.

Figure 18:
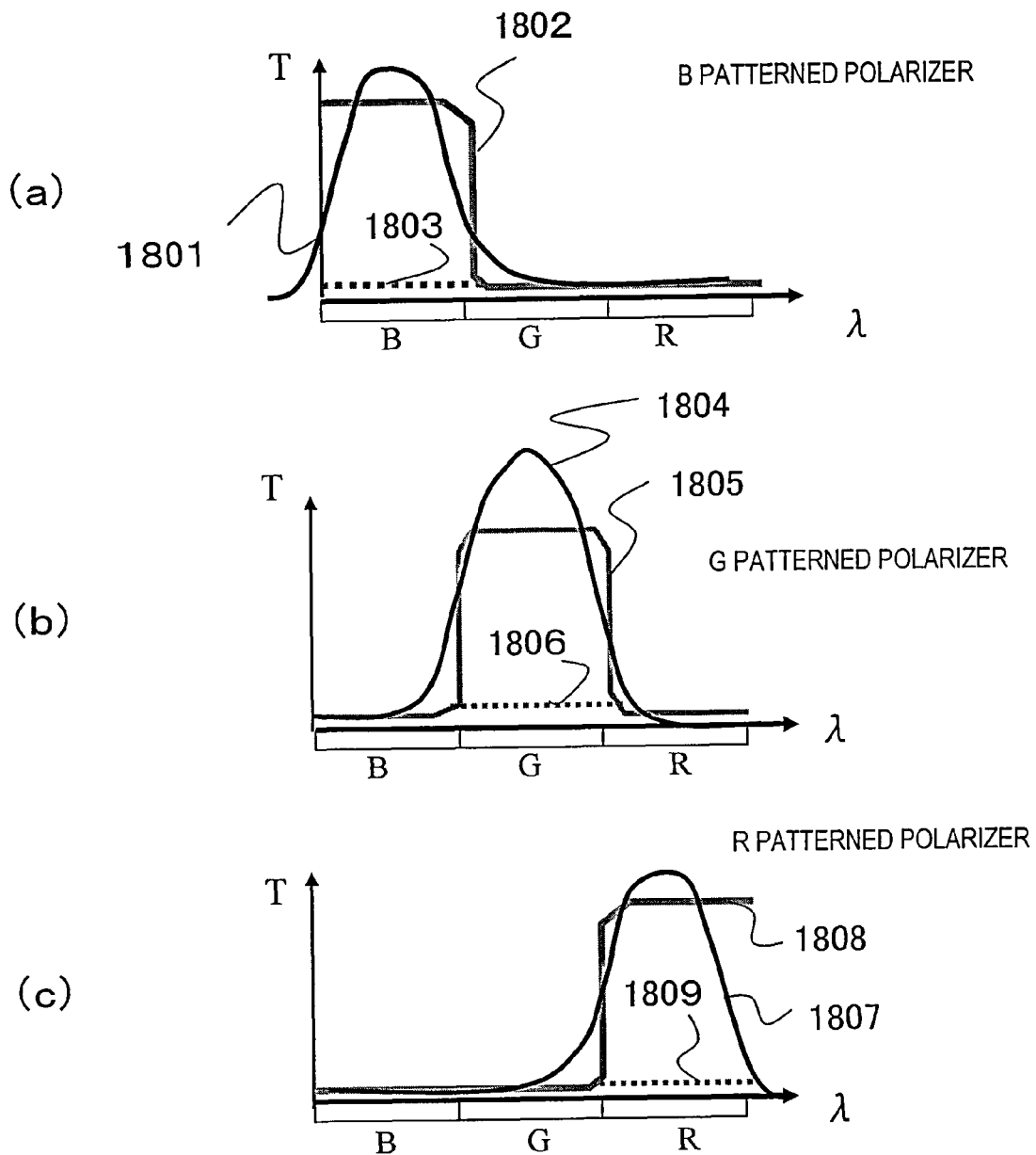
FIGS. 18(a) through 18(c) show the wavelength characteristics of the patterned polarizer of the second preferred embodiment.

As in the second preferred embodiment described above, the polarizer units for the G and R pixels are supposed to have the wavelength characteristic shown in FIG. 18.

In the following description, the patterned polarizer is supposed to have the arrangement shown in FIG. 27 or 28. Each of FIGS. 27 and 28 shows a block consisting of 4×4=16 pixels, which is extracted from the upper left corner of the arrangement shown in FIG. 25 and to which subscripts (x, y) representing the two-dimensional pixel locations are added.

Polarization Information at R Pixel Location

Figure 27:
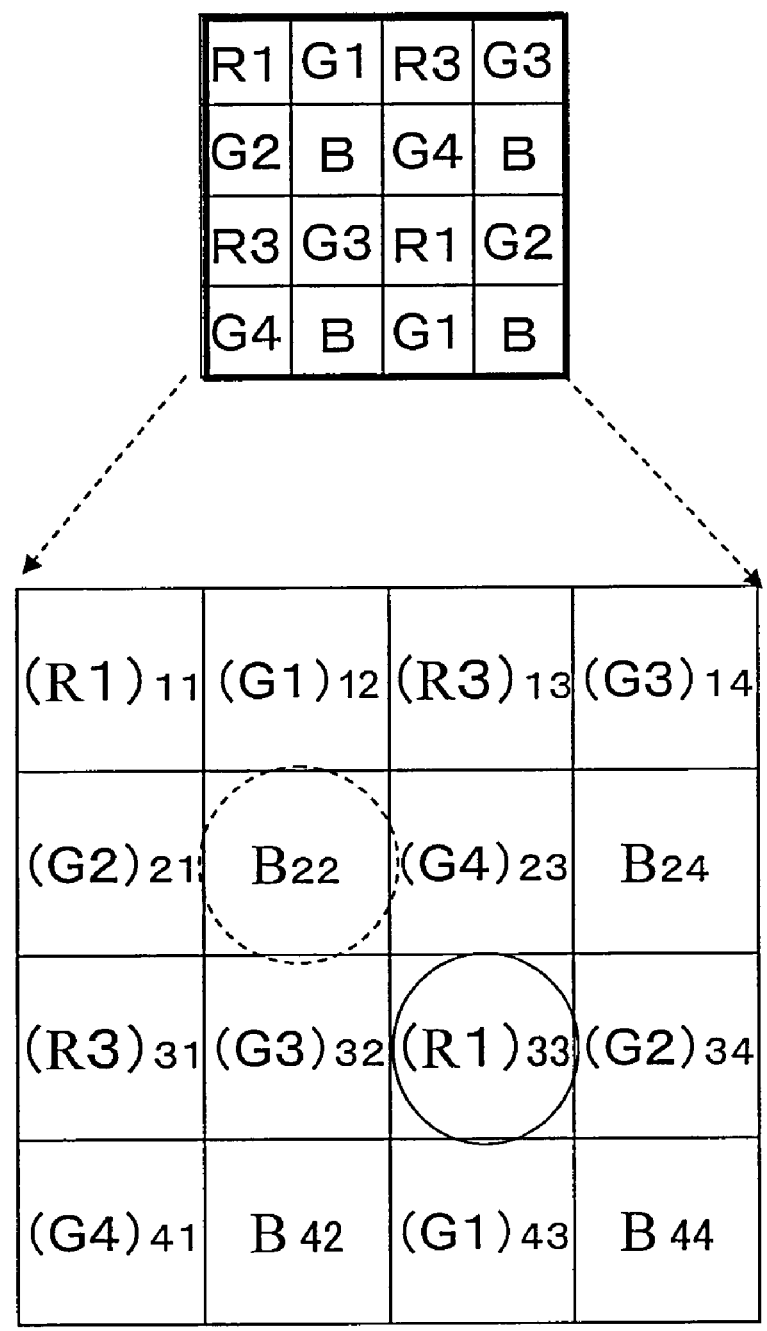
FIG. 27 illustrates an R pixel and its surrounding pixels and a B pixel and its surrounding pixels in the third preferred embodiment.
Figure 28:
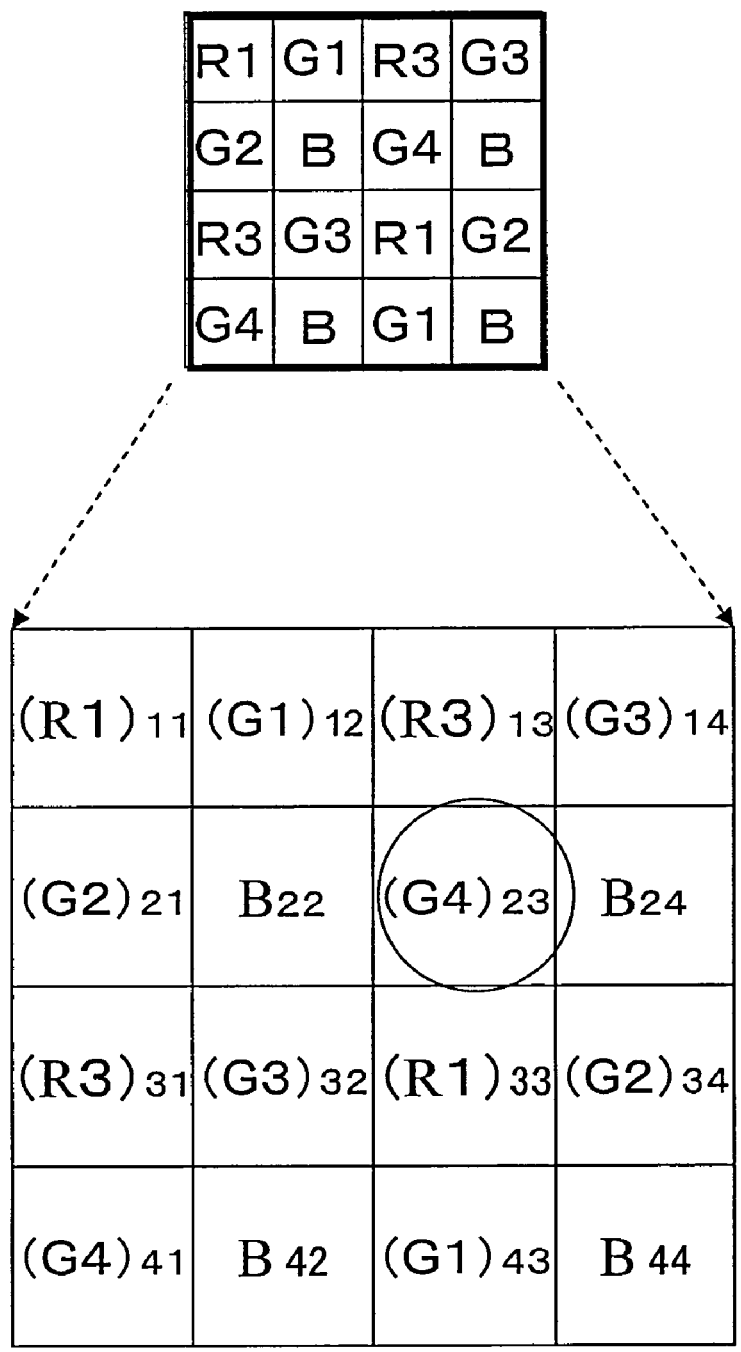
FIG. 28 illustrates a G pixel and its surrounding pixels in the third preferred embodiment.

Take $(R1)_{33}$ shown in FIG. 27 as an example. At the neighboring four-connected positions surrounding the R pixel $(R1)_{33}$, arranged are four types of polarization pixels $(G1)_{43}$, $(G2)_{34}$, $(G3)_{32}$ and $(G4)_{23}$ having the same color but mutually different polarization main axis angles. As in the first preferred embodiment, polarization information can be derived from these polarization pixels. A detailed description thereof will be omitted herein. This statement applies to every R pixel at the location identified by R1 or R3.

Intensity at R Pixel Location

Each R pixel is a polarization pixel provided with a polarizer unit. That is why at each R pixel location, all color intensities of R, G and B need to be estimated.

The G intensity can be obtained using the four pixels G1 to G4 that surrounds the R pixel. The intensity measured at each of these four pixels G1 to G4 is the intensity of a G ray that has been transmitted through a polarizer unit. However, as the polarization main axis angles of these four pixels G1 through G4 are different from each other by 45 degrees, the polarization effect is canceled and the average intensity of the G ray can be obtained by performing the operation of averaging the intensities measured at those pixels. However, the interpolated G intensity value needs to be corrected with the maximum transmittance T of the polarizer unit with respect to the G ray. And the interpolated G intensity value is calculated by the following Equation (28):

$$\hat{G}_{33} = [((G1)_{43} + (G2)_{34} + (G3)_{32} + (G4)_{23})/4T] \times 2 \qquad \text{Equation (28)}$$

In the same way, the B intensity may be obtained by the following interpolation:

$$\hat{B}_{33} = (B_{22} + B_{24} + B_{42} + B_{44})/4 \qquad \text{Equation (29)}$$

The R pixel is surrounded with no R polarization pixels available for interpolation. That is why the R intensity is obtained by interpolation using the interpolated G intensity value and the ratio of R1 to G1 as in the following Equation (30):

$$\hat{R}_{33} = \frac{(R1)_{33}}{(G1)_{43}} \times \hat{G}_{33} = \frac{(R1)_{33}}{(G1)_{43}} \times \left[ \left( \frac{(G1)_{43} + (G2)_{34} +}{(G3)_{32} + (G4)_{23}} \right) / 4T \right] \times 2 \quad \text{Equation (30)}$$

Polarization Information at B Pixel Location

Take $B_{22}$ shown in FIG. 27 as an example. As its polarization information can also be obtained based on the intensities measured at the surrounding G1 through G4 pixels as in an R pixel, the description thereof will be omitted herein.

Color Intensities at B Pixel Location

Take $B_{22}$ shown in FIG. 28 again as an example. In this case, the intensities of two color pixels of R and G need to be obtained. As for the R intensity, the $B_{22}$ pixel is surrounded with R1 and R3 pixels, of which the polarization main axis angles are different from each other by 90 degrees. That is why the R intensity at $B_{22}$ can be obtained with the polarization effect canceled by averaging the intensities measured at the R1 and R3 pixels:

$$\hat{R}_{22} = [((R1)_{11} + (R3)_{13} + (R3)_{31} + (R1)_{33})/4T] \times 2 \quad \text{Equation (31)}$$

On the other hand, the G intensity can be obtained with the polarization effect canceled by averaging the intensities measured at the four surrounding pixels G1 through G4:

$$\hat{G}_{22} = [((G1)_{12} + (G2)_{21} + (G3)_{32} + (G4)_{23})/4T] \times 2 \quad \text{Equation (32)}$$

Polarization Information at G Pixel Location

Take $(G4)_{23}$ shown in FIG. 28 as an example. At the neighboring four-connected positions surrounding this pixel, there are only R1 and R3 pixels as polarization pixels. That is why the polarization information can be obtained by plotting the G intensity curve based on the intensities measured at the four types of polarization pixels $(G1)_{12}$, $(G3)_{14}$, $(G3)_{32}$ and $(G2)_{34}$ located at the neighboring eight-connected positions as in the first preferred embodiment described above. However, unlike the R and B pixels, two polarization pixels G3 of the same type are included, and therefore, two pieces of the same polarization information are contained. For that reason, one of the following two methods may be adopted.

One way is to discard one of the two pieces of information about $(G3)_{14}$ and $(G3)_{32}$ and use only information about the remaining four different units of the patterned polarizer. In that case, the intensity curve is determined by Equations (6) to (8).

The other method is to determine the intensity curve by the minimum square method of Equation (5) based on the intensities measured at the five points including the two redundant ones.

Color Intensity at G Pixel Location

A G pixel is a pixel with a polarizer unit. That is why at that pixel location, not just R and B intensities but also its own G intensity should be calculated as well. First, it will be described how to obtain the R and B intensities by interpolation.

As can be seen from FIG. 28, each G pixel is always surrounded with R and B pixels, which are respectively located over, under, on the right and on the left of that G pixel. Take $(G4)_{23}$ shown in FIG. 28 as an example again. As there are two R pixels R3 and R1 over and under the $(G4)_{23}$ pixel, the average intensity can be obtained with the polarization effect canceled by the averaging operation. Also, as there are two B pixels on the right and left of the $(G4)_{23}$ pixel, its value can also be obtained by the averaging operation. By using these averaged intensities, the R and B intensities can be obtained by linear interpolation as represented by the following Equation (33):

$$\hat{R}_{23} = [((R3)_{13} + (R1)_{33})/2T] \times 2 \quad \hat{B}_{23} = (B_{22} + B_{24})/2 \quad \text{Equations (33)}$$

Next, the G intensity can be obtained by interpolation using the intensities that have already been calculated at the surrounding G pixels as represented by the following Equation (34):

$$\hat{G}_{23} = (\hat{G}_{13} + \hat{G}_{22} + \hat{G}_{33} + \hat{G}_{24})/4 \quad \text{Equation (34)}$$

The flow of operation is almost the same as that of the first preferred embodiment, and therefore, will not be described all over again.

In the preferred embodiments described above, a color mosaic filter with a Bayer arrangement is supposed to be used. However, the color mosaic filter that can be used in the present invention does not have to have such a Bayer type arrangement but may also have any other type of arrangement. Furthermore, the color of the pixels with the highest arrangement density does not have to be G (green) but may also be any other color.

Embodiment 4

Hereinafter, a fourth preferred embodiment of an image processing apparatus according to the present invention will be described.

The basic configuration of this preferred embodiment is also as shown in the block diagram of FIG. 1. That is why this preferred embodiment will also be described with reference to FIG. 1 when necessary. The image processing apparatus of this preferred embodiment is characterized in that four types of polarizer units are provided for only G pixels as in the first preferred embodiment described above but that the polarization information is obtained and the color interpolation is done with three types of polarizers selected, thus carrying out the interpolation processing on a triangular pixel pattern eventually.

FIG. 29(a) illustrates a pixel arrangement for the color and polarization obtaining section 101 of this preferred embodiment. This arrangement is also based on a Bayer type color mosaic filter. At G pixel locations, arranged are four types of polarization pixels G1 through G4, of which the polarization main axis directions are identified by the numerals "1" through "4", respectively. The arrangement of those pixels G1 through G4 is the same as the one shown in FIG. 4. With such a pixel arrangement, however, the plane can be entirely covered with triangular pixel sets, each consisting of three different types of polarizer units, as shown in FIG. 29(b). In this preferred embodiment, polarization information is supposed to be obtained and color interpolation is supposed to be done using such a triangular pixel set as a unit.

Figure 6:
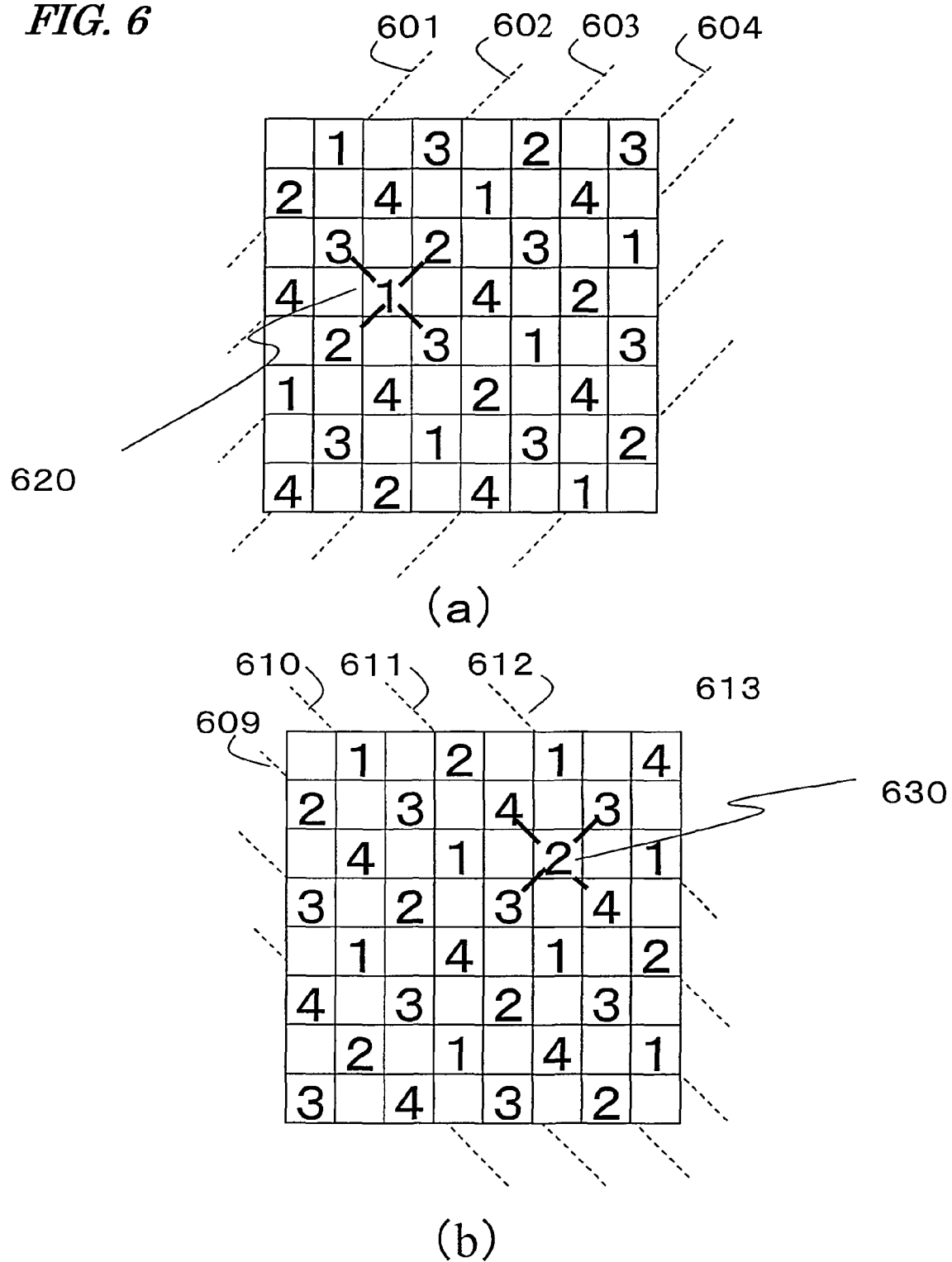
FIGS. 6(a) and 6(b) illustrate a combined arrangement for a color filter and patterned polarizer that has a problem.

FIG. 30 shows the same pixel arrangement as the one shown in FIG. 5, while FIG. 31 shows the same pixel arrangement as the one shown in FIG. 6. In the description of the first preferred embodiment, the pixel arrangement shown in FIG. 6 is regarded as inappropriate for obtaining polarization information. In this preferred embodiment, however, each triangular set of pixels needs to include three types of polarizer units, and therefore, the arrangement shown in FIG. 31 may be adopted.

Polarization Information at Triangular Pixel Locations

As shown in FIGS. 30 and 31, each triangular pixel set according to this preferred embodiment consists of all four types of polarizer units #1 through #4 but one missing polarization pixel. In this preferred embodiment, the sinusoidal function parameters A, B and C are obtained based on the polarization information collected from the three types of polarizer units that are located at the respective vertices of each triangular pixel set.

First of all, the parameter C is obtained by adding together and averaging two intensities at two different angles, at which the polarization phases are mutually inverted to each other. That is why the parameter C can be calculated by the equation shown on the right column of the following Table 1 with respect to each missing polarization pixel:

TABLE 1

| Missing polarization pixel | C is calculated by |
| --- | --- |
| 1 | $(I_2 + I_4)/2$ |
| 2 | $(I_1 + I_3)/2$ |
| 3 | $(I_2 + I_4)/2$ |
| 4 | $(I_1 + I_3)/2$ |

Next, the intensity information about the missing polarization pixel can be obtained by the equation shown on the right column of the following Table 2:

TABLE 2

| Missing polarization pixel | Its intensity is calculated by |
| --- | --- |
| 1 | $I_1 = 2C - I_3$ |
| 2 | $I_2 = 2C - I_4$ |
| 3 | $I_3 = 2C - I_1$ |
| 4 | $I_4 = 2C - I_2$ |

By making these calculations, the intensities $I_1$ through $I_4$ of the polarization pixels can be obtained. Thus, the other parameters A and B can be calculated by Equations (6) to (8).

The degrees of polarization and the polarization phases are obtained on a triangular pixel set basis. This means that the images stored in the degree-of-polarization image frame memory 105 and the polarization phase image frame memory 106 are comprised of such triangular pixel sets as units.

Interpolation of G Color Intensity

Figure 29:
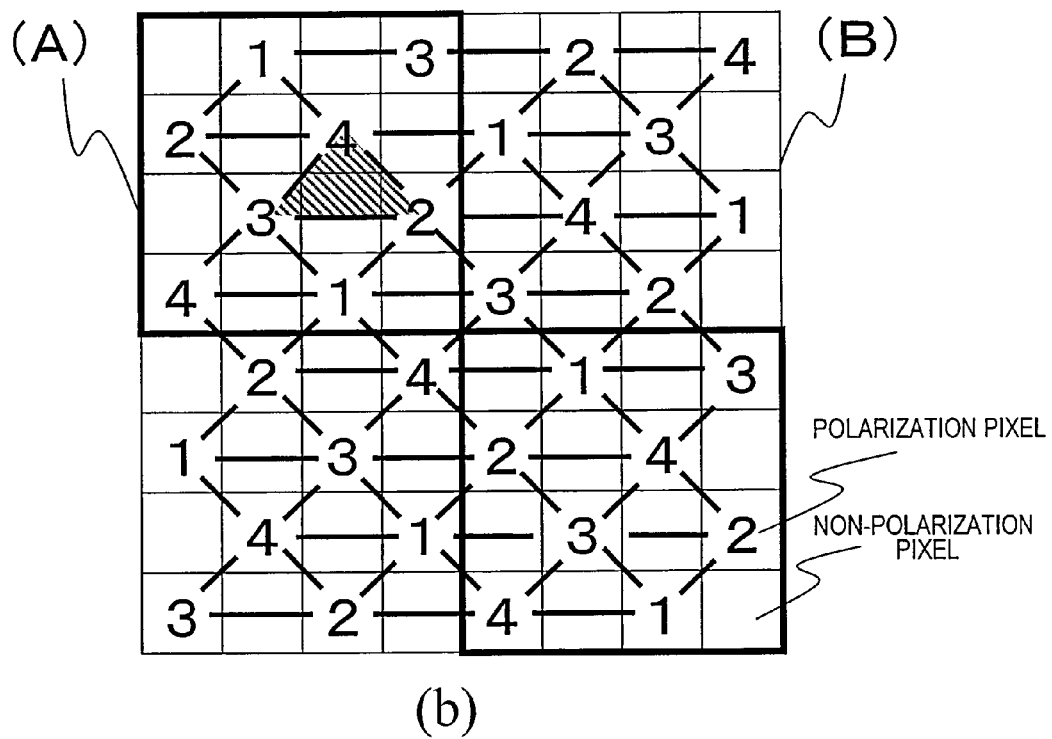
FIGS. 29(a) and 29(b) illustrate an exemplary combined arrangement for a color filter and a patterned polarizer and the shape of a unit pixel set according to a fourth preferred embodiment of the present invention.
Figure 32:
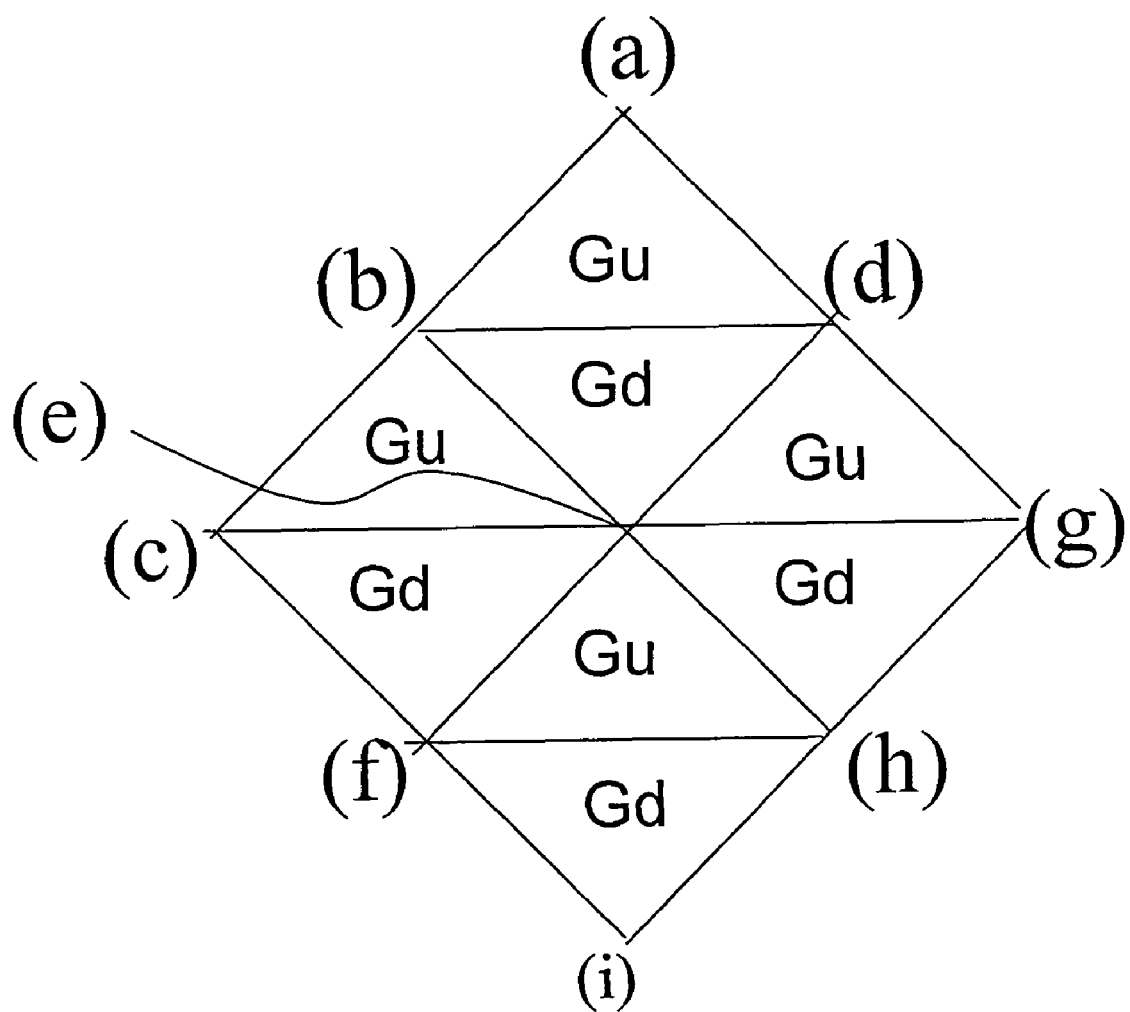
FIG. 32 illustrates a set of triangular areas and a G color intensity interpolation method according to the fourth preferred embodiment.

FIG. 32 illustrates the multiple triangular pixel sets shown in FIG. 29(*a*) on a larger scale. Each vertex (a) through (i) of these triangles is associated with one of the G polarization pixels #1, #2, #3 and #4. According to this preferred embodiment, the color intensity interpolation is also carried out on a triangular pixel set basis as shown in FIG. 32.

$G_U$, which is the G intensity of the triangle (a) (b) (d) defined by vertically splitting the oblique square (a)(b)(e)(d) shown in FIG. 32, and $G_d$, which is the G intensity of other triangle (b) (e) (d), are calculated by the following Equations (35) and (36), respectively:

$$G_U = \frac{2(I_a + I_b + I_d)}{3T} \quad \text{Equation (35)}$$

$$G_d = \frac{2(I_b + I_d + I_e)}{3T} \quad \text{Equation (36)}$$

where $I_a$ through $I_e$ are the intensities measured at the respective vertex pixels.

In Equations (35) and (36), the constant 2 is a correction term to cope with the phenomenon that the intensity of non-polarized light decreases to a half when transmitted through a linear polarizer. Also, in these equations, T denotes the transmittance of the polarizer and needs to be used as a correction term because T is not 100%.

The G intensities $G_U$ and $G_d$ can also be obtained in the same way in every other triangular area shown in FIG. 32. It should be noted that each of these pixels in the triangular area becomes a unit with a single intensity value.

Interpolation of B Color Intensity

Figure 33:
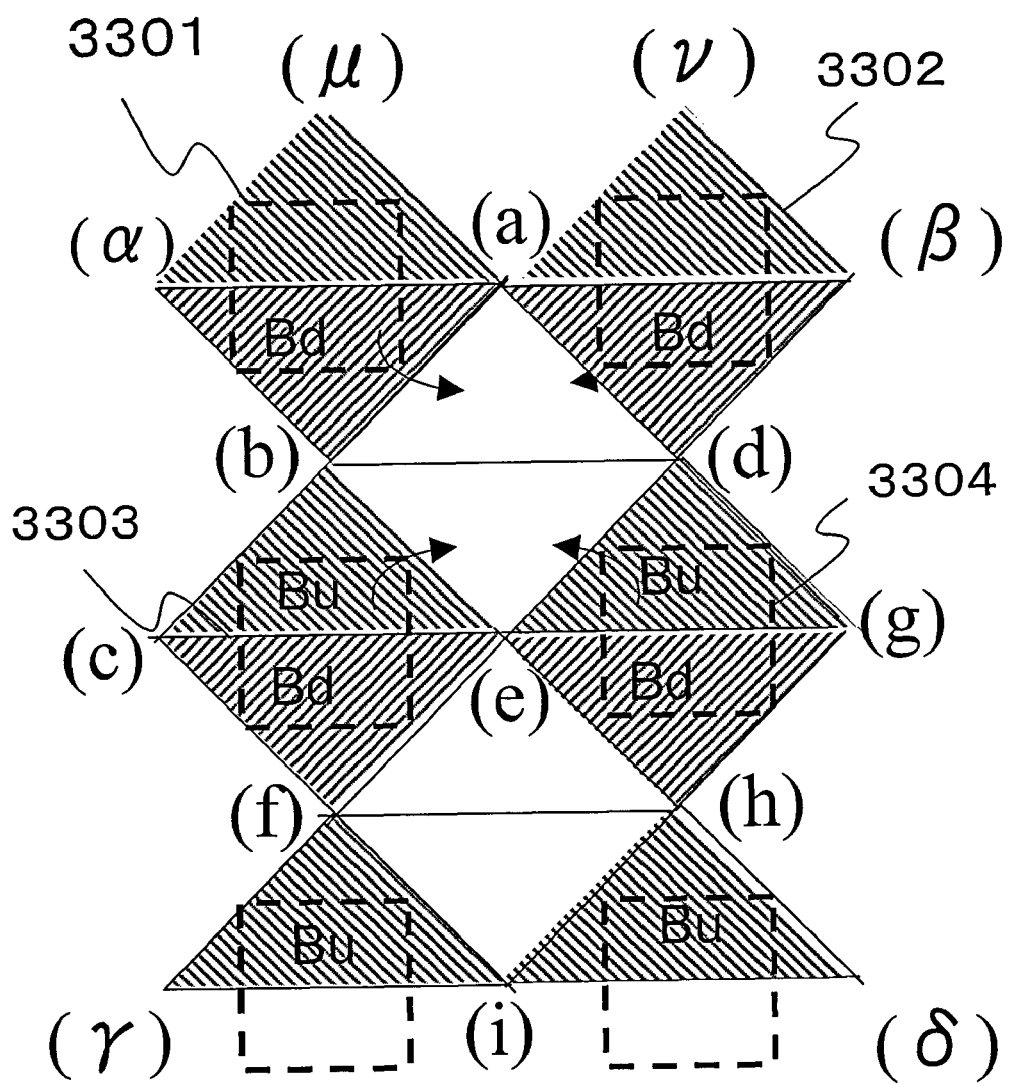
FIG. 33 illustrates a set of triangular areas and a B color intensity interpolation method according to the fourth preferred embodiment.

FIG. 33 illustrates pixels that need to be used to obtain the B color intensities of the triangular pixel sets shown in FIG. 32. Each of the nine vertices (a) through (i) shown in FIG. 33 is located at the vertex of its associated triangle and is associated with one of the G polarization pixels #1, #2, #3 and #4. In FIG. 33, shown as pixel locations for obtaining necessary data for interpolation are not only four outside vertices (α), (β), (γ) and (δ) of the triangular pixel sets consisting of the vertices (a) through (i) but also two more outside vertices (μ) and (ν).

In FIG. 33, the square areas 3301 through 3304, which are enclosed with the dashed squares, represent square pixels with B color intensities. That is to say, B pixels are located within these square areas 3301 through 3304 and the area of each B pixel accounts for 50% of the overall area of its associated triangular pixel set. This value is also adopted for the upper and lower triangular pixel sets. When this idea is adopted, the B values are present in the shadowed areas shown in FIG. 33. Specifically, the B values are present in the oblique squares (b)(c)(f)(e) and (e)(h)(g)(d) and in the triangles (α)(b)(a), (a)(d)(β), (f)(γ)(i) and (h)(i)(δ).

The triangular areas with missing B intensities are two open triangles that are included in each of the oblique squares (a)(b)(e)(d) and (e)(f)(i)(h). In each of these triangular pixel sets, the B color intensity should be generated by interpolation. For that purpose, the interpolation may be done by working out the average of the B color intensities in the square areas 3301 through 3304. If the B intensity in the square area 3301 is identified by $B_{3301}$, for example, the interpolated value can be calculated by the following Equation (37):

$$B = \frac{B_{3301} + B_{3302} + B_{3303} + B_{3304}}{4} \quad \text{Equation (37)}$$

Nevertheless, each oblique square area needs to be vertically split into two triangular pixel sets. By taking advantage of the correlation between B and G color intensities, the B color intensities $B_U$ and $B_d$ are calculated on a triangular pixel set basis by the following Equations (38):

$$B_U = \frac{2G_u}{G_u + G_d} B$$

$$B_d = \frac{2G_d}{G_u + G_d} B$$

Equations (38)

Interpolation of R Color Intensity

Figure 34:
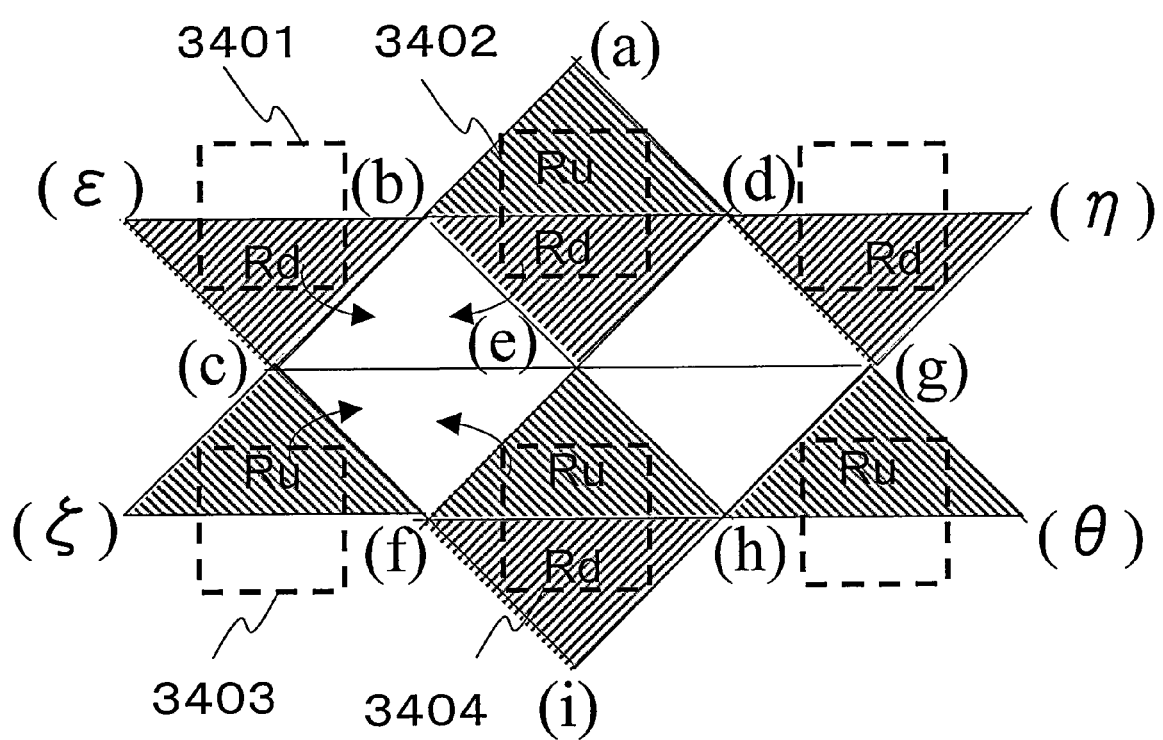
FIG. 34 illustrates a set of triangular areas and an R color intensity interpolation method according to the fourth preferred embodiment.

FIG. 34 illustrates pixels that need to be used to obtain the R color intensities of the triangular pixel sets shown in FIG. 32. To obtain necessary data for interpolation, four vertices (∈), (ζ), (η) and (θ), which are G pixel locations outside of the triangular pixel sets defined by the vertices (a) through (i), are also drawn. In this case, the R pixels are present in the shadowed areas as in the B pixel described above. Specifically, the R pixels are present in the oblique squares (a)(b)(e)(d) and (e)(f)(i)(h) and in the triangles (∈)(c)(b), (c)(ζ)(f), (d)(g)(η) and (g)(h)(θ). As in the interpolation of the B pixels, the triangular pixel sets with no R pixels may be interpolated by the following Equations (39) and (40):

$$R = \frac{R_{3401} + R_{3402} + R_{3403} + R_{3404}}{4}$$

Equation (39)

$$R_u = \frac{2G_u}{G_u + G_d} R$$

$$R_d = \frac{2G_d}{G_u + G_d} R$$

Equations (40)

By performing these processing steps, a degree-of-polarization image, a polarization phase image and an (RGB) full-color intensity image are generated for each of the triangular pixel sets shown in FIG. 29.

If the pixel arrangement in the color and polarization obtaining section 101 and the pixel arrangement consisting of triangular pixel sets that form an image are superposed one upon the other, it can be seen that the area of each pair of triangular pixel sets and that of the original square pixel set are equal to each other. If no triangular pixel sets are used, however, the central coordinate position, where the polarization information and the result of the G color intensity interpolation are located, will deviate from the original tetragonal lattice coordinate system. As there is a concern about complication of such processing, a degree-of-polarization image or any other image is output as an image consisting of triangular pixel sets.

If an image is presented on a display device based on the degree-of-polarization image generated in this preferred embodiment, then the image data should be processed appropriately in conformity with the pixel arrangement of the display device. Such processing could be performed by the display device. However, such processing may be done inside the image processing apparatus of this preferred embodiment and then the result may be output.

Hereinafter, it will be described with reference to FIGS. 1 and 35 how the color mosaic interpolation section 102 of this preferred embodiment operates.

First of all, the color mosaic image data that has been obtained by the color and polarization obtaining section 101 is supposed to be stored in the mosaic image frame memory 107. In Step S3501, a set of pixels with G intensities (G1-G2-G3) in the mosaic image is read as a unit. Next, in Step S3502, the G intensity is estimated by interpolation using one of Equations (35) and (36). Subsequently, in Step S3503, G intensities are stored as a triangular pixel set on the G plane of the color image frame memory 104. Then, in Step S3504, it is determined whether or not every set of pixels with G intensities (G1-G2-G3) has finished being processed. If the answer is NO, then the series of processing steps S3501 through S3504 is performed repeatedly. On the other hand, if the answer to the query of Step S3504 is YES, then the process advances to Step S3505.

In Step S3505, pixels with B intensities and pixels with R intensities are obtained from the mosaic image frame memory, which may be carried out in parallel with each other. If the B and R pixels account for 50% of the area of the triangular pixel set, their values are adopted as the B and R pixel intensities in the triangular pixel set in Step S3506. Next, in Step S3507, interpolation is carried out on a triangular pixel set with a missing B intensity by Equations (37) and (38) and on a triangular pixel set with a missing R intensity by Equations (39) and (40), respectively.

Thereafter, in Step S3508, the triangular pixel sets with the interpolated B and R intensities are respectively stored on the B and R planes of the color image frame memory 104. Finally, in Step S3509, it is determined whether or not every pixel with the B or R intensity, stored in the mosaic image frame memory, has finished being processed. If the answer is NO, then the series of processing steps S3505 through S3509 is repeatedly carried out.

As a result of these processing steps, data about a color intensity image I (x, y) with (RGB) intensity values of respective pixels is generated in the color image frame memory 104. Although this I (x, y) image has a triangular pixel structure, a full-color image, of which the color reproducibility is comparable to that of a single-chip color image capture device that uses a normal Bayer color mosaic, can still be generated by interpolation.

Next, it will be described with reference to FIGS. 1 through 36 how the polarization information processing section 103 of this preferred embodiment operates.

First of all, the color mosaic image data obtained by the color and polarization obtaining section 101 is supposed to be stored in the mosaic image frame memory 107. Next, in Step S3601, a set of pixels with G intensities (G1-G2-G3) is read from the mosaic image frame memory. Then, based on the polarized light intensities G1, G2 and G3, sinusoidal function parameters A, B and C are determined by Equations (6) through (8) and with reference to Tables 1 and 2.

Next, in Step S3603, the degree of polarization ρ and the polarization phase φ are obtained by Equations (9) and (10).

Then, in Step S3604, the values generated are stored at the triangular pixel locations in the degree-of-polarization image frame memory 105 and the polarization phase image frame memory 106.

This series of processing steps is repeatedly carried out until it is determined in Step S3605 that every pixel in the mosaic image frame memory has finished being processed. In this manner, data about the degree-of-polarization image ρ (x, y) is generated in the degree-of-polarization image frame memory 105 and data about the polarization phase image φ (x, y) is generated in the polarization phase image frame memory 106. These images have a triangular pixel structure, which is different from the pixel structure of the color mosaic image, as can be seen from its generation process. As a result, just by providing the patterned polarizer for only G pixels, polarization information can be obtained with the same pixel structure and at the same resolution as a full-color image I (x, y).

Figure 35:
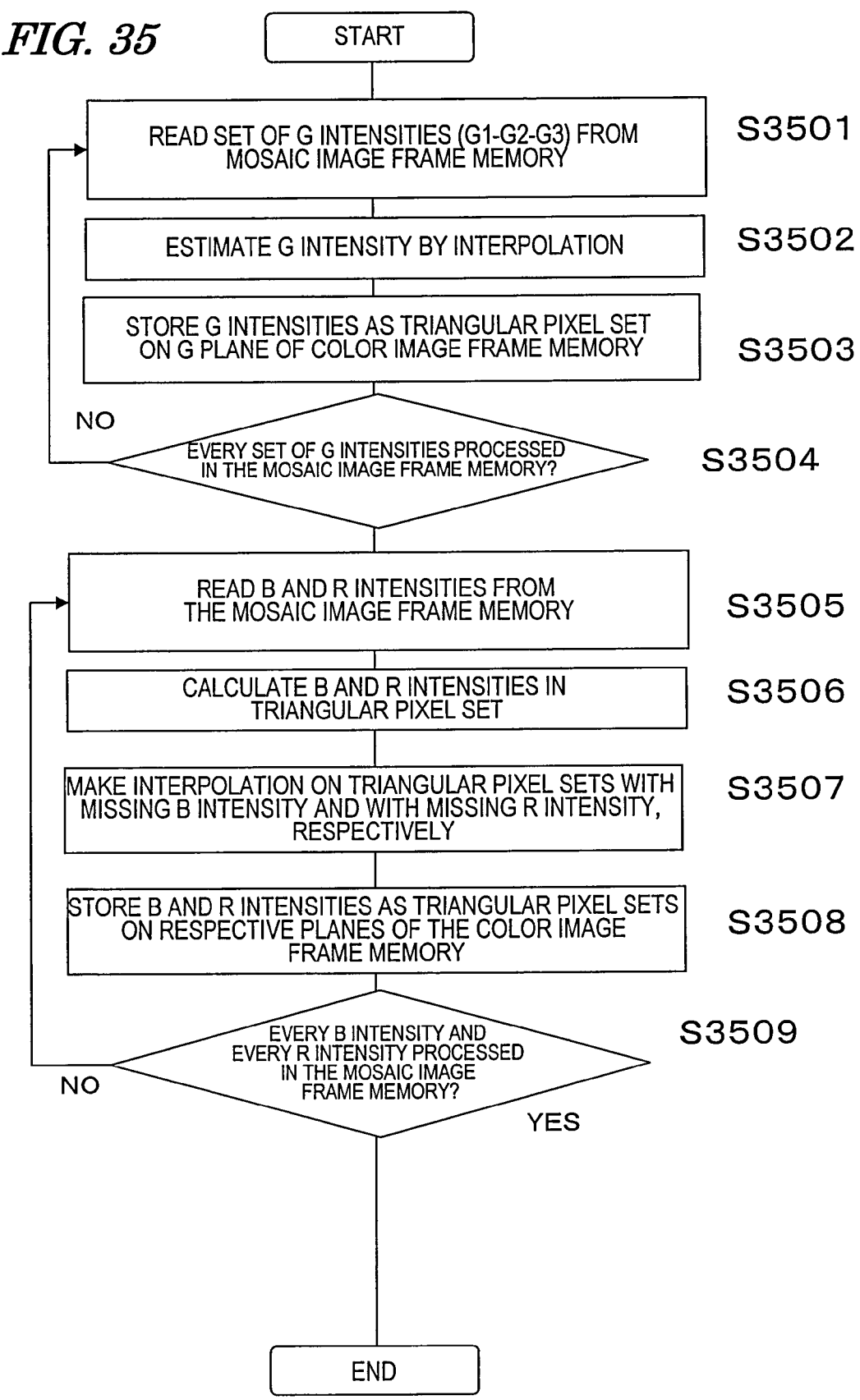
FIG. 35 is a flowchart showing how the color mosaic interpolation section of the fourth preferred embodiment operates.
Figure 36:
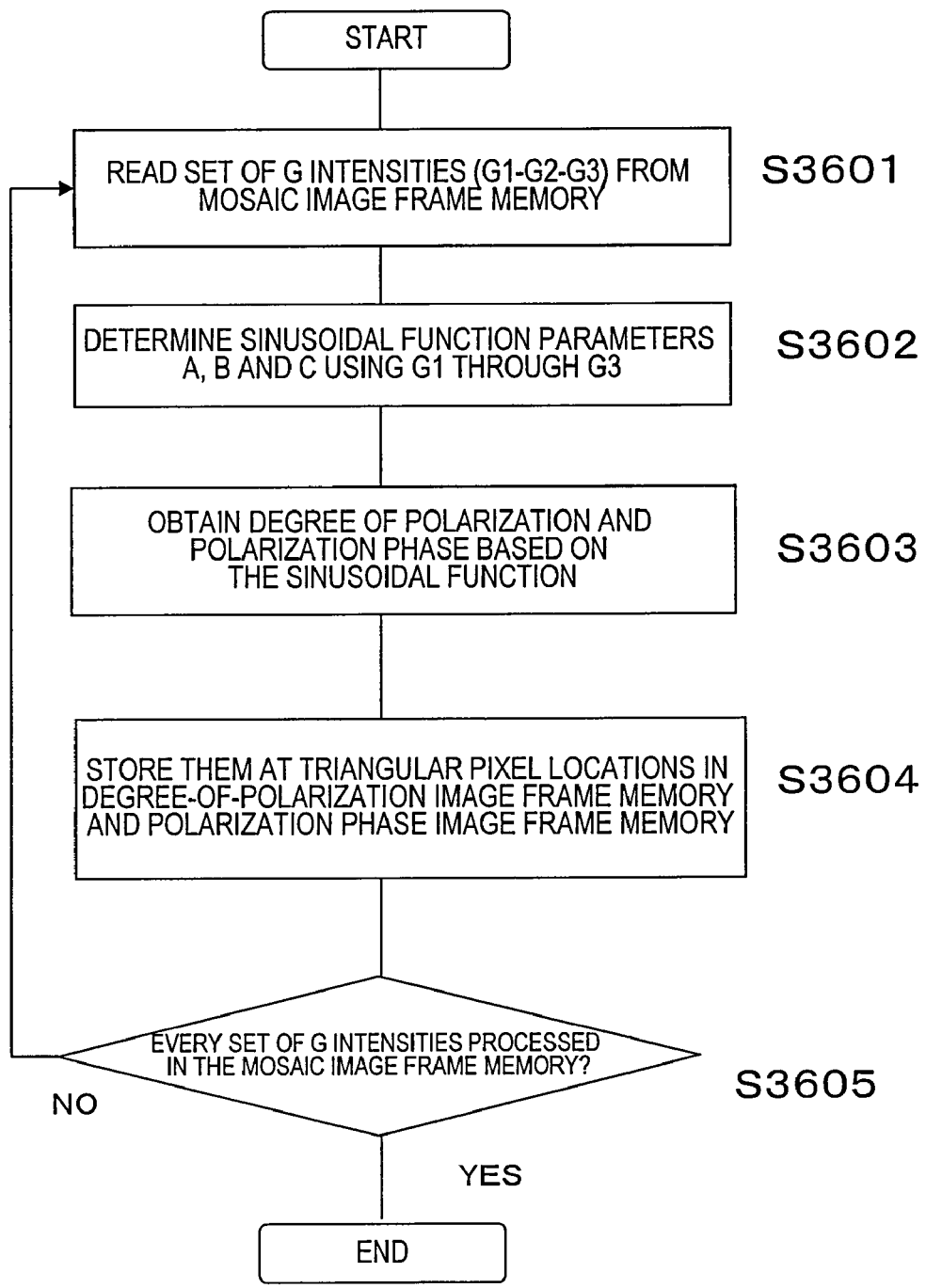
FIG. 36 is a flowchart showing how the polarization information processing section of the fourth preferred embodiment operates.

The processing procedures shown in FIGS. 35 and 36 are independent of each other, and therefore, may be performed in parallel with each other. Also, these processing procedures may be carried out either by executing a software program or using hardware components.

Furthermore, in the preferred embodiment described above, a patterned polarizer made of photonic crystals is supposed to be used. Alternatively, a film type polarizer, a wire grid type polarizer, or a polarizer operating on any other principle may also be used.

In the fourth preferred embodiment described above, by using an image capture device in which four types of polarizer units are provided for G pixels, polarization information and color intensity information are obtained with a triangular pixel set used as a minimum unit. However, the number of types of polarizers to arrange does not have to be four but may also be five or more. The point is that three different types of polarizer units need to be arranged at the respective vertices of each triangular pixel set.

Optionally, a single image processing apparatus may selectively perform either the processing of the first preferred embodiment or that of the fourth preferred embodiment. If an image processing apparatus with the same pieces of hardware is provided with a software program to carry out the processing of the first preferred embodiment and a software program to carry out the processing of the fourth preferred embodiment, one of these two types of processing may be carried out selectively.

INDUSTRIAL APPLICABILITY

The apparatus and method for image processing according to the present invention can obtain color information and polarization information from an object at the same time, and therefore, can be used in various types of digital still cameras, digital movie cameras, monitor cameras and cameras for cars.

The invention claimed is:

1. An image processing apparatus comprising:
a color and polarization obtaining section including a single-chip color image capture device that has a color mosaic filter and a patterned polarizer in which a number of polarizer units, having polarization transmission planes defining mutually different angles, are provided for multiple pixels of the same color in the color mosaic filter;
a polarization information processing section for approximating, as a sinusoidal function, a relation between the intensities of light rays that have been transmitted through the polarizer units for the multiple pixels of the same color and the angles of the polarization transmission planes of the polarizer units; and
a color mosaic interpolation section for generating a color intensity image by performing color intensity interpolation and getting a color intensity that cannot be obtained at a pixel of interest.

2. The image processing apparatus of claim 1, wherein the patterned polarizer has a structure in which four types of polarizer units, having polarization transmission planes defining mutually different angles, are arranged adjacent to each other.

3. The image processing apparatus of claim 1, wherein the color mosaic filter has a structure in which pixels in a single particular color are arranged in a checkerboard pattern, and
wherein the polarizer units are provided for those pixels that are arranged in the checkerboard pattern.

4. The image processing apparatus of claim 3, wherein the particular color is G (green) among R (red), G (green) and B (blue).

5. The image processing apparatus of claim 1, wherein the polarization wavelength dependences of the polarizer units for use in the pixels of the same color are approximately equal to each other within a wavelength range associated with that color.

6. An image processing method comprising the steps of:
measuring the intensities of respective pixels using a single-chip color image capture device, in which polarizer units, having polarization transmission planes that define mutually different angles, are provided for multiple pixels in a single particular color included in a color pixel arrangement;
obtaining polarization information based on the intensities that have been measured in the multiple pixels in the single particular color; and
performing a spatial interpolation on a color intensity using the intensities in the single particular color and the two colors other than the single particular color, thereby generating a color intensity image.

7. An image processing apparatus comprising:
a color and polarization obtaining section including a single-chip color image capture device that has a color mosaic filter and a patterned polarizer in which a number of polarizer units, having polarization transmission planes defining mutually different angles, are provided for multiple pixels of different colors in the color mosaic filter;
a polarization information processing section for approximating, as a sinusoidal function, a relation between either the intensities of light rays that have been transmitted through the polarizer units for the multiple pixels of the different colors, or corrected intensities thereof, and the angles of the polarization transmission planes of the polarizer units; and
a color mosaic interpolation section for generating a color intensity image by performing color intensity interpolation and getting a color intensity that cannot be obtained at a pixel of interest.

8. The image processing apparatus of claim 7, wherein the color mosaic filter has a structure in which pixels in a single particular color are arranged in a checkerboard pattern, and
wherein four types of polarizer units, having polarization transmission planes defining mutually different angles, are arranged adjacent to each other for the pixels that are arranged in the checkerboard pattern, while at least two types of polarizer units, having polarization transmission planes defining mutually different angles, are arranged for the pixels in the other colors.

9. The image processing apparatus of claim 8, wherein the particular color is G (green) among R (red), G (green) and B (blue).

10. The image processing apparatus of claim 7, wherein the color mosaic interpolation section calculates the average of intensities that have been measured in pixels of the same color, for which $(180/\theta)$ types of polarizer units are provided in the neighborhood of the pixel of interest, thereby canceling the effect of polarization and performing interpolation on the color intensity, the $(180/\theta)$ types of polarizer units having polarization transmission planes that define angles that are different from each other by $\theta$ degrees.

11. The image processing apparatus of claim 7, wherein the color mosaic interpolation section estimates the color intensity based on the intensities that have been measured in pixels of different colors, for which the polarization transmission planes define the same angle, in the neighborhood of the pixel of interest.

12. An image processing method comprising the steps of:
measuring the intensities of respective pixels using a single-chip color image capture device in which polarizer units, having polarization transmission planes defining mutually different angles, are provided for multiple pixels in multiple different colors in a color pixel arrangement;
obtaining polarization information based on the intensities that have been measured in the multiple pixels in the same color, for which the polarization transmission planes define mutually different angles;
obtaining polarization information by correcting the intensities of the multiple pixels in the multiple different colors, for which the polarization transmission planes define different angles, in the neighborhood of the pixel of interest; and estimating a color intensity that cannot be obtained at the pixel of interest based on the intensities of the pixels of the same color, for which (180/θ) types of polarizer units, having polarization transmission planes defining angles that are different from each other by θ degrees, are provided in the neighborhood of the pixel of interest, and based on the intensities of the pixels in the different colors, for which the polarization transmission planes define the same angle, thereby generating a color intensity image.

13. A patterned polarizer comprising a number of polarizer units that are arranged two-dimensionally for pixels of a first color that are included in a Bayer color mosaic pixel arrangement, wherein the polarizer units are arranged in a checkerboard pattern and no polarizer units are present for pixels of second and third colors that are included in the Bayer color mosaic pixel arrangement, wherein the polarizer units that are located at neighboring four-connected positions surrounding the pixel of the second or third color are comprised of four polarizer units, the polarization transmission planes of the four polarizer units defining angles that are different from each other, wherein at least four of the polarization transmission planes of the polarizer unit for the pixel of the first color and the polarizer units that are located at neighboring eight-connected positions surrounding said pixel of the first color define angles that are different from each other.

14. A single-chip color image capture device comprising: the patterned polarizer of claim 13; and
a color mosaic filter, which is arranged such that the respective polarizer units of the patterned polarizer are superposed on its respective pixels.

15. An image processing apparatus comprising:
a color and polarization obtaining section including a single-chip color image capture device that has a color mosaic filter and a patterned polarizer in which a number of polarizer units, of which the polarization transmission planes define four or more different angles, are provided for multiple pixels of the same color in the color mosaic filter;
a polarization information processing section for approximating, as a sinusoidal function, a relation between the intensities of light rays that have been transmitted through the polarizer units for the multiple pixels of the same color and the angles of the polarization transmission planes of the polarizer units; and
a color mosaic interpolation section for generating a color intensity image by performing color intensity interpolation using, as a pixel unit, a triangular area comprised of three polarizer units that have polarization transmission planes defining mutually different angles and that are adjacent to each other.

16. A patterned polarizer comprising a number of polarizer units that are arranged two-dimensionally for pixels of all the colors that are included in a Bayer color mosaic pixel arrangement, wherein the polarizer units for pixels of a first color that are included in the Bayer color mosaic pixel arrangement are arranged in a checkerboard pattern, wherein the polarizer units for pixels of second and third colors that are included in the Bayer color mosaic pixel arrangement are arranged so that said polarizer units are located at neighboring eight-connected positions surrounding the pixel of the first color, wherein the polarizer units that are located at neighboring four-connected positions surrounding the pixel of the second or third color are comprised of four polarizer units, the polarization transmission planes of said four polarizer defining angles that are different from each other, wherein at least four of the polarization transmission planes of the polarizer unit for the pixel of the first color and the polarizer units that are located at neighboring eight-connected positions surrounding said pixel of the first color define angles that are different from each other, wherein the polarizer units that are located at neighboring four-connected positions surrounding the pixel of the first color are comprised of two polarizer units for the pixel of the second color and other two polarizer units for the pixel of the third color, the polarization transmission planes of the four polarizer units defining angles that are different from each other, wherein one of the polarization transmission planes of the four polarizer units that are located at the neighboring four-connected positions surrounding the pixel of the first color defining an angle that is same as that of the polarizer unit for said pixel of the first color.

17. A single-chip color image capture device comprising: the patterned polarizer of claim 16; and
a color mosaic filter, which is arranged such that the respective polarizer units of the patterned polarizer are superposed on its respective pixels.

18. A patterned polarizer comprising a number of polarizer units that are arranged two-dimensionally for pixels of first and second colors that are included in a Bayer color mosaic pixel arrangement, wherein the polarizer units for pixels of the first color are arranged in a checkerboard pattern, wherein the polarizer units for pixels of the second color are arranged at neighboring two-connected positions surrounding the pixel of the first color and no polarizer units are present for pixels of a third color that are included in the Bayer color mosaic pixel arrangement, wherein the polarizer units that are located at neighboring four-connected positions surrounding the pixel of the second are comprised of four polarizer units, the polarization transmission planes of said four polarizer defining angles that are different from each other, wherein at least four of the polarization transmission planes of the polarizer unit for the pixel of the first color and the polarizer units that are located at neighboring eight-connected positions surrounding said pixel of the first color define angles that are different from each other, wherein one of the polarization transmission planes of the polarizer units that are located at the neighboring four-connected positions surrounding the pixel of the second color is the same as that of the polarizer unit for said pixel of the second color.

19. A single-chip color image capture device comprising: the patterned polarizer of claim 18; and
a color mosaic filter, which is arranged such that the respective polarizer units of the patterned polarizer are superposed on its respective pixels.

* * * * *